US012786257B2

(12) United States Patent
Xu et al.

(10) Patent No.: US 12,786,257 B2
(45) Date of Patent: Nov. 3, 2026

(54) DESKTOP SHARING METHOD, APPARATUS, AND SYSTEM FOR SAVING A BANDWIDTH RESOURCE OCCUPIED BY DESKTOP SHARING

(71) Applicant: HUAWEI TECHNOLOGIES CO., LTD., Shenzhen (CN)

(72) Inventors: Changyue Xu, Nanjing (CN); Shunyan Huang, Nanjing (CN); Liang Lv, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/649,729

(22) Filed: Apr. 29, 2024

(65) Prior Publication Data

US 2024/0283833 A1 Aug. 22, 2024

Related U.S. Application Data

(63) Continuation of application No. PCT/CN2022/090704, filed on Apr. 29, 2022.

(30) Foreign Application Priority Data

Oct. 29, 2021 (CN) ......................... 202111277641.8

(51) Int. Cl.

*G06F 15/16* (2006.01)
*H04L 65/1069* (2022.01)
*H04L 65/60* (2022.01)

(52) U.S. Cl.

CPC .......... *H04L 65/60* (2013.01); *H04L 65/1069* (2013.01)

(58) Field of Classification Search

CPC . H04L 65/60; H04L 65/1069; H04L 65/1016; H04L 65/1089; H04L 65/1104

See application file for complete search history.

(56) References Cited

U.S. PATENT DOCUMENTS

| | | | | |
|---|---|---|---|---|
| 10,623,500 | B2 * | 4/2020 | Wang | G06K 7/1417 |
| 10,681,300 | B1 * | 6/2020 | Meccarelli | H04N 7/152 |
| 2009/0249225 | A1 * | 10/2009 | Beswick | H04N 7/17309 715/756 |

(Continued)

FOREIGN PATENT DOCUMENTS

| | | | |
|---|---|---|---|
| CN | 101888519 | A | 11/2010 |
| CN | 108270734 | A | 7/2018 |
| CN | 108933965 | A | 12/2018 |

*Primary Examiner* — Razu A Miah

(57) ABSTRACT

Embodiments of this application provide a desktop sharing method, an apparatus, and a system, and relate to the field of communication technologies, to save a bandwidth resource occupied by desktop sharing and a port resource of a terminal. When the method is used for a call terminal, the method includes: The call terminal establishes a video call media transmission channel, where the video call media transmission channel is used to transmit a call video stream to at least one peer call terminal in a video call service, and the call video stream includes video content shot by the call terminal. The call terminal transmits a desktop video stream to the at least one peer call terminal through the video call media transmission channel, where the desktop video stream includes video content captured by the call terminal from desktop display content.

16 Claims, 17 Drawing Sheets

(56) References Cited

U.S. PATENT DOCUMENTS

| | | | | |
|---|---|---|---|---|
| 2010/0066804 | A1* | 3/2010 | Shoemake | H04N 21/4143 348/14.02 |
| 2012/0054348 | A1* | 3/2012 | Rollgen | H04L 61/2514 709/227 |
| 2012/0287231 | A1* | 11/2012 | Ravi | H04N 23/661 348/E5.009 |
| 2012/0314018 | A1* | 12/2012 | Wengrovitz | H04N 7/181 348/E7.083 |
| 2014/0025847 | A1* | 1/2014 | Choi | H04L 12/2812 710/33 |
| 2014/0040360 | A1* | 2/2014 | Privat | G06F 3/1423 709/204 |
| 2015/0288927 | A1* | 10/2015 | Haginas | H04N 7/147 348/14.03 |
| 2015/0304375 | A1* | 10/2015 | Dhillon | H04L 65/1089 370/259 |
| 2016/0127432 | A1* | 5/2016 | Privat | H04L 65/1069 709/204 |
| 2018/0160074 | A1* | 6/2018 | Mercredi | H04L 65/1083 |
| 2019/0230165 | A1* | 7/2019 | Wang | G06F 3/0481 |
| 2019/0238599 | A1* | 8/2019 | Ingale | H04L 67/1095 |
| 2020/0128209 | A1* | 4/2020 | Stojakovic | H04N 7/147 |
| 2020/0218492 | A1* | 7/2020 | Farivar | G06F 3/1454 |
| 2022/0150313 | A1* | 5/2022 | Borg | H04L 67/53 |
| 2022/0350564 | A1* | 11/2022 | Cao | G06F 3/1454 |

* cited by examiner

DESKTOP SHARING METHOD, APPARATUS, AND SYSTEM FOR SAVING A BANDWIDTH RESOURCE OCCUPIED BY DESKTOP SHARING

CROSS-REFERENCE TO RELATED APPLICATIONS

This application is a continuation of International Patent Application No. PCT/CN2022/090704, filed on Apr. 29, 2022, which claims priority to Chinese Patent Application No. 202111277641.8, filed on Oct. 29, 2021. The disclosures of the aforementioned applications are hereby incorporated by reference in their entireties.

TECHNICAL FIELD

Embodiments of this application relate to the field of communication technologies, and in particular, to a desktop sharing method, an apparatus, and a system.

BACKGROUND

With significant increase of a mobile network bandwidth, in a process in which a user performs a voice/video call with a staff member of a customer service center through terminals, desktop sharing may be performed between the terminal held by the user (where the terminal held by the user is referred to as a user terminal for short) and the terminal held by the staff member of the customer service center (where the terminal held by the staff member of the customer service center is referred to as a customer service terminal for short), so that a problem of the user can be efficiently and quickly resolved.

Currently, when desktop sharing is performed between the user terminal and the customer service terminal, desktop sharing applications (APPs) need to be installed on both the user terminal and the customer service terminal. The desktop sharing APP of the user terminal and the desktop sharing APP of the customer service terminal establish a shared information transmission channel through a desktop sharing server, so that the user terminal and the customer service terminal transmit a desktop video stream through the shared information transmission channel.

In the foregoing method for performing desktop sharing between the user terminal and the customer service terminal through the desktop sharing APPs, the two terminals need to be installed with the APPs and complex operations need to be performed, which has a high skill requirement on persons. In addition, the shared information transmission channel dedicated to transmitting the desktop video stream needs to occupy an additional bandwidth resource, and transmitting the desktop video stream based on the shared information transmission channel also needs to occupy additional port resources of the user terminal and the customer service terminal.

SUMMARY

Embodiments of this application provide a desktop sharing method, an apparatus, and a system, to save a bandwidth resource occupied by desktop sharing and a port resource of a terminal.

To achieve the foregoing objectives, the following technical solutions are used in embodiments of this application.

According to a first aspect, an embodiment of this application provides a desktop sharing method, used for a call terminal. The method includes: The call terminal establishes a video call media transmission channel, where the video call media transmission channel is used to transmit a call video stream to at least one peer call terminal in a video call service, and the call video stream includes video content shot by the call terminal. The call terminal transmits a desktop video stream to the at least one peer call terminal through the video call media transmission channel, where the desktop video stream includes video content captured by the call terminal from desktop display content.

According to the desktop sharing method provided in this embodiment of this application, when the call terminal shares a desktop of the call terminal with the peer call terminal, the call terminal may send the desktop video stream of the call terminal based on an existing video call media transmission channel, without consuming an additional bandwidth resource to establish a shared information transmission channel dedicated to transmitting the desktop video stream, and without occupying additional port resources of terminals (including the call terminal and the peer call terminal). Further, compared with an existing desktop sharing method, in the technical solution provided in this embodiment of this application, desktop sharing APPs do not need to be installed on a user terminal and a customer service terminal. In this way, an operator does not need to perform a complex related operation, and the operator is not required to have a high operation skill.

In an implementation, before the transmitting a desktop video stream to the at least one peer call terminal through the video call media transmission channel, the desktop sharing method provided in this embodiment of this application further includes: The call terminal stops transmitting the call video stream to the at least one peer call terminal through the video call media transmission channel. In this case, the desktop video stream includes only the video content captured from the desktop display content.

In an implementation, the video call media transmission channel includes a video call media transmission channel between the call terminal and a media server, and a video call media transmission channel between each of the at least one peer call terminal and the media server. In other words, the video call media transmission channel is a transmission channel that requires the media server as a medium, that is, an indirect video call media transmission channel. Based on this, that the call terminal transmits a desktop video stream to the at least one peer call terminal through the video call media transmission channel includes: The call terminal transmits the desktop video stream to the media server through the video call media transmission channel between the call terminal and the media server, so that the media server transmits the desktop video stream to the at least one peer call terminal through the video call media transmission channel between each of the at least one peer call terminal and the media server.

In an implementation, the video call media transmission channel includes a video call media transmission channel between the call terminal and each of the at least one peer call terminal, that is, the video call media transmission channel is a direct video call media transmission channel. Based on this, that the call terminal transmits a desktop video stream to the at least one peer call terminal through the video call media transmission channel includes: The call terminal transmits the desktop video stream to the at least one peer call terminal through the video call media transmission channel between the call terminal and each of the at least one peer call terminal.

In an implementation, before that the call terminal transmits a desktop video stream to the at least one peer call terminal through the video call media transmission channel, the desktop sharing method provided in this embodiment of this application further includes: determining that the call terminal has a desktop sharing capability.

In an implementation, the determining that the call terminal has a desktop sharing capability includes: The call terminal receives a session initiation protocol (SIP) message from a control server, where the SIP message includes a desktop sharing request identifier, and the desktop sharing request identifier is used to determine whether the call terminal has the desktop sharing capability. Then, the call terminal sends a response message for the SIP message to the control server, where the response message includes a desktop sharing response identifier, and the desktop sharing response identifier indicates that the call terminal has the desktop sharing capability.

In this embodiment of this application, after the call terminal sends a desktop sharing application, a status of the call terminal may change, and it needs to be determined whether the call terminal whose status changes further has the desktop sharing capability. The desktop sharing method can be continued only when the call terminal has the desktop sharing capability. For example, because a camera is unavailable, or a current network signal is poor, or the call terminal is in a 2G/3G network, and the video call media transmission channel is unavailable, or a user corresponding to the call terminal is inconvenient to answer a video call, or the like, the call terminal does not have the desktop sharing capability in these cases. Therefore, before the call terminal transmits the desktop video stream to the at least one peer call terminal through the video call media transmission channel, it needs to be determined whether the call terminal currently has the desktop sharing capability.

In an implementation, the SIP message further includes session description protocol (SDP) information of the media server, and the response message for the SIP message further includes SDP information of the call terminal. In this way, the desktop sharing request identifier is carried in a header field of the SIP message; or the desktop sharing request identifier is carried in the SDP information of the media server.

In this embodiment of this application, the SDP information of the media server includes address information (for example, an IP address), audio port information, an audio encoding/decoding format, video port information, and a video encoding/decoding format of the media server, and the SDP information of the call terminal includes address information (for example, an IP address), audio port information, an audio encoding/decoding format, video port information, and a video encoding/decoding format of the call terminal.

Optionally, a call initiated by a calling party may be a voice call, or may be a video call. When the initiated call is the voice call, after receiving the desktop sharing application sent by the call terminal, the control server may also perform media resource negotiation based on the SDP information of the media server and the SDP information of the call terminal in the SIP message and the response message for the SIP message, to establish the video call media transmission channel.

Optionally, the desktop sharing identifier is carried in the header field of the SIP message in the following two manners. In a first carrying manner, the desktop sharing identifier (denoted as ds) is carried in a contact extension field in the SIP message. In a second carrying manner, the desktop sharing identifier (ds) is carried in a supported extension field in the SIP message.

Optionally, when the SDP information carries the desktop sharing identifier (ds), video port information for transmitting the video content captured from the desktop display content may be further indicated in an extension field of the SDP information. It may indicate that a video port for transmitting the call video stream is used to transmit the content captured from the desktop display content.

Optionally, the SDP information may also indicate whether the video call is a one-way video call or a two-way video call. The call terminal and the peer call terminal are used as an example. The one-way video call may transmit only a call video stream of the call terminal, and does not transmit a video stream of the peer call terminal. For example, the call terminal sends the video content shot by the call terminal to the peer call terminal, and the video content shot by the call terminal is displayed on the peer call terminal, but the peer call terminal does not shoot video content or video content shot by the peer call terminal is not sent to the call terminal, that is, the video content shot by the peer call terminal is not displayed on the call terminal.

In an implementation, before the transmitting a desktop video stream to the at least one peer call terminal through the video call media transmission channel, the desktop sharing method provided in this embodiment of this application further includes: The call terminal receives transmission channel indication information from the control server, where the transmission channel indication information indicates to transmit the desktop video stream through the video call media transmission channel.

Optionally, the transmission channel indication information may be carried in a SIP message. The SIP message and the SIP message including the desktop sharing request identifier may be a same message, or may be different SIP messages. This is not limited in this embodiment of this application.

The control server may indicate, by using the foregoing explicit indication method (that is, sending the transmission channel indication information), to transmit the desktop video stream through the video call media transmission channel. In some cases, the control server may alternatively indicate, by using an implicit indication method, to transmit the desktop video stream through the video call media transmission channel. For example, the SIP message carries the SDP information of the media server, and the response message for the SIP message carries the SDP information of the call terminal, to negotiate (or indicate) to transmit the desktop video stream through the video call media transmission channel established based on the pair of SDP information (the SDP information of the media server and the SDP information of the customer service call terminal). It should be understood that the video call media transmission channel is originally used to transmit the call video stream.

In an implementation, before the transmitting a desktop video stream to the at least one peer call terminal through the video call media transmission channel, the desktop sharing method provided in this embodiment of this application further includes: The call terminal sends a desktop sharing application to the control server, where the desktop sharing application includes a desktop sharing application identifier, and the desktop sharing application identifier is used to request to share a desktop of the call terminal with the at least one peer call terminal in a process of a video call between the call terminal and the at least one peer call terminal.

Optionally, if the calling party initiates the video call, after a control server in a customer service system responds to a call request sent by the calling party, the control server may trigger the call terminal, the peer call terminal, and the media server to establish the video call media transmission channel.

Optionally, if the calling party initiates the voice call, in a process of performing the voice call between the call terminal and the peer call terminal, after the control server receives the desktop sharing application sent by the call terminal, the control server may trigger the call terminal, the peer call terminal, and the media server to establish the video call media transmission channel.

In an implementation, the desktop video stream further includes the video content shot by the call terminal.

In this embodiment of this application, in a process of performing the desktop sharing method, transmission of the video content shot by the call terminal in an original video call process may not be alternatively stopped, that is, the video content captured from the desktop display content and the video content shot by the call terminal may be transmitted based on the video call media transmission channel.

In an implementation, the call terminal in this embodiment of this application is a customer service call terminal, and the at least a peer call terminal includes at least one user call terminal; or the call terminal is a user call terminal, and the at least one peer call terminal includes at least a customer service call terminal.

According to a second aspect, an embodiment of this application provides a desktop sharing method, used for a control server. The method includes: The control server triggers establishment of a video call media transmission channel, where the video call media transmission channel is used by a call terminal in a video call service to transmit a call video stream to at least one peer call terminal, and the call video stream includes video content shot by the call terminal. The control server sends transmission channel indication information to the call terminal, where the transmission channel indication information indicates to transmit a desktop video stream through the video call media transmission channel, and the desktop video stream includes video content captured by the call terminal from desktop display content.

According to the desktop sharing method provided in this embodiment of this application, the control server may trigger establishment of the video call media transmission channel. When the call terminal shares a desktop of the call terminal with the peer call terminal, the control server may send the transmission channel indication information to the call terminal, to indicate the call terminal to send the desktop video stream of the call terminal based on an existing video call media transmission channel. In this way, there is no need to: consume an additional bandwidth resource to establish a shared information transmission channel dedicated to transmitting the desktop video stream, and occupy additional port resources of terminals (including the call terminal and the peer call terminal).

Further, compared with an existing desktop sharing method, in the technical solution provided in this embodiment of this application, desktop sharing APPs do not need to be installed on a user terminal and a customer service terminal. In this way, an operator does not need to perform a complex related operation, and the operator is not required to have a high operation skill.

In an implementation, the video call media transmission channel includes a video call media transmission channel between the call terminal and a media server, and a video call media transmission channel between each of the at least one peer call terminal and the media server; or the video call media transmission channel includes a video call media transmission channel between the call terminal and each of the at least one peer call terminal.

In an implementation, before the control server sends the transmission channel indication information to the call terminal, the desktop sharing method provided in this embodiment of this application further includes: determining that the call terminal has a desktop sharing capability.

In an implementation, the determining that the call terminal has a desktop sharing capability includes: The control server sends a SIP message to the call terminal, where the SIP message includes a desktop sharing request identifier, and the desktop sharing request identifier is used to determine whether the call terminal has the desktop sharing capability. Then, the control server receives a response message for the SIP message from the call terminal, where the response message includes a desktop sharing response identifier, and the desktop sharing response identifier indicates that the call terminal has the desktop sharing capability.

In an implementation, the SIP message further includes SDP information of the media server, and the response message for the SIP message further includes SDP information of the call terminal. In this way, the desktop sharing request identifier is carried in a header field of the SIP message; or the desktop sharing request identifier is carried in the SDP information of the media server.

In an implementation, before the control server sends the transmission channel indication information to the call terminal, the desktop sharing method provided in this embodiment of this application further includes: The control server receives a desktop sharing application sent by the call terminal, where the desktop sharing application includes a desktop sharing application identifier, and the desktop sharing application identifier is used to request to share a desktop of the call terminal with the at least one peer call terminal in a process of a video call between the call terminal and the at least one peer call terminal.

In an implementation, the call terminal in this embodiment of this application is a customer service call terminal, and the at least a peer call terminal includes at least one user call terminal; or the call terminal is a user call terminal, and the at least one peer call terminal includes at least a customer service call terminal.

According to a third aspect, an embodiment of this application provides a desktop sharing method, used for a media server. The method includes: The media server establishes a first video call media transmission channel and a second video call media transmission channel, where the first video call media transmission channel is a video call media transmission channel between the media server and a call terminal, the second video call media transmission channel is a video call media transmission channel between the media server and each of at least one peer call terminal, the first video call media transmission channel and the second video call media transmission channel are used to transmit a call video stream to the at least one peer call terminal in a video call service, and the call video stream includes video content shot by the call terminal. Then, the media server receives a desktop video stream from the call terminal through the first video call media transmission channel, where the desktop video stream includes video content captured by the call terminal from desktop display content. The media server transmits the desktop video stream to the at least one peer call terminal through the second video call media transmission channel.

According to the desktop sharing method provided in this embodiment of this application, when the call terminal shares a desktop of the call terminal with the peer call terminal, the media server may transmit the desktop video stream through existing video call media transmission channels (including the first video call media transmission channel and the second video call media transmission channel). In this way, there is no need to: consume an additional bandwidth resource to establish a shared information transmission channel dedicated to transmitting the desktop video stream, and occupy additional port resources of terminals (including the call terminal and the peer call terminal).

Further, compared with an existing desktop sharing method, in the technical solution provided in this embodiment of this application, desktop sharing APPs do not need to be installed on a user terminal and a customer service terminal. In this way, an operator does not need to perform a complex related operation, and the operator is not required to have a high operation skill.

In an implementation, before the media server receives the desktop video stream from the call terminal through the first video call media transmission channel, the desktop sharing method provided in this embodiment of this application further includes: The media server stops receiving the call video stream from the call terminal through the first video call media transmission channel.

In an implementation, after the receiving a desktop video stream from the call terminal through the first video call media transmission channel, before the transmitting the desktop video stream to the at least one peer call terminal through the second video call media transmission channel, the desktop sharing method provided in this embodiment of this application further includes: The media server transcodes the desktop video stream, where an encoding/decoding format of a transcoded desktop video stream is the same as an encoding/decoding format of the at least one peer call terminal.

In this embodiment of this application, when a video encoding/decoding format of the call terminal is different from a video encoding/decoding format of the peer call terminal, the media server may transcode the received desktop video stream. For example, it is assumed that the video encoding/decoding format of the call terminal is a first encoding/decoding format and the video encoding/decoding format of the peer call terminal is a second encoding/decoding format. The call terminal encodes the desktop stream by using the first encoding/decoding format and then sends an encoded desktop stream to the media server. The media server decodes the desktop video stream by using the first encoding/decoding format, encodes the desktop video stream by using the second encoding/decoding format, and then sends the desktop video stream encoded by using the second encoding/decoding format to the peer call terminal.

In an implementation, the desktop video stream further includes the video content shot by the call terminal. In this way, before the transmitting the desktop video stream to the at least one peer call terminal through the second video call media transmission channel, the desktop sharing method provided in this embodiment of this application further includes: The media server performs hybrid encoding processing on the video content shot by the call terminal and the video content captured by the call terminal from the desktop display content, to obtain the desktop video stream.

In this embodiment of this application, after performing hybrid encoding on the video content shot by the call terminal and the video content captured by the call terminal from the desktop display content, the media server obtains the desktop video stream that includes the video content shot by the call terminal and the video content captured from the desktop display content, and then sends the desktop video stream to the peer call terminal through the second video call media transmission channel. In this way, a desktop of the call terminal and a picture shot by the call terminal may be displayed on the peer call terminal. For example, the picture shot by the call terminal is displayed in a first area of a display screen of the peer call terminal, and the desktop of the call terminal is displayed in a second area of the display screen of the peer call terminal.

In an implementation, the call terminal in this embodiment of this application is a customer service call terminal, and the at least a peer call terminal includes at least one user call terminal; or the call terminal is a user call terminal, and the at least one peer call terminal includes at least a customer service call terminal.

According to a fourth aspect, an embodiment of this application provides a call terminal, including a processing module and a sending module. The processing module is configured to establish a video call media transmission channel, where the video call media transmission channel is used to transmit a call video stream to at least one peer call terminal in a video call service, and the call video stream includes video content shot by the call terminal. The sending module is configured to transmit a desktop video stream to the at least one peer call terminal through the video call media transmission channel, where the desktop video stream includes video content captured by the call terminal from desktop display content.

In an implementation, the processing module is further configured to control the sending module to stop transmitting the call video stream to the at least one peer call terminal through the video call media transmission channel.

In an implementation, the video call media transmission channel includes a video call media transmission channel between the call terminal and a media server, and a video call media transmission channel between each of the at least one peer call terminal and the media server. Based on this, the sending module is configured to transmit the desktop video stream to the media server through the video call media transmission channel between the call terminal and the media server, so that the media server transmits the desktop video stream to the at least one peer call terminal through the video call media transmission channel between each of the at least one peer call terminal and the media server.

In an implementation, the video call media transmission channel includes a video call media transmission channel between the call terminal and each of the at least one peer call terminal. Based on this, the sending module is configured to transmit the desktop video stream to the at least one peer call terminal through the video call media transmission channel between the call terminal and each of the at least one peer call terminal.

In an implementation, the processing module is further configured to determine that the call terminal has a desktop sharing capability.

In an implementation, the call terminal provided in this embodiment of this application further includes a receiving module. The processing module is configured to control the receiving module to receive a SIP message from a control server, where the SIP message includes a desktop sharing request identifier, and the desktop sharing request identifier is used to determine whether the call terminal has the desktop sharing capability; and control the sending module to send a response message for the SIP message to the control server, where the response message includes a desktop sharing response identifier, and the desktop sharing response identifier indicates that the call terminal has the desktop sharing capability.

In an implementation, the SIP message further includes SDP information of the media server, and the response message for the SIP message further includes SDP information of the call terminal. In this way, the desktop sharing request identifier is carried in a header field of the SIP message; or the desktop sharing request identifier is carried in the SDP information of the media server.

In an implementation, the receiving module is further configured to receive transmission channel indication information from the control server, where the transmission channel indication information indicates to transmit the desktop video stream through the video call media transmission channel.

In an implementation, the sending module is further configured to send a desktop sharing application to the control server, where the desktop sharing application includes a desktop sharing application identifier, and the desktop sharing application identifier is used to request to share a desktop of the call terminal with the at least one peer call terminal in a process of a video call between the call terminal and the at least one peer call terminal.

In an implementation, the desktop video stream further includes the video content shot by the call terminal.

In an implementation, the call terminal in this embodiment of this application is a customer service call terminal, and the at least a peer call terminal includes at least one user call terminal; or the call terminal is a user call terminal, and the at least one peer call terminal includes at least a customer service call terminal.

According to a fifth aspect, an embodiment of this application provides a control server, including a processing module and a sending module. The processing module is configured to trigger establishment of a video call media transmission channel, where the video call media transmission channel is used by a call terminal in a video call service to transmit a call video stream to at least one peer call terminal, and the call video stream includes video content shot by the call terminal. The sending module is configured to send transmission channel indication information to the call terminal, where the transmission channel indication information indicates to transmit a desktop video stream through the video call media transmission channel, and the desktop video stream includes video content captured by the call terminal from desktop display content.

In an implementation, the video call media transmission channel includes a video call media transmission channel between the call terminal and a media server, and a video call media transmission channel between each of the at least one peer call terminal and the media server; or the video call media transmission channel includes a video call media transmission channel between the call terminal and each of the at least one peer call terminal.

In an implementation, the processing module is further configured to determine that the call terminal has a desktop sharing capability.

In an implementation, the control server provided in this embodiment of this application further includes a receiving module. The processing module is configured to control the sending module to send a SIP message to the call terminal, where the SIP message includes a desktop sharing request identifier, and the desktop sharing request identifier is used to determine whether the call terminal has the desktop sharing capability; and control the receiving module to receive a response message for the SIP message from the call terminal, where the response message includes a desktop sharing response identifier, and the desktop sharing response identifier indicates that the call terminal has the desktop sharing capability.

In an implementation, the SIP message further includes SDP information of the media server, and the response message for the SIP message further includes SDP information of the call terminal. In this way, the desktop sharing request identifier is carried in a header field of the SIP message; or the desktop sharing request identifier is carried in the SDP information of the media server.

In an implementation, the receiving module is further configured to receive a desktop sharing application sent by the call terminal, where the desktop sharing application includes a desktop sharing application identifier, and the desktop sharing application identifier is used to request to share a desktop of the call terminal with the at least one peer call terminal in a process of a video call between the call terminal and the at least one peer call terminal.

In an implementation, the call terminal in this embodiment of this application is a customer service call terminal, and the at least a peer call terminal includes at least one user call terminal; or the call terminal is a user call terminal, and the at least one peer call terminal includes at least a customer service call terminal.

According to a sixth aspect, an embodiment of this application provides a media server, including a processing module, a receiving module, and a sending module. The processing module is configured to establish a first video call media transmission channel and a second video call media transmission channel, where the first video call media transmission channel is a video call media transmission channel between the media server and a call terminal, the second video call media transmission channel is a video call media transmission channel between the media server and each of at least one peer call terminal, the first video call media transmission channel and the second video call media transmission channel are used to transmit a call video stream to the at least one peer call terminal in a video call service, and the call video stream includes video content shot by the call terminal. The receiving module is configured to receive a desktop video stream from the call terminal through the first video call media transmission channel, where the desktop video stream includes video content captured by the call terminal from desktop display content. The sending module is configured to transmit the desktop video stream to the at least one peer call terminal through the second video call media transmission channel.

In an implementation, the processing module is further configured to control the receiving module to stop receiving the call video stream from the call terminal through the first video call media transmission channel.

In an implementation, the media server provided in this embodiment of this application further includes an encoding/decoding module. The encoding/decoding module is configured to transcode the desktop video stream, where an encoding/decoding format of a transcoded desktop video stream is the same as an encoding/decoding format of the at least one peer call terminal.

In an implementation, the desktop video stream further includes the video content shot by the call terminal. In this way, the encoding/decoding module is further configured to perform hybrid encoding processing on the video content shot by the call terminal and the video content captured by the call terminal from the desktop display content, to obtain the desktop video stream.

In an implementation, the call terminal in this embodiment of this application is a customer service call terminal, and the at least a peer call terminal includes at least one user call terminal; or the call terminal is a user call terminal, and the at least one peer call terminal includes at least a customer service call terminal.

According to a seventh aspect, an embodiment of this application provides a call terminal, including a memory and at least one processor connected to the memory, where the memory is configured to store computer program code, the computer program code includes computer instructions, and when the computer instructions are executed by the at least one processor, the call terminal is enabled to perform the method according to any one of the first aspect and the implementations of the first aspect.

According to an eighth aspect, an embodiment of this application provides a control server, including a memory and at least one processor connected to the memory, where the memory is configured to store computer program code, the computer program code includes computer instructions, and when the computer instructions are executed by the at least one processor, the control server is enabled to perform the method according to any one of the second aspect and the implementations of the second aspect.

According to a ninth aspect, an embodiment of this application provides a media server, including a memory and at least one processor connected to the memory, where the memory is configured to store computer program code, the computer program code includes computer instructions, and when the computer instructions are executed by the at least one processor, the media server is enabled to perform the method according to any one of the third aspect and the implementations of the third aspect.

According to a tenth aspect, an embodiment of this application provides a computer-readable storage medium, including computer instructions. When the computer instructions are run on a call terminal, the call terminal is enabled to perform the method according to any one of the first aspect and the implementations of the first aspect.

According to an eleventh aspect, an embodiment of this application provides a computer-readable storage medium, including computer instructions. When the computer instructions are run on a control server, the control server is enabled to perform the method according to any one of the second aspect and the implementations of the second aspect.

According to a twelfth aspect, an embodiment of this application provides a computer-readable storage medium, including computer instructions. When the computer instructions are run on a media server, the media server is enabled to perform the method according to any one of the third aspect and the implementations of the third aspect.

According to a thirteenth aspect, an embodiment of this application provides a computer program product. When the computer program product runs on a computer, the method according to any one of the first aspect and the implementations of the first aspect is performed.

According to a fourteenth aspect, an embodiment of this application provides a computer program product. When the computer program product runs on a computer, the method according to any one of the second aspect and the implementations of the second aspect is performed.

According to a fifteenth aspect, an embodiment of this application provides a computer program product. When the computer program product runs on a computer, the method according to any one of the third aspect and the implementations of the third aspect is performed.

According to a sixteenth aspect, an embodiment of this application provides a chip, including a memory and a processor. The memory is configured to store computer instructions. The processor is configured to invoke the computer instructions from the memory and run the computer instructions, so that a call terminal performs the method according to any one of the first aspect and the implementations of the first aspect.

According to a seventeenth aspect, an embodiment of this application provides a chip, including a memory and a processor. The memory is configured to store computer instructions. The processor is configured to invoke the computer instructions from the memory and run the computer instructions, so that a control server performs the method according to any one of the second aspect and the implementations of the second aspect.

According to an eighteenth aspect, an embodiment of this application provides a chip, including a memory and a processor. The memory is configured to store computer instructions. The processor is configured to invoke the computer instructions from the memory and run the computer instructions, so that a media server performs the method according to any one of the third aspect and the implementations of the third aspect.

According to a nineteenth aspect, an embodiment of this application provides a communication system, including at least one call terminal, a control server, and a media server. The at least one call terminal performs the method according to any one of the first aspect and the implementations of the first aspect, the control server performs the method according to any one of the second aspect and the implementations of the second aspect, and the media server performs the method according to any one of the third aspect and the implementations of the third aspect.

It should be understood that for beneficial effects achieved by the technical solutions in the fourth aspect to the nineteenth aspect and the corresponding implementations in embodiments of this application, refer to the foregoing technical effects in the first aspect to the third aspect and the corresponding implementations. Details are not described herein again.

DESCRIPTION OF EMBODIMENTS

Figure 1:
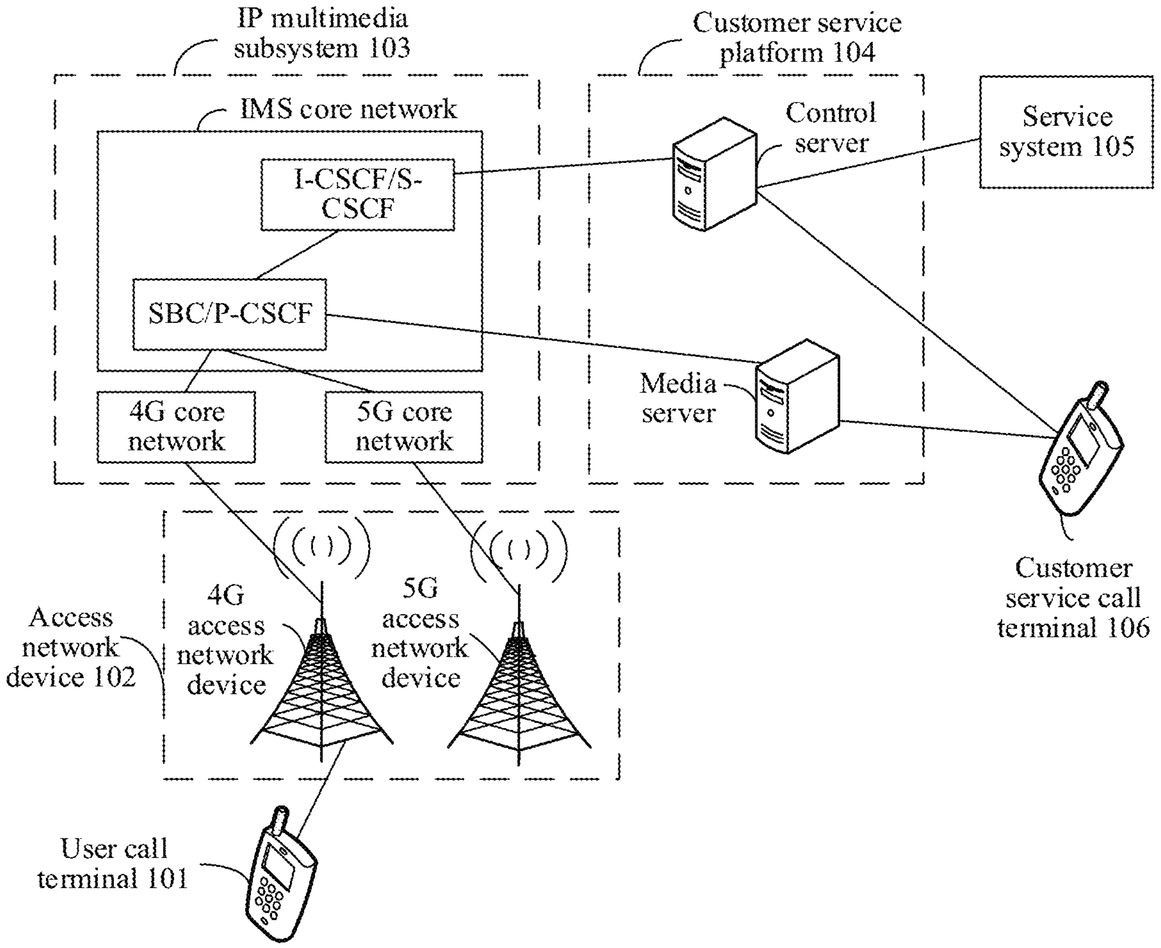
FIG. 1 is a diagram of an architecture of a communication system in a service scenario of a manual customer service according to an embodiment of this application.

The term "and/or" in this specification describes only an association relationship between associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first video call media transmission channel, a second video call media transmission channel, and the like are used to distinguish between different video call media transmission channels, but are not used to describe a particular order of the video call media transmission channels.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the descriptions of embodiments of this application, unless otherwise stated, "a plurality of" means two or more than two. For example, a plurality of terminals mean two or more terminals.

Currently, based on a mobile network, a voice call or a video call between users may be implemented through terminals. A voice call is used as an example. After a call connection is established between a terminal 1 held by a user 1 and a terminal 2 held by a user 2, the terminal 1 collects a voice of the user 1, and sends the collected voice to the terminal 2, and the terminal 2 collects a voice of the user 2, and sends the collected voice to the terminal 1, to implement a voice call between the user 1 and the user 2.

It may be understood that, in a scenario of a call between terminals, one of the terminals may be referred to as a call terminal, and a peer end having the call with the call terminal is referred to as a peer call terminal. For example, if the terminal 1 is a call terminal, the terminal 2 is a peer call terminal. Optionally, one call terminal may have a plurality of peer call terminals. For example, three terminals (for example, a terminal 1, a terminal 2, and a terminal 3) perform a three-party session, where the terminal 1 is a call terminal, and peer ends of the terminal 1, that is, the terminal 2 and the terminal 3, are both peer call terminals.

As a mobile network bandwidth increases greatly, the mobile network may also support desktop sharing between terminals. The following uses two call terminals (that is, one call terminal and one peer call terminal) as an example to briefly describe existing technical solutions respectively in scenarios in which the call terminal performs a voice call, a video call, and desktop sharing with the peer call terminal.

When the call terminal performs a voice call with the peer call terminal, a media stream transmitted between the call terminal and the peer call terminal is a voice stream. After the call terminal establishes a voice call media transmission channel (which may also be referred to as a voice stream transmission channel for short) with the peer call terminal, the call terminal and the peer call terminal may transmit the voice stream based on the voice stream transmission channel. For example, the call terminal sends, to the peer call terminal through the voice stream transmission channel, a voice stream that is of a user corresponding to the call terminal and that is collected by a microphone, and the peer call terminal sends, to the call terminal through the voice stream transmission channel, a voice stream that is of a peer user corresponding to the peer call terminal and that is collected by a microphone.

When the call terminal performs a video call with the peer call terminal, media streams transmitted between the call terminal and the peer call terminal include a voice stream and a video stream, and transmission channels of the voice stream and the video stream are different. After a voice call media transmission channel (that is, a voice stream transmission channel) and a video call media transmission channel (which may be referred to as a video stream transmission channel for short) are established, the call terminal and the peer call terminal may transmit the voice stream based on the voice stream transmission channel, and the call terminal and the peer call terminal may transmit the video stream based on the video stream transmission channel. For example, the call terminal sends, to the peer call terminal through the voice stream transmission channel, a voice stream that is of a user corresponding to the call terminal and that is collected by a microphone, and the peer call terminal sends, to the call terminal through the voice stream transmission channel, a voice stream that is of a peer user corresponding to the peer call terminal and that is collected by a microphone. The call terminal sends, to the peer call terminal through the video stream transmission channel, a video stream that is of the user corresponding to the call terminal and that is collected by a camera, and the peer call terminal sends, to the call terminal through the video stream transmission channel, a video stream that is of the peer user corresponding to the peer call terminal and that is collected by a camera.

When the call terminal performs desktop sharing with the peer call terminal, a media stream transmitted between the call terminal and the peer call terminal is a desktop video stream of the call terminal or a desktop video stream of the peer call terminal. Currently, when the call terminal performs desktop sharing with the peer call terminal, desktop sharing applications (APPs) need to be installed on both the call terminal and the peer call terminal. The desktop sharing APP of the call terminal and the desktop sharing APP of the peer call terminal establish a shared information transmission channel through a desktop sharing server, so that the call terminal and the peer call terminal transmit the desktop video stream through the shared information transmission channel. For example, in one case, the call terminal sends the desktop video stream of the call terminal to the peer call terminal through the shared information transmission channel. In this way, the peer call terminal may share a desktop of the call terminal. In another case, the peer call terminal sends the desktop video stream of the peer call terminal to the call terminal through the shared information transmission channel. In this way, the call terminal may share a desktop of the peer call terminal.

It should be noted that a transmission channel (that is, the foregoing shared information transmission channel) used to transmit a desktop video stream of a terminal is a transmission channel dedicated to desktop sharing, and the transmission channel is different from the voice stream transmission channel and the video stream transmission channel.

It should be understood that, if desktop sharing needs to be performed between the call terminal and the peer call terminal in a process of a call between the call terminal and the peer call terminal, an additional bandwidth resource needs to be consumed to establish the shared information transmission channel used to transmit the desktop video stream, and the call terminal and the peer call terminal also need to use an additional port to send or receive the desktop video stream. For example, if desktop sharing is implemented in a process of the voice call between the call terminal and the peer call terminal, the voice stream is transmitted between the call terminal and the peer call terminal based on the voice stream transmission channel, and the desktop video stream is transmitted between the call terminal and the peer call terminal based on the established shared information transmission channel. For another example, if desktop sharing is implemented in a process of the video call between the call terminal and the peer call terminal, the video stream collected by the camera is transmitted between the call terminal and the peer call terminal based on the video stream transmission channel, and the desktop video stream is transmitted between the call terminal and the peer call terminal based on the established shared information transmission channel. In conclusion, establishing the shared information transmission channel dedicated to desktop sharing needs to occupy the additional bandwidth resource, and this desktop sharing method needs to occupy additional port resources of the terminals.

For a problem in a conventional technology that establishing the shared information transmission channel dedicated to desktop sharing needs to occupy the additional bandwidth resource and the additional port resources of the terminals, embodiments of this application provide a desktop sharing method, an apparatus, and a system. The desktop sharing method may be used in a process of a video call between terminals. After a control server in a communication system triggers establishment of a video call media transmission channel, a call terminal, at least one peer call terminal, and the control server interact to establish the video call media transmission channel, where the video call media transmission channel is used by the call terminal in a video call service to transmit a call video stream to the at least one peer call terminal, and the call video stream includes video content shot by the call terminal. Then, the call terminal may transmit a desktop video stream to the at least one peer call terminal through the video call media transmission channel, where the desktop video stream includes video content captured by the call terminal from desktop display content. According to the technical solution provided in embodiments of this application, when the call terminal shares a desktop of the call terminal with the peer call terminal, the call terminal may send the desktop video stream of the call terminal based on an existing video call media transmission channel, without consuming the additional bandwidth resource to establish the shared information transmission channel dedicated to transmitting the desktop video stream, and without occupying the additional port resources of the terminals (including the call terminal and the peer call terminal).

Further, compared with an existing desktop sharing method, in the technical solution provided in this embodiment of this application, desktop sharing APPs do not need to be installed on a user terminal and a customer service terminal. In this way, an operator does not need to perform a complex related operation, and the operator is not required to have a high operation skill.

Optionally, the desktop sharing method provided in embodiments of this application may be used in a process of a call between two call terminals, or may be used in a process of a call among a plurality of call terminals.

Optionally, the desktop sharing method provided in embodiments of this application may be used in a video conference scenario, a service scenario of a manual customer service, and the like. The service scenario of the manual customer service is a scenario in which a user has a call with a staff member of a customer service center in a process of a call between the user and the customer service center. In the following embodiments, the customer service center may be referred to as a customer service for short, and the staff member of the customer service center may be referred to as a customer service member for short. The service scenario of the manual customer service is used as an example. A user calls a customer service system through a call terminal (which may be referred to as a user call terminal for short) held by the user. When the call is transferred to a manual service, after a customer service member answers the call, in a process of the call between a call terminal (which may be referred to as a customer service call terminal for short) held by the customer service member and the user call terminal, the customer service call terminal may share a desktop of the customer service call terminal with the user call terminal. In this way, for a question raised by the user to the customer service member, the customer service member may perform an operation (for example, demonstration or guidance) on the customer service call terminal, and the user may view the desktop of the customer service call terminal on the user call terminal, so that the question of the user can be efficiently resolved through desktop sharing. Alternatively, in a process of the call between the customer service call terminal and the user call terminal, the user call terminal may share a desktop of the user call terminal with the customer service call terminal. In this way, for a question raised by the user to the customer service member, the customer service member may provide guidance for the user with reference to the desktop of the user, so that the question of the user can be efficiently resolved.

It should be noted that, in embodiments of this application, the service scenario of the manual customer service is used as an example to describe the desktop sharing method provided in embodiments of this application. It may be understood that, in the service scenario of the manual customer service, after the user call terminal initiates the call, and the customer service call terminal answers the call, the user call terminal and the customer service call terminal perform desktop sharing in the call process.

Optionally, in embodiments of this application, the call initiated by the user call terminal may be a voice call, or may be a video call. It should be noted that, when the user initiates a voice call, after the customer service call terminal answers the voice call, a voice stream transmission channel is first established through media resource negotiation. If desktop sharing is performed in a voice call process, a video stream transmission channel further needs to be established through media resource renegotiation, to convert the voice call to a video call. Then, a desktop video stream of the user call terminal or a desktop video stream of the customer service terminal is transmitted based on the video stream transmission channel corresponding to the video call. When the user initiates a video call, after the customer service terminal answers the video call, a video stream transmission channel is established through media resource negotiation, and then a desktop video stream of the user call terminal or a desktop video stream of the customer service call terminal is transmitted based on the video stream transmission channel.

A communication system corresponding to the service scenario of the manual customer service may be considered as a conference control system. The communication system relates to an access network, an IP multimedia subsystem (that is, an IMS, including a 4G/5G core network and an IMS core network), a customer service platform (which may also be referred to as a customer service system), a service system, and the like. The following describes an architecture of a communication system in a service scenario of a manual customer service. As shown in FIG. 1, the communication system includes: a user call terminal 101, an access network device 102, an IP multimedia subsystem 103, a customer service platform 104, a service system 105, and a customer service call terminal 106. The IP multimedia subsystem 103 includes a core network (which may be a 4G core network and/or a 5G core network) and an IMS core network. It should be understood that the 4G core network includes a gateway device (for example, an S-GW and a P-GW), the 5G core network includes a user plane function (UPF), a mobility management function (AMF), and the like, and the IMS core network includes a session border controller SBC, a proxy-call session control function P-CSCF, an interrogating call session control function I-CSCF, and a serving call session control function S-CSCF. The customer service platform 104 includes a control server (also referred to as a signaling server) and a media server.

The SBC is configured to provide secure access and media processing.

The P-CSCF is an entry node for the user call terminal to access the IMS core network and is mainly responsible for signaling and message proxy.

The I-CSCF is a unified initial entry node of the IMS core network and is responsible for assigning and querying an S-CSCF for user registration.

The S-CSCF is a central node of the IMS core network and is mainly used for subscriber registration, authentication control, session routing, service triggering control, and session status information maintenance.

The control server is responsible for negotiating and processing signaling, and controlling the user call terminal and the customer service call terminal to join or exit a call.

The media server is responsible for audio and video processing and playing, call site applying and releasing, audio encoding/decoding, video encoding/decoding, and desktop video stream processing.

It should be understood that the control server may control and manage the media server.

The service system is responsible for determining and triggering different service procedures based on a calling (for example, the user call terminal) number and a called number. Different services may include but are not limited to a video call, a video advertisement, desktop sharing, an enterprise video show, and the like.

Figure 2:
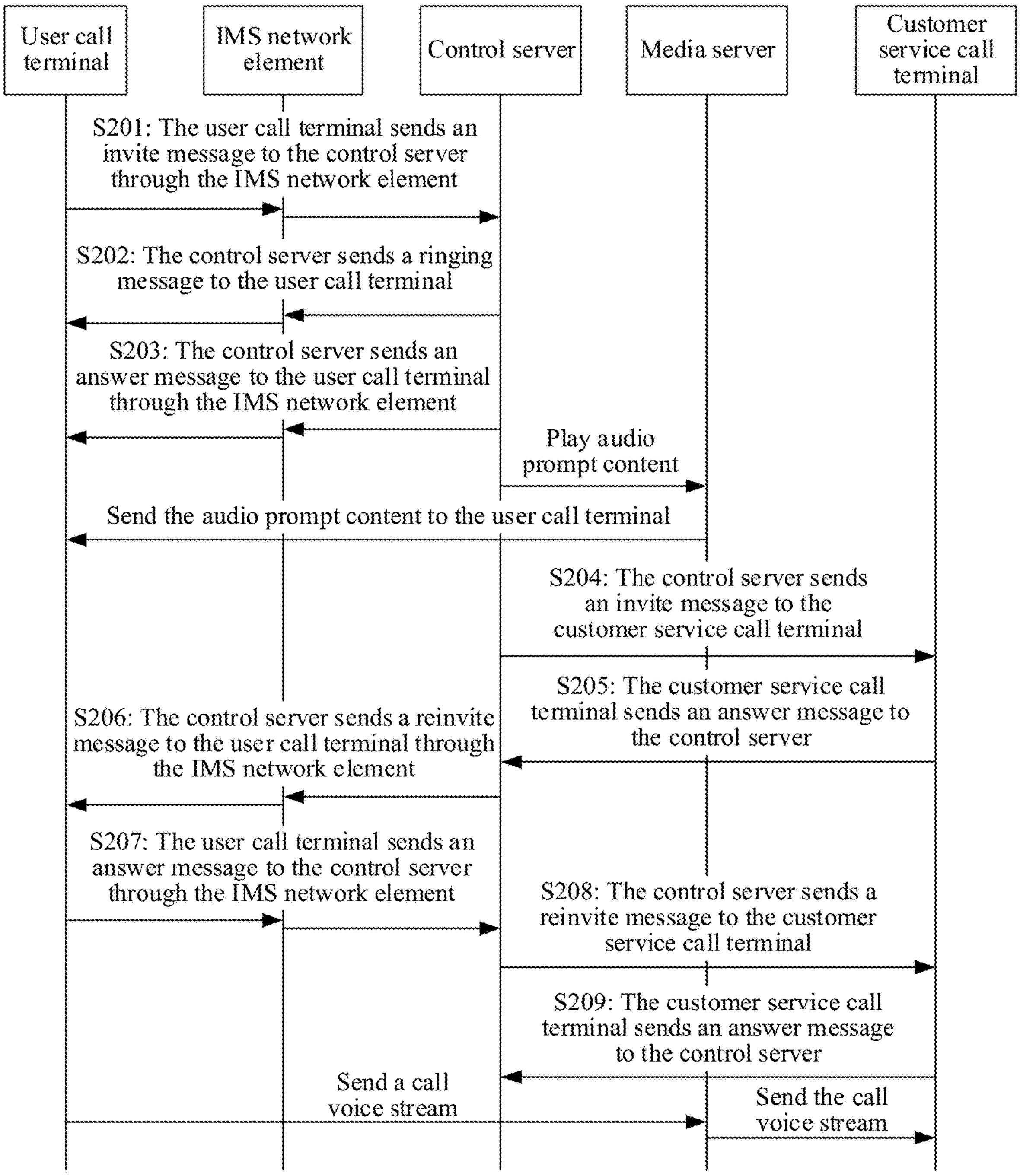
FIG. 2 is a flowchart of a voice call according to an embodiment of this application.

With reference to the architecture of the communication system shown in FIG. 1, on a basis that a user call terminal accesses an access network and establishes a session through a 4G core network or a 5G core network and an IMS core network, a voice call process is described by using an example in which a customer service call terminal and the user call terminal perform a voice call, to facilitate understanding of a voice call process in a service scenario of a manual customer service. Refer to FIG. 2. A voice call process includes the following steps.

S201: A user call terminal sends an invite message to a control server through an IMS network element.

With reference to the diagram of the architecture of the communication system shown in FIG. 1, an IMS includes a network element (including a gateway device/a user plane function network element) of a 4G/5G core network, an SBC/P-CSCF network element, and an I-CSCF/S-CSCF network element of an IMS core network. In this embodiment of this application, these network elements in the IMS may be collectively referred to as IMS network elements. That a user call terminal sends an invite message to a control server through an IMS network element includes: The user call terminal sends the invite message to the control server through the network element of the 4G/5G core network, the SBC/P-CSCF network element, and the I-CSCF/S-CSCF network element in sequence based on the diagram of the architecture shown in FIG. 1. It should be noted that the IMS network element is configured to transparently transmit a message between the user call terminal and the control server, and does not process the message.

It should be noted that, in the following embodiments, a message or information sent or received through the IMS network element is similar to the invite message transmitted through the IMS network element in S201, and the IMS network element is configured to transparently transmit the message or the information. This is not described repeatedly in the following embodiments.

It should be understood that, after a user dials an access number (which may be understood as a phone number of a customer service system) of a customer service through the user call terminal, the user call terminal performs S201. For example, the customer service may be a customer service of a communication operator, a customer service of an internet operator, or the like. A type of the customer service is not limited in this application.

It should be noted that a customer service call terminal in this embodiment of this application is a call terminal corresponding to a customer service member in the customer service system, and the customer service call terminal is a part of the customer service system. It may be understood that the user calls the customer service system through the user call terminal, and after the customer service system answers the call, the control server in a customer service platform notifies a media server to play audio prompt content related to a user service, to prompt the user to select a corresponding service based on an actual requirement. When the user selects a manual service, the control server in the customer service system continues to call the customer service call terminal, which is understood with reference to related steps in the following embodiment.

In this embodiment of this application, the user call terminal sends the invite message through a session initiation protocol (SIP), or it may be understood that the invite message is sent through a SIP message, where the invite message carries session description protocol (SDP) information of the user call terminal, the SDP information includes address information, audio port information, and an audio encoding/decoding format of the user call terminal, and the SDP information is used to perform media resource negotiation with the control server, to establish a voice call media transmission channel that is between the user call terminal and the media server and that is used to transmit a call voice stream. In this embodiment of this application, address information of a device may be an IP address of the device.

S202: The control server sends a ringing message to the user call terminal.

The ringing message indicates that a customer service phone dialed by the user is being connected. In this case, the user call terminal is in a ringing state of waiting for an answer of the customer service system (that is, off-hook). The ringing message may be an 18* series message, for example, a 181 message (that is, call being forwarded, indicating that a call is being forwarded) or a 183 message (prompting a progress of establishing a session). The ringing message carries SDP information of the media server, and an IP address, audio port information, and an audio encoding/decoding format of the media server. It may be understood that the media server is managed by the control server, and the control server stores the SDP information of the media server. Therefore, the control server may send the SDP information of the media server to the user call terminal. The SDP information is used to perform media resource negotiation with the user call terminal, to establish the voice call media transmission channel that is between the user call terminal and the media server and that is used to transmit the call voice stream.

S203: The control server sends an answer message to the user call terminal through the IMS network element.

It should be understood that, after the control server sends the ringing message to the user call terminal, the user call terminal waits for an answer of the customer service system (that is, waiting for a connection). In this process, the user may hear a waiting tone of "beep . . . beep . . . ", or may hear a ring back tone. After the customer service system answers, the call is connected in this case, and the control server performs S203.

Similarly, the IMS network element is configured to transparently transmit the answer message.

In this embodiment of this application, after the customer service system answers the call of the user call terminal, the control server may send an instruction to the media server, to instruct the media server to play the audio prompt content related to the user service, so that the media server sends the audio prompt content to the user call terminal based on the established voice call media transmission channel, where the audio prompt content may prompt the user to select different service content based on requirements. For example, if the voice call is a voice call in a scenario in which a user calls a communication operator, the audio prompt content may include:

pressing "1" to query a call fee and traffic, pressing "2" for a broadband service, pressing "3" for a recharge service, pressing "4" for service query and handling, pressing "5" for a password service, pressing "6" for an enterprise service, pressing "0" for a manual service, and the like. Optionally, the audio prompt content may further include some advertisements, publicity, and other content. The audio prompt content is related to an application scenario, and is not limited in this application.

When the user performs an operation under the prompt of the audio prompt content and selects the manual service, after the media server detects the operation of selecting the manual service, the media server notifies the control server of a selection result of the user, and then the control server allocates a customer service member to the user (that is, selects a corresponding customer service call terminal for the user call terminal). Then, the control server performs S204.

S204: The control server sends an invite message to the customer service call terminal.

The invite message is used for a voice call between the customer service call terminal and the user call terminal, the invite message includes the SDP information of the media server, and the SDP information of the media server includes the IP address, the audio port information, and the audio encoding/decoding format of the media server. The SDP information is used to perform media resource negotiation with the customer service call terminal, to establish a voice call media transmission channel that is between the customer service call terminal and the media server and that is used to transmit a call voice stream.

S205: The customer service call terminal sends an answer message to the control server.

After the customer service call terminal sends the answer message, the customer service call terminal joins the call with the user call terminal, where the answer message includes SDP information of the customer service call terminal, and the SDP information of the customer service call terminal includes an IP address, audio port information, and an audio encoding/decoding format of the customer service call terminal. The SDP information is used to perform media resource negotiation with the control server, to establish the voice call media transmission channel that is between the customer service call terminal and the media server and that is used to transmit the call voice stream.

It should be understood that, because the customer service call terminal is a new device having the call with the user call terminal in the customer service system, in a subsequent procedure, to implement communication between the user call terminal and the customer service call terminal, media resource negotiation needs to be performed again, that is, the control server performs media resource renegotiation with the user call terminal (refer to S206 and S207), and the control server performs media resource renegotiation with the customer service call terminal (refer to S208 and S209). A voice stream transmission channel (that is, a voice call media transmission channel) may be established through the media resource renegotiation. It should be noted that the voice call media transmission channel established through S206 to S209 is a transmission channel that requires the media server as a medium, that is, an indirect voice call media transmission channel, where the voice call media transmission channel includes a voice call media transmission channel between the user call terminal and the media server, and a voice call media transmission channel between the media server and the customer service call terminal.

S206: The control server sends a reinvite message to the user call terminal through the IMS network element.

The reinvite message is used to perform media resource renegotiation with the user call terminal, to establish the voice call media transmission channel between the user call terminal and the media server, the reinvite message includes the SDP information of the media server, and the SDP information of the media server includes the IP address, the audio port information, and the audio encoding/decoding format of the media server. After the control server interacts with the media server to query (or obtain) the SDP information of the media server, the control server includes the SDP information in the reinvite message and sends the reinvite message to the user call terminal.

S207: The user call terminal sends an answer message to the control server through the IMS network element.

The answer message includes the SDP information of the user call terminal, and the SDP information of the user call terminal includes an IP address, the audio port information, and the audio encoding/decoding format of the user call terminal. It should be understood that, after the control server obtains the SDP information of the user call terminal, the control server sets the SDP information of the user call terminal in the media server, which may also be understood as that the control server notifies the media server of the SDP information of the user call terminal.

Through the media resource negotiation process described in S206 and S207, the user call terminal may obtain the SDP information of the media server, and the media server may also obtain the SDP information of the user call terminal. In this way, the voice call media transmission channel between the user call terminal and the media server is established.

S208: The control server sends a reinvite message to the customer service call terminal.

The reinvite message is used to perform media resource renegotiation with the customer service call terminal, to establish the voice call media transmission channel between the customer service call terminal and the media server, the reinvite message includes the SDP information of the media server, and the SDP information of the media server includes the IP address, the audio port information, and the audio encoding/decoding format of the media server. After the control server interacts with the media server to query (or obtain) the SDP information of the media server, the control server includes the SDP information in the reinvite message and sends the reinvite message to the customer service call terminal.

S209: The customer service call terminal sends an answer message to the control server.

The answer message includes the SDP information of the customer service call terminal, and the SDP information of the customer service call terminal includes the IP address, the audio port information, and the audio encoding/decoding format of the customer service call terminal. It should be understood that, after the control server obtains the SDP information of the customer service call terminal, the control server sets the SDP information of the customer service call terminal in the media server, which may also be understood as that the control server notifies the media server of the SDP information of the customer service call terminal.

Through the media resource negotiation process described in S208 and S209, the customer service call terminal may obtain the SDP information of the media server, and the media server may also obtain the SDP information of the customer service call terminal. In this way, the voice call media transmission channel between the customer service call terminal and the media server is established.

It should be understood that the voice call media transmission channel (including the voice call media transmission channel between the user call terminal and the media server, and the voice call media transmission channel between the customer service call terminal and the media server) is established through S206 to S209, and the voice call media transmission channel is used to transmit the call voice stream between the customer service call terminal and the user call terminal. For example, based on the established voice call media transmission channel, when the user call terminal sends the call voice stream to the customer service call terminal, the user call terminal sends the call voice stream to the media server based on the voice call media transmission channel between the user call terminal and the media server, and then the media server sends the received call voice stream to the customer service call terminal based on the voice call media transmission channel between the media server and the customer service call terminal.

Optionally, in some implementations, functions of the media server and the control server may be integrated on one device. For example, a signaling processing function of the control server may be integrated into the media server. In this way, the actions performed by the control server in steps S206 to S209 are all performed by the media server (the media server having the signaling processing function).

Optionally, in some cases, a voice call media transmission channel that is between the user call terminal and the customer service call terminal and that is directly used to transmit the call voice stream may alternatively be established through media resource negotiation. In this case, S206 to S209 may be replaced with S206' to S210'.

S206': The control server sends a reinvite message to the user call terminal through the IMS network element.

The reinvite message is used to perform media resource renegotiation with the user call terminal, the reinvite message includes the SDP information of the media server, and the SDP information of the media server includes the IP address, the audio port information, and the audio encoding/decoding format of the media server.

S207': The user call terminal sends an answer message to the control server through the IMS network element.

The answer message includes the SDP information of the user call terminal, and the SDP information of the user call terminal includes the IP address, the audio port information, and the audio encoding/decoding format of the user call terminal.

S208': The control server sends a reinvite message to the customer service call terminal.

The reinvite message is used to perform media resource renegotiation with the customer service call terminal, the reinvite message includes the SDP information of the user call terminal, and the SDP information of the user call terminal includes the IP address, the audio port information, and the audio encoding/decoding format of the user call terminal.

S209': The customer service call terminal sends an answer message to the control server.

The answer message includes the SDP information of the customer service call terminal, and the SDP information of the customer service call terminal includes the IP address, the audio port information, and the audio encoding/decoding format of the customer service call terminal.

S210': The control server sends an answer message carrying the SDP information of the customer service call terminal to the user call terminal.

Through the media resource negotiation process in S206' to S210', the user call terminal may obtain the SDP information of the customer service call terminal, and the customer service call terminal may obtain the SDP information of the user call terminal, that is, the voice call media transmission channel between the user call terminal and the customer service call terminal is established. Based on the established voice call media transmission channel, the user call terminal and the customer service call terminal may directly communicate with each other, and the media server does not need to forward the call voice stream. For example, the user call terminal may directly send the call voice stream to the customer service call terminal based on the voice call media transmission channel between the user call terminal and the media server. Similarly, the customer service call terminal may also directly send the call voice stream to the user call terminal based on the voice call media transmission channel.

Figure 3:
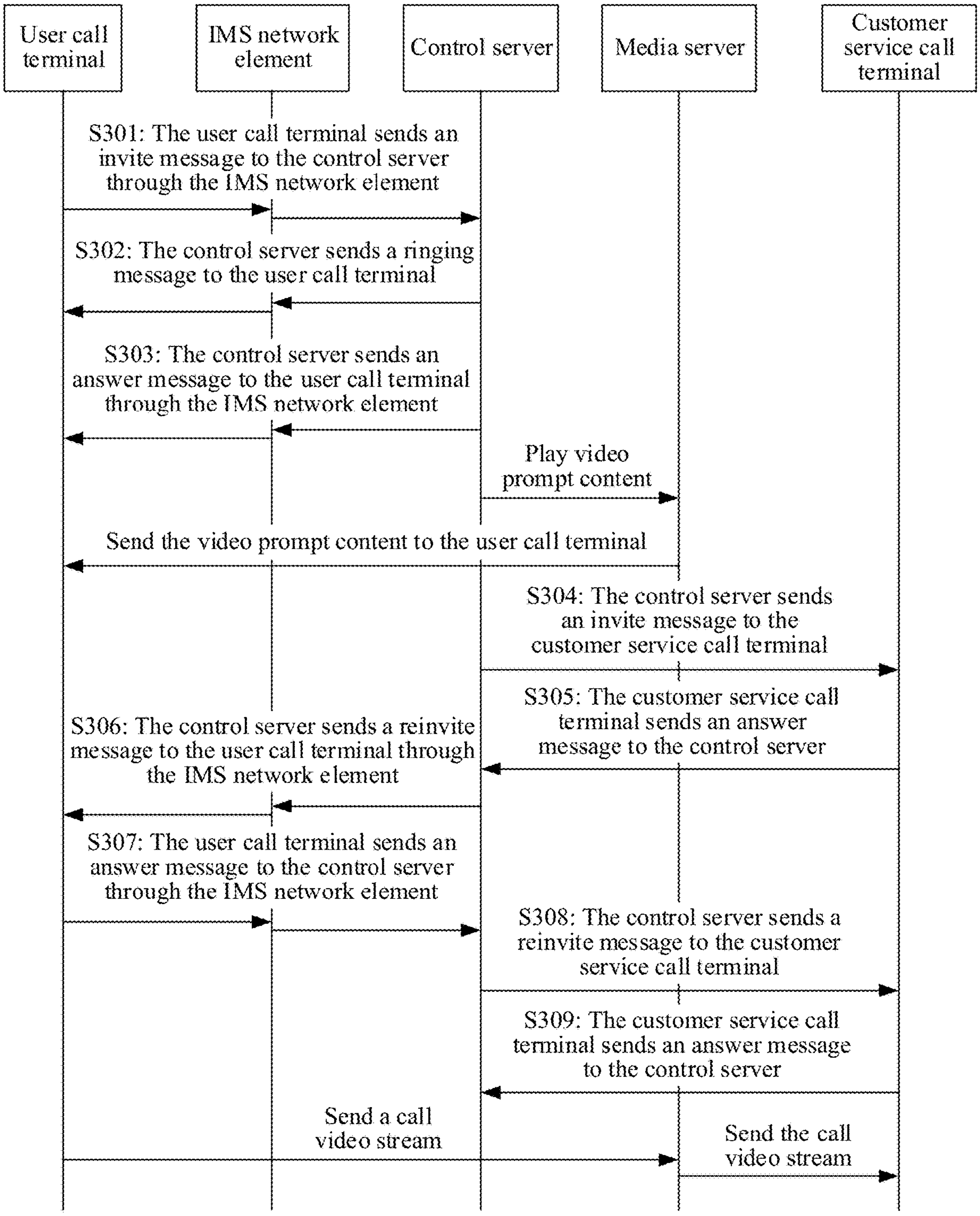
FIG. 3 is a flowchart of a video call according to an embodiment of this application.

With reference to the architecture of the communication system shown in FIG. 1, on a basis that a user call terminal accesses an access network, a 4G core network or a 5G core network, and an IMS core network, a video call process is described by using an example in which a customer service call terminal and the user call terminal perform a video call, to facilitate understanding of a video call process in a service scenario of a manual customer service. The video call process is similar to the foregoing voice call process. For related content in the video call process, refer to the descriptions in the voice call process. Refer to FIG. 3. A video call process includes the following steps.

S301: A user call terminal sends an invite message to a control server through an IMS network element.

The invite message carries SDP information of the user call terminal, where the SDP information includes an IP address, audio port information, an audio encoding/decoding format, video port information, and a video encoding/decoding format of the user call terminal, and the SDP information is used to perform media resource negotiation with the control server, to establish a voice call media transmission channel that is between the user call terminal and a media server and that is used to transmit a call voice stream and a video call media transmission channel that is between the user call terminal and the media server and that is used to transmit a call video stream. It should be understood that the video call process relates to transmission of the call voice stream and the call video stream. Therefore, compared with an audio call procedure, SDP information in the video call process further needs to include video port information and a video encoding/decoding format.

S302: The control server sends a ringing message to the user call terminal.

The ringing message carries SDP information of the media server, and an IP address, audio port information, an audio encoding/decoding format, video port information, and a video encoding/decoding format of the media server, and the SDP information is used to perform media resource negotiation with the user call terminal, to establish the voice call media transmission channel that is between the user call terminal and the media server and that is used to transmit the call voice stream and the video call media transmission channel that is between the user call terminal and the media server and that is used to transmit the call video stream.

S303: The control server sends an answer message to the user call terminal through the IMS network element.

In this embodiment of this application, when a user initiates a video call, after a customer service system answers the call of the user call terminal, the control server may send an instruction to the media server, to instruct the media server to play video prompt content (including an audio part and a video part) related to a user service, so that the media server sends the video prompt content to the user call terminal based on the established voice call media transmission channel and the established video call media transmission channel, where the video prompt content may prompt the user to select different service content based on requirements.

When the user performs an operation under the prompt of the video prompt content and selects a manual service, after the media server detects the operation of selecting the manual service, the media server notifies the control server of a selection result of the user, and then the control server allocates a customer service member to the user (that is, selects a corresponding customer service call terminal for the user call terminal). Then, the control server performs S304.

S304: The control server sends an invite message to the customer service call terminal.

The invite message is used to call a video session between the customer service call terminal and the user call terminal, the invite message includes the SDP information of the media server, and the SDP information of the media server includes the IP address, the audio port information, the audio encoding/decoding format, the video port information, and the video encoding/decoding format of the media server. The SDP information is used to perform media resource negotiation with the customer service call terminal, to establish a voice call media transmission channel that is between the customer service call terminal and the media server and that is used to transmit a call voice stream and a video call media transmission channel that is between the customer service call terminal and the media server and that is used to transmit a call video stream.

S305: The customer service call terminal sends an answer message to the control server.

After the customer service call terminal sends the answer message, the customer service call terminal joins the video call with the user call terminal, where the answer message includes SDP information of the customer service call terminal, and the SDP information of the customer service call terminal includes an IP address, audio port information, an audio encoding/decoding format, video port information, and a video encoding/decoding format of the customer service call terminal. The SDP information is used to perform media resource negotiation with the control server, to establish the voice call media transmission channel that is between the customer service call terminal and the media server and that is used to transmit the call voice stream and the video call media transmission channel that is between the customer service call terminal and the media server and that is used to transmit the call video stream.

It should be understood that, because the customer service call terminal is a new device having the call with the user call terminal in the customer service system, in a subsequent procedure, to implement communication between the user call terminal and the customer service call terminal, media resource negotiation needs to be performed again, that is, the control server performs media resource renegotiation with the user call terminal (refer to S306 and S307), and the control server performs media resource renegotiation with the customer service call terminal (refer to S308 and S309). A voice call media transmission channel and a video call media transmission channel may be established through the media resource renegotiation. It should be noted that the voice call media transmission channel and the video call media transmission channel established through S306 to S309 are transmission channels that require the media server as a medium, that is, an indirect voice call media transmission channel and an indirect video call media transmission channel, where the voice call media transmission channel includes a voice call media transmission channel between the user call terminal and the media server, and a voice call media transmission channel between the media server and the customer service call terminal, and the video call media transmission channel includes a video call media transmission channel between the user call terminal and the media server, and a video call media transmission channel between the media server and the customer service call terminal.

S306: The control server sends a reinvite message to the user call terminal through the IMS network element.

The reinvite message is used to perform media resource renegotiation with the user call terminal, to establish the voice call media transmission channel between the user call terminal and the media server, and the video call media transmission channel between the user call terminal and the media server, the reinvite message includes the SDP information of the media server, and the SDP information of the media server includes the IP address, the audio port information, the audio encoding/decoding format, the video port information, and the video encoding/decoding format of the media server. After the control server interacts with the media server to query (or obtain) the SDP information of the media server, the control server includes the SDP information in the reinvite message and sends the reinvite message to the user call terminal.

S307: The user call terminal sends an answer message to the control server through the IMS network element.

The answer message includes the SDP information of the user call terminal, and the SDP information of the user call terminal includes the IP address, the audio port information, the audio encoding/decoding format, the video port information, and the video encoding/decoding format of the user call terminal. It should be understood that, after the control server obtains the SDP information of the user call terminal, the control server sets the SDP information of the user call terminal in the media server, which may also be understood as that the control server notifies the media server of the SDP information of the user call terminal.

Through the media resource negotiation process described in S306 and S307, the user call terminal may obtain the SDP information of the media server, and the media server may also obtain the SDP information of the user call terminal. In this way, the voice call media transmission channel between the user call terminal and the media server, and the video call media transmission channel between the user call terminal and the media server are established.

S308: The control server sends a reinvite message to the customer service call terminal.

The reinvite message is used to perform media resource renegotiation with the customer service call terminal, to establish the voice call media transmission channel between the customer service call terminal and the media server, and the video call media transmission channel between the customer service call terminal and the media server, the reinvite message includes the SDP information of the media server, and the SDP information of the media server includes the IP address, the audio port information, the audio encoding/decoding format, the video port information, and the video encoding/decoding format of the media server. After the control server interacts with the media server to query (or obtain) the SDP information of the media server, the control server includes the SDP information in the reinvite message and sends the reinvite message to the customer service call terminal.

S309: The customer service call terminal sends an answer message to the control server.

The answer message includes the SDP information of the customer service call terminal, and the SDP information of the customer service call terminal includes the IP address, the audio port information, the audio encoding/decoding format, the video port information, and the video encoding/decoding format of the customer service call terminal. It should be understood that, after the control server obtains the SDP information of the customer service call terminal, the control server sets the SDP information of the customer service call terminal in the media server, which may also be understood as that the control server notifies the media server of the SDP information of the customer service call terminal.

Through the media resource negotiation process described in S308 and S309, the customer service call terminal may obtain the SDP information of the media server, and the media server may also obtain the SDP information of the customer service call terminal. In this way, the voice call media transmission channel between the customer service call terminal and the media server, and the video call media transmission channel between the customer service call terminal and the media server are established.

It should be understood that, the voice call media transmission channel (including the voice call media transmission channel between the user call terminal and the media server, and the voice call media transmission channel between the customer service call terminal and the media server) is established through S306 to S309, and the voice call media transmission channel is used to transmit the call voice stream between the customer service call terminal and the user call terminal. The video call media transmission channel (including the video call media transmission channel between the user call terminal and the media server, and the video call media transmission channel between the customer service call terminal and the media server) is established through S306 to S309, and the video call media transmission channel is used to transmit the call video stream between the customer service call terminal and the user call terminal.

Similar to the voice call process, optionally, in some cases, a voice call media transmission channel that is between the user call terminal and the customer service call terminal and that is directly used to transmit a call voice stream and a video call media transmission channel that is between the user call terminal and the customer service call terminal and that is directly used to transmit a call video stream. In this case, S306 to S309 may be replaced with S306' to S310'.

S306': The control server sends a reinvite message to the user call terminal through the IMS network element.

The reinvite message is used to perform media resource renegotiation with the user call terminal, the reinvite message includes the SDP information of the media server, and the SDP information of the media server includes the IP address, the audio port information, the audio encoding/decoding format, the video port information, and the video encoding/decoding format of the media server.

S307': The user call terminal sends an answer message to the control server through the IMS network element.

The answer message includes the SDP information of the user call terminal, and the SDP information of the user call terminal includes the IP address, the audio port information, the audio encoding/decoding format, the video port information, and the video encoding/decoding format of the user call terminal.

S308': The control server sends a reinvite message to the customer service call terminal.

The reinvite message is used to perform media resource renegotiation with the customer service call terminal, the reinvite message includes the SDP information of the user call terminal, and the SDP information of the user call terminal includes the IP address, the audio port information, the audio encoding/decoding format, the video port information, and the video encoding/decoding format of the user call terminal.

S309': The customer service call terminal sends an answer message to the control server.

The answer message includes the SDP information of the customer service call terminal, and the SDP information of the customer service call terminal includes the IP address, the audio port information, the audio encoding/decoding format, the video port information, and the video encoding/decoding format of the customer service call terminal.

S310': The control server sends an answer message carrying the SDP information of the customer service call terminal to the user call terminal.

In conclusion, different from the voice call process, all SDP information in the media negotiation process includes video port information and a video encoding/decoding format of a device.

Through the media resource negotiation process in S306' to S310', the user call terminal may obtain the SDP information of the customer service call terminal, and the customer service call terminal may obtain the SDP information of the user call terminal, that is, the voice call media transmission channel and the video call media transmission channel between the user call terminal and the customer service call terminal are established. Based on the established voice call media transmission channel and the established video call media transmission channel, the user call terminal and the customer service call terminal may directly communicate with each other, and the media server does not need to forward the call voice stream and the call video stream.

Optionally, the user call terminal is a call terminal, and the customer service call terminal is a peer call terminal; or the customer service call terminal is a call terminal, and the user call terminal is a peer call terminal. This is determined based on an actual situation, and is not limited in this embodiment of this application.

In this embodiment of this application, the call terminal (the call terminal and the peer call terminal) may be an electronic device such as a mobile phone, a tablet computer, or a personal computer (UMPC), or may be another electronic device such as a desktop device, a laptop device, a handheld device, a wearable device, a smart home device, or a vehicle-mounted device, for example, a netbook, a smartwatch, a smart camera, a netbook, or a personal digital assistant (PDA). A type, a structure, and the like of the call terminal are not limited in this embodiment of this application.

Figure 4A:
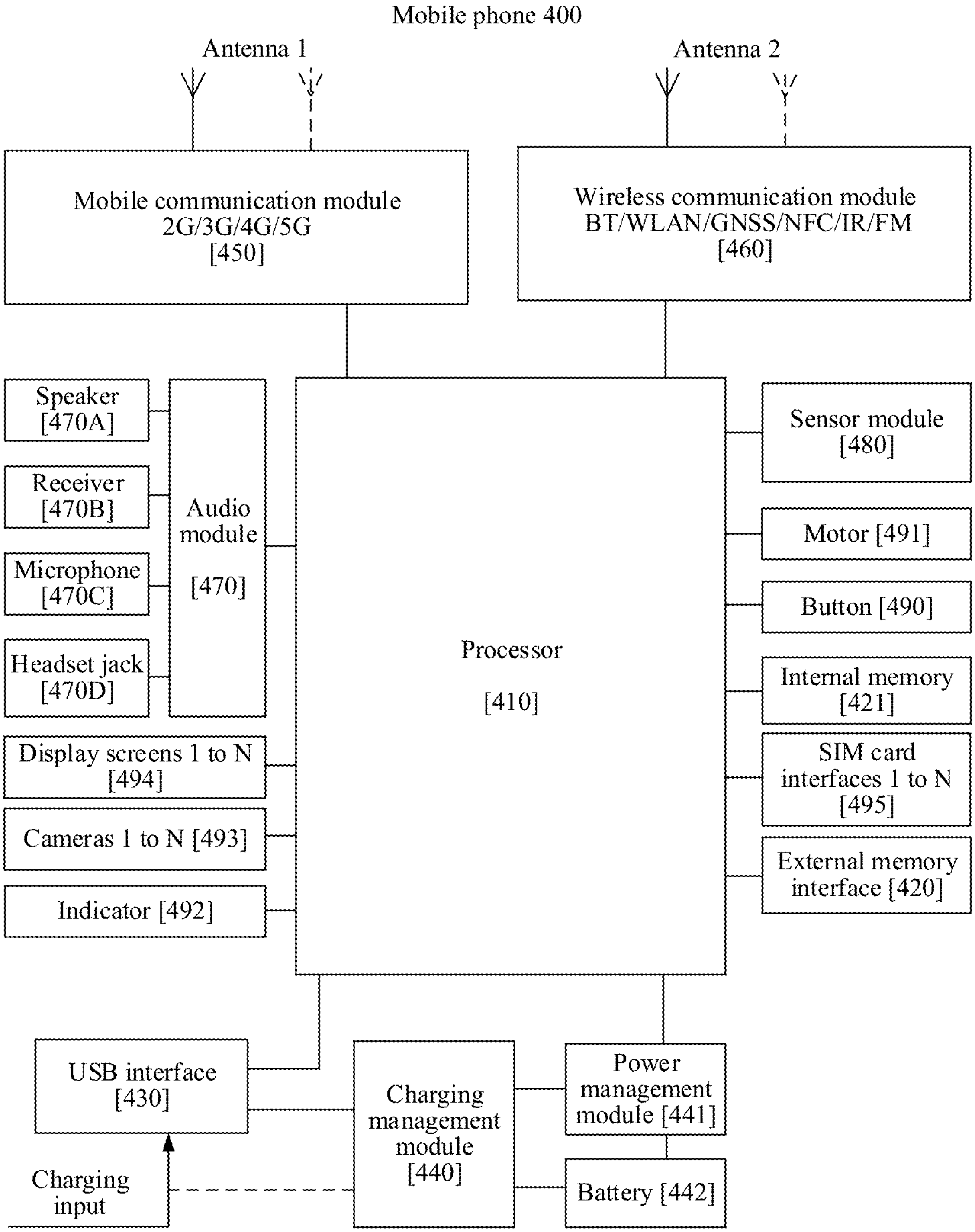
FIG. 4A is a diagram of hardware of a mobile phone according to an embodiment of this application.

For example, the call terminal is a mobile phone. FIG. 4A is a diagram of a hardware structure of a mobile phone 400 according to an embodiment of this application. The mobile phone 400 includes a processor 410, an external memory interface 420, an internal memory 421, a universal serial bus (USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a button 490, a motor 491, an indicator 492, a camera 493, a display screen 494, a subscriber identity module (SIM) card interface 495, and the like.

It may be understood that the structure shown in this embodiment of this application does not constitute a limitation on the mobile phone 400. In some other embodiments of this application, the mobile phone 400 may include more or fewer components than those shown in the figure, or combine some components, or split some components, or have different component arrangements. The components shown in the figure may be implemented by hardware, software, or a combination of software and hardware.

The processor 410 may include one or more processing units. For example, the processor 410 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the mobile phone 400. The controller may generate an operation control signal based on an instruction operation code and a time sequence signal, to complete control of instruction reading and instruction execution.

A memory may be further disposed in the processor 410, and is configured to store instructions and data. In some embodiments, the memory in the processor 410 is a cache. The memory may store instructions or data that has been used or cyclically used by the processor 410. If the processor 410 needs to use the instructions or the data again, the processor 410 may directly invoke the instructions or the data from the memory. This avoids repeated access and reduces waiting time of the processor 410, thereby improving system efficiency.

The charging management module 440 is configured to receive a charging input from a charger. The charging management module 440 may further supply power to an electronic device through the power management module 441 when the battery 442 is charged.

The power management module 441 is configured to connect the battery 442, the charging management module 440, and the processor 410. The power management module 441 receives an input from the battery 442 and/or the charging management module 440, and supplies power to the processor 410, the internal memory 421, the external memory, the display screen 494, the camera 493, the wireless communication module 460, and the like. The power management module 441 may be further configured to monitor parameters such as a battery capacity, a battery cycle count, and a battery health status (electric leakage or impedance). In some other embodiments, the power management module 441 may alternatively be disposed in the processor 410. In some other embodiments, the power management module 441 and the charging management module 440 may alternatively be disposed in a same device.

A wireless communication function of the mobile phone 400 may be implemented through the antenna 1, the antenna 2, the mobile communication module 450, the wireless communication module 460, the modem processor, the baseband processor, and the like.

The antenna 1 and the antenna 2 are configured to transmit and receive an electromagnetic wave signal.

The mobile communication module 450 may provide a solution, applied to the mobile phone 400, to wireless communication including 2G, 3G, 4G, 5G, and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal modulated by the modem processor, and convert the signal into an electromagnetic wave for radiation through the antenna 1. In some embodiments, at least some functional modules of the mobile communication module 450 may be disposed in the processor 410. In some embodiments, at least some functional modules of the mobile communication module 450 and at least some modules of the processor 410 may be disposed in a same device.

The wireless communication module 460 may provide a solution, applied to the mobile phone 400, to wireless communication including a wireless local area network (WLAN) (such as a wireless fidelity (Wi-Fi) network), Bluetooth (BT), a global navigation satellite system (GNSS), frequency modulation (FM), near field communication (NFC), an infrared (IR) technology, or the like. The wireless communication module 460 may be one or more components integrating at least one communication processing module. The wireless communication module 460 receives an electromagnetic wave through the antenna 2, performs frequency modulation and filtering processing on the electromagnetic wave signal, and sends a processed signal to the processor 410. The wireless communication module 460 may further receive a to-be-sent signal from the processor 410, perform frequency modulation and amplification on the signal, and convert the signal into an electromagnetic wave through the antenna 2 for radiation.

In some embodiments, in the mobile phone 400, the antenna 1 and the mobile communication module 450 are coupled, and the antenna 2 and the wireless communication module 460 are coupled, so that the mobile phone 400 can communicate with a network and another device by using a wireless communication technology.

The mobile phone 400 implements a display function through the GPU, the display screen 494, the application processor, and the like. The GPU is a microprocessor for image processing, and is connected to the display screen 494 and the application processor. The GPU is configured to: perform mathematical and geometric computation, and render an image. The processor 410 may include one or more GPUs that execute program instructions to generate or change display information.

The display screen 494 is configured to display an image, a video, and the like. The display screen 494 includes a display panel. The display panel may be a liquid crystal display (LCD), an organic light emitting diode (OLED), an active-matrix organic light emitting diode (AMOLED), a flexible light emitting diode (FLED), a mini-LED, a micro-LED, a micro-OLED, a quantum dot light emitting diode (QLED), or the like. In some embodiments, the mobile phone 400 may include one or N display screens 494, where N is a positive integer greater than 1.

The mobile phone 400 may implement a photographing function through the ISP, the camera 493, the video codec, the GPU, the display screen 494, the application processor, and the like.

The ISP is configured to process data fed back by the camera 493, and the camera 493 is configured to capture a static image or a video.

The digital signal processor is configured to process a digital signal. In addition to processing a digital image signal, the digital signal processor may further process another digital signal (for example, an audio signal).

The video codec is configured to compress or decompress a digital video. The mobile phone 400 may support one or more video codecs. In this way, the mobile phone 400 can play or record videos in a plurality of encoding formats, for example, moving picture experts group (MPEG)1, MPEG2, MPEG3, and MPEG4.

The external memory interface 420 may be configured to connect to an external storage card, for example, a Micro SD card, to extend a storage capability of the mobile phone 400. The external storage card communicates with the processor 410 through the external memory interface 420, to implement a data storage function. For example, files such as music and videos are stored in the external storage card.

The internal memory 421 may be configured to store computer-executable program code. The computer-executable program code includes instructions. The processor 410 runs the instructions stored in the internal memory 421, to perform various function applications of the mobile phone 400 and data processing. The internal memory 421 may include a program storage area and a data storage area. The program storage area may store an operating system, an application required by at least one function (for example, a voice playing function or an image playing function), and the like. The data storage area may store data (such as audio data and an address book) and the like created during use of the mobile phone 400. In addition, the internal memory 421 may include a high-speed random access memory, or may include a nonvolatile memory, for example, at least one magnetic disk storage device, a flash memory, or a universal flash storage (UFS).

The mobile phone 400 may implement an audio function such as music playing or recording through the audio module 470, the speaker 470A, the receiver 470B, the microphone 470C, the headset jack 470D, the application processor, and the like.

The audio module 470 is configured to convert digital audio information into an analog audio signal for output, and is also configured to convert an analog audio input into a digital audio signal. The audio module 470 may be further configured to encode and decode an audio signal. In some embodiments, the audio module 470 may be disposed in the processor 410, or some functional modules of the audio module 470 may be disposed in the processor 410.

The speaker 470A, also referred to as a "loudspeaker", is configured to convert an audio electrical signal into a sound signal. The mobile phone 400 may listen to music or answer a hands-free call through the speaker 470A.

The receiver 470B, also referred to as an "earpiece", is configured to convert an audio electrical signal into a sound signal. When a call is answered or voice information is received through the mobile phone 400, the receiver 470B may be put close to a human ear to listen to a voice.

The microphone 470C, also referred to as a "mike" or a "mic", is configured to convert a sound signal into an electrical signal. When making a call or sending voice information, a user may make a sound near the microphone 470C through the mouth of the user, to input a sound signal to the microphone 470C. At least one microphone 470C may be disposed in the mobile phone 400. In some other embodiments, two microphones 470C may be disposed in the mobile phone 400, and in addition to collecting a sound signal, a noise reduction function may be further implemented. In some other embodiments, three, four, or more microphones 470C may be alternatively disposed in the mobile phone 400, to collect a sound signal, implement noise reduction, identify a sound source, implement a directional recording function, and the like.

The headset jack 470D is configured to connect to a wired headset.

The button 490 includes a power button, a volume button, and the like. The mobile phone 400 may receive a key input, and generate a key signal input related to a user setting and function control of the mobile phone 400.

The motor 491 may generate a vibration prompt. The motor 491 may be configured to provide an incoming call vibration prompt and a touch vibration feedback.

The indicator 492 may be an indicator light, and may be configured to indicate a charging status and a power change, or may be configured to indicate a message, a missed call, a notification, and the like.

The SIM card interface 495 is configured to connect to a SIM card. The SIM card may be inserted into the SIM card interface 495 or removed from the SIM card interface 495, to implement contact with and separation from the mobile phone 400. The mobile phone 400 may support one or N SIM card interfaces. N is a positive integer greater than 1. The SIM card interface 495 may support a nano-SIM card, a micro-SIM card, a SIM card, and the like. A plurality of cards may be simultaneously inserted into a same SIM card interface 495. The plurality of cards may be of a same type or different types. The SIM card interface 495 is also compatible with different types of SIM cards. The SIM card interface 495 is also compatible with the external storage card. The mobile phone 400 interacts with a network through the SIM card, to implement functions such as calling and data communication. In some embodiments, the mobile phone 400 uses an eSIM, that is, an embedded SIM card. The eSIM card may be embedded in the mobile phone 400, and cannot be separated from the mobile phone 400.

It may be understood that, in this embodiment of this application, the mobile phone 400 may perform some or all of the steps in embodiments of this application. These steps or operations are merely examples. The mobile phone 400 may further perform other operations or variations of various operations. In addition, the steps may be performed in a sequence different from a sequence presented in embodiments of this application, and not all the operations in embodiments of this application may be performed. Embodiments of this application may be implemented separately, or may be implemented in any combination. This is not limited in this application.

A desktop sharing method provided in embodiments of this application may be used for a call terminal having the hardware structure shown in FIG. 4A or a call terminal having a similar structure, or may be used for a call terminal having another structure. This is not limited in embodiments of this application.

Figure 4B:
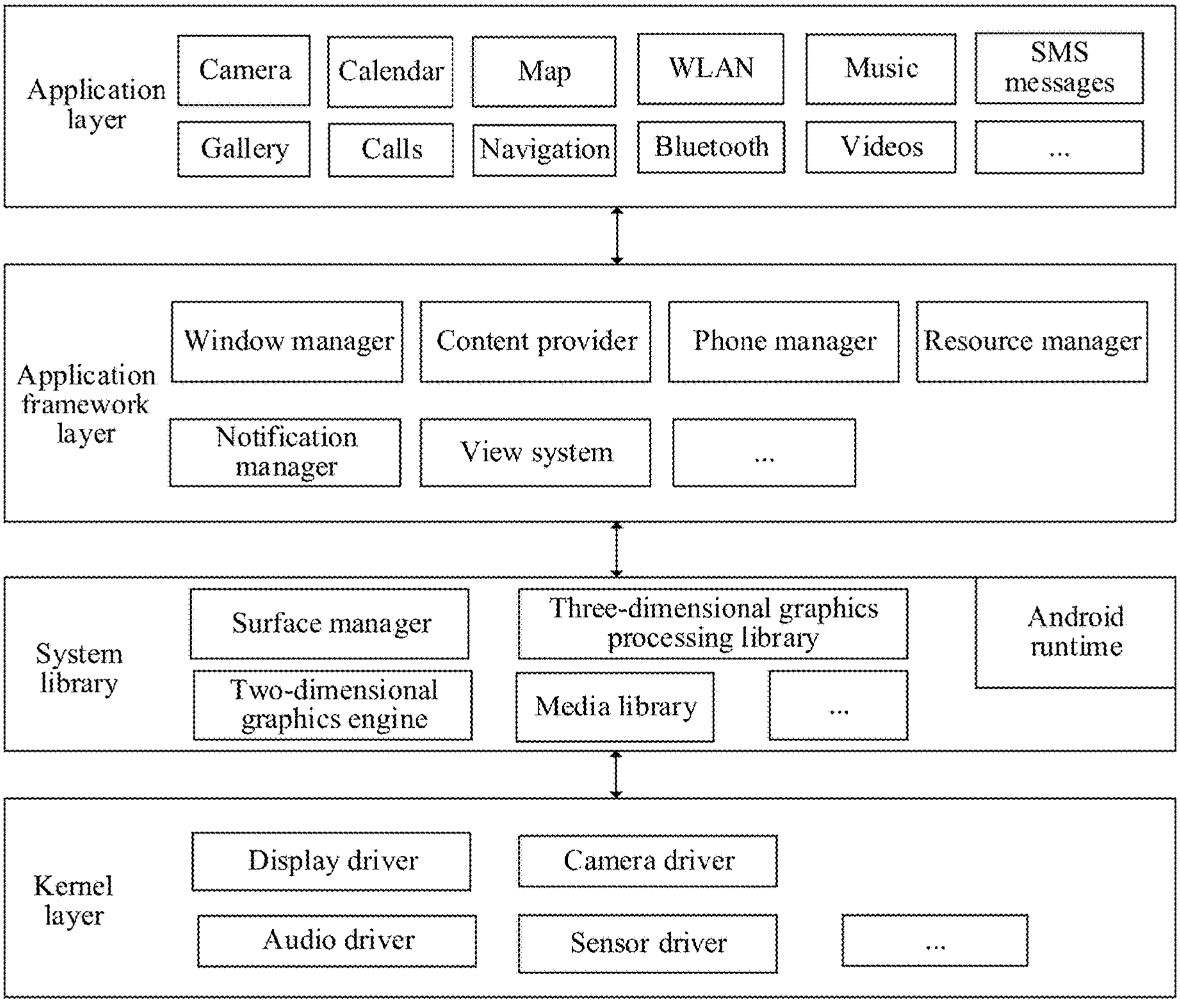
FIG. 4B is a diagram of a system architecture of a mobile phone according to an embodiment of this application.

After the hardware structure of the call terminal is described, in this application, an example in which the call terminal is the mobile phone 400 is used herein to describe a system architecture of the call terminal provided in this application. A system architecture of the mobile phone 400 may use a layered architecture, an event-driven architecture, a microkernel architecture, a microservice architecture, or a cloud architecture. In embodiments of this application, an Android® system of a layered architecture is used as an example to describe a software structure of the mobile phone 400. FIG. 4B is a block diagram of a software structure of a call terminal according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages. As shown in FIG. 4B, the application packages may include applications such as Camera, Gallery, Calendar, Phone, Map, Navigation, WLAN, Bluetooth, Music, Videos, and SMS messages.

In this embodiment of this application, a call application (that is, a call APP) at the application layer of the mobile phone 400 may be used to perform a voice call or a video call with another call terminal. The call application is an application that is already provided for the mobile phone 400 before delivery, and a user does not need to perform operations such as installation and configuration.

It should be understood that, in the desktop sharing method provided in embodiments of this application, a function of implementing desktop sharing between a call terminal and at least one peer call terminal in a voice call or video call process is implemented based on call applications on the call terminal and the at least one peer call terminal. It may also be considered that the call terminal and the at least one peer call terminal in embodiments of this application are call applications on the call terminal or the at least one peer call terminal.

The application framework layer provides an application programming interface (API) and a programming framework for an application at the application layer. The application framework layer includes some predefined functions.

As shown in FIG. 4B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. The content provider is configured to: store and obtain data, and enable the data to be accessed by an application. The data may include a video, an image, an audio, calls that are made and answered, a browsing history and bookmarks, an address book, and the like. The view system includes visual controls such as a control for displaying a text and a control for displaying an image. The view system may be configured to construct an application. A display interface may include one or more views. For example, a display interface including an SMS message notification icon may include a text display view and an image display view. The phone manager is configured to provide a communication function of a call terminal, for example, management of a call status (including answering, hanging up, or the like). The resource manager provides various resources such as a localized character string, an icon, an image, a layout file, and a video file for an application. The notification manager enables an application to display notification information in a status bar, and may be configured to convey a notification message. The notification manager may automatically disappear after a short pause without requiring user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, an electronic device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object life cycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem, and provide fusion of 2D and 3D layers for a plurality of applications. The media library supports playback and recording in a plurality of commonly used audio and video formats, and static image files. The media library may support a plurality of audio and video coding formats, for example, MPEG4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the mobile phone 400 with reference to a capture photographing scenario.

When the touch sensor of the mobile phone 400 receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, to start the camera application. Then, the camera driver is started by invoking the kernel layer, and a static image or a video is captured through the camera 493.

In embodiments of this application, structures of the control server and the media server in the foregoing communication system are similar. The control server and the media server may be servers in a hardware form, or may be servers in a software form. Optionally, it can be learned from the related descriptions in the foregoing embodiment that functions of the control server and the media server may alternatively be integrated together, that is, integrated on one server. This is not limited in embodiments of this application.

Figure 5:
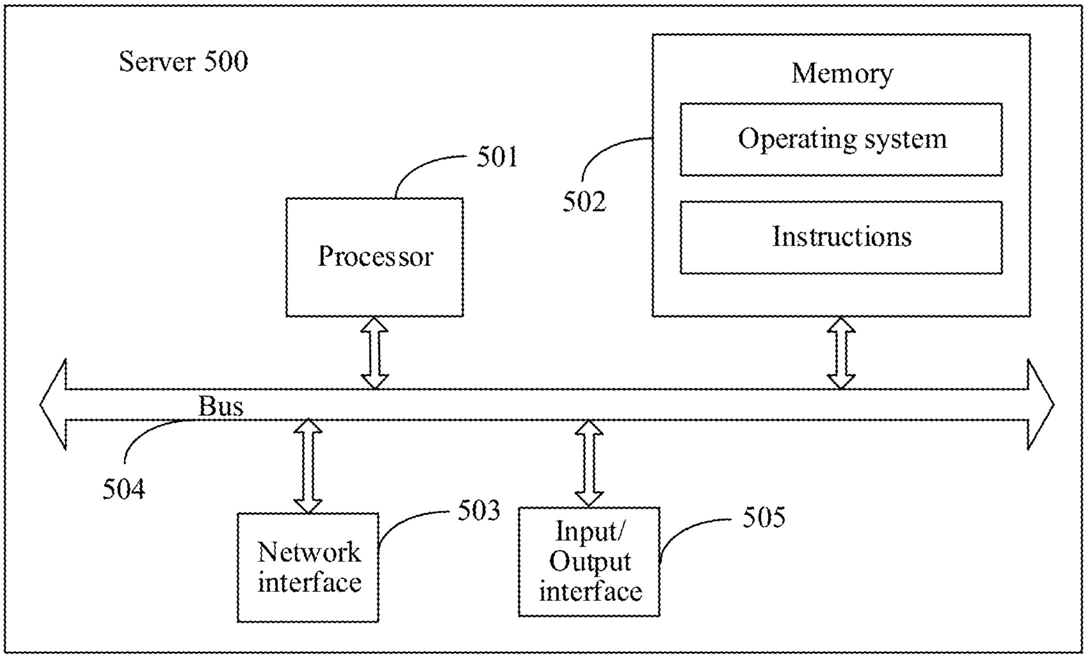
FIG. 5 is a diagram of hardware of a server according to an embodiment of this application.

A server in a hardware form is used as an example. As shown in FIG. 5, an embodiment of this application provides a server 500. The server 500 may be a control server, or may be a media server. The server 500 includes at least one processor 501 and a memory 502.

The processor 501 includes one or more central processing units (CPUs). The CPU is a single-core CPU (single-CPU) or a multi-core CPU (multi-CPU).

The memory 502 includes but is not limited to a random access memory (RAM), a read-only memory (ROM), an erasable programmable read-only memory (EPROM), a flash memory, an optical memory, or the like. The memory 502 stores code of an operating system.

Optionally, the processor 501 implements the method in the foregoing embodiment by reading instructions stored in the memory 502, or the processor 501 implements the method in the foregoing embodiment by using internally stored instructions. When the processor 501 implements the method in the foregoing embodiment by reading the instructions stored in the memory 502, the memory 502 stores instructions for implementing the desktop sharing method provided in embodiments of this application.

If the server 500 is a control server, after the program code stored in the memory 502 is read by the at least one processor 501, the server 500 performs the following operations: triggering establishment of a video call media transmission channel, where the video call media transmission channel is used by a call terminal in a video call service to transmit a call video stream to at least one peer call terminal, and the call video stream includes video content shot by the call terminal; and determining that the call terminal has a desktop sharing capability, where when the call terminal has the desktop sharing capability, the video call media transmission channel is used to transmit a desktop video stream to the at least one peer call terminal, and the desktop video stream includes video content captured by the call terminal from desktop display content.

If the server 500 is a media server, after the program code stored in the memory 502 is read by the at least one processor 501, the server 500 performs the following operations: establishing a first video call media transmission channel, where the first video call media transmission channel is a video call media transmission channel between the media server and a call terminal; establishing a second video call media transmission channel, where the second video call media transmission channel is a video call media transmission channel between the media server and each of at least one peer call terminal, the first video call media transmission channel and the second video call media transmission channel are used to transmit a call video stream to the at least one peer call terminal in a video call service, and the call video stream includes video content shot by the call terminal; receiving a desktop video stream from the call terminal through the first video call media transmission channel, where the desktop video stream includes video content captured by the call terminal from the desktop display content; and transmitting the desktop video stream to the at least one peer call terminal through the second video call media transmission channel.

Optionally, the server 500 shown in FIG. 5 further includes a network interface 503. The network interface 503 is a wired interface, for example, a fiber distributed data interface (FDDI) or a gigabit ethernet (GE) interface. Alternatively, the network interface 503 is a wireless interface. The network interface 503 is configured to receive a message (for example, a SIP message). Alternatively, the network interface 503 (when the server 500 is the media server) is configured to receive a call video stream or a call voice stream.

The memory 502 is configured to store the audio stream or the video stream received by the network interface 503, and the at least one processor 501 further performs, based on the information stored in the memory 502, the method described in the foregoing method embodiment. For more details about implementing the foregoing functions by the processor 501, refer to the descriptions in the foregoing method embodiments. Details are not described herein again.

Optionally, the server 500 further includes a bus 504. The processor 501 and the memory 502 are usually connected to each other through the bus 504, or are connected to each other in another manner.

Optionally, the server 500 further includes an input/output interface 505. The input/output interface 505 is configured to connect to an input device, and receive instructions input by a user through the input device. The input device includes but is not limited to a keyboard, a touchscreen, a microphone, and the like. The input/output interface 505 is further configured to connect to an output device, and output a processing result of the processor 501. The output device includes but is not limited to a display, a printer, and the like.

With reference to the related descriptions of the foregoing embodiments, embodiments of this application provide a desktop sharing method. The method may be used for call terminals (including a call terminal and a peer call terminal of the call terminal) that have the hardware structure shown in FIG. 4A and the system architecture shown in FIG. 4B, and a control server and a media server that have the hardware structure of the server shown in FIG. 5 in a communication system, and the desktop sharing method is implemented through interaction between devices.

It should be noted that in embodiments of this application, there is one call terminal, and there is at least one peer call terminal. In a service scenario of a manual customer service, a device initiating a call is a user call terminal, and a called device is a customer service call terminal. In a process of a call between the user call terminal and the customer service call terminal, one or more third-party call terminals may also be invited to join the call. The customer service call terminal and the one or more invited third-party call terminals are peer call terminals, and the one or more third-party call terminals may be user call terminals, customer service call terminals, or other call terminals. This is not limited in embodiments of this application.

Figure 6:
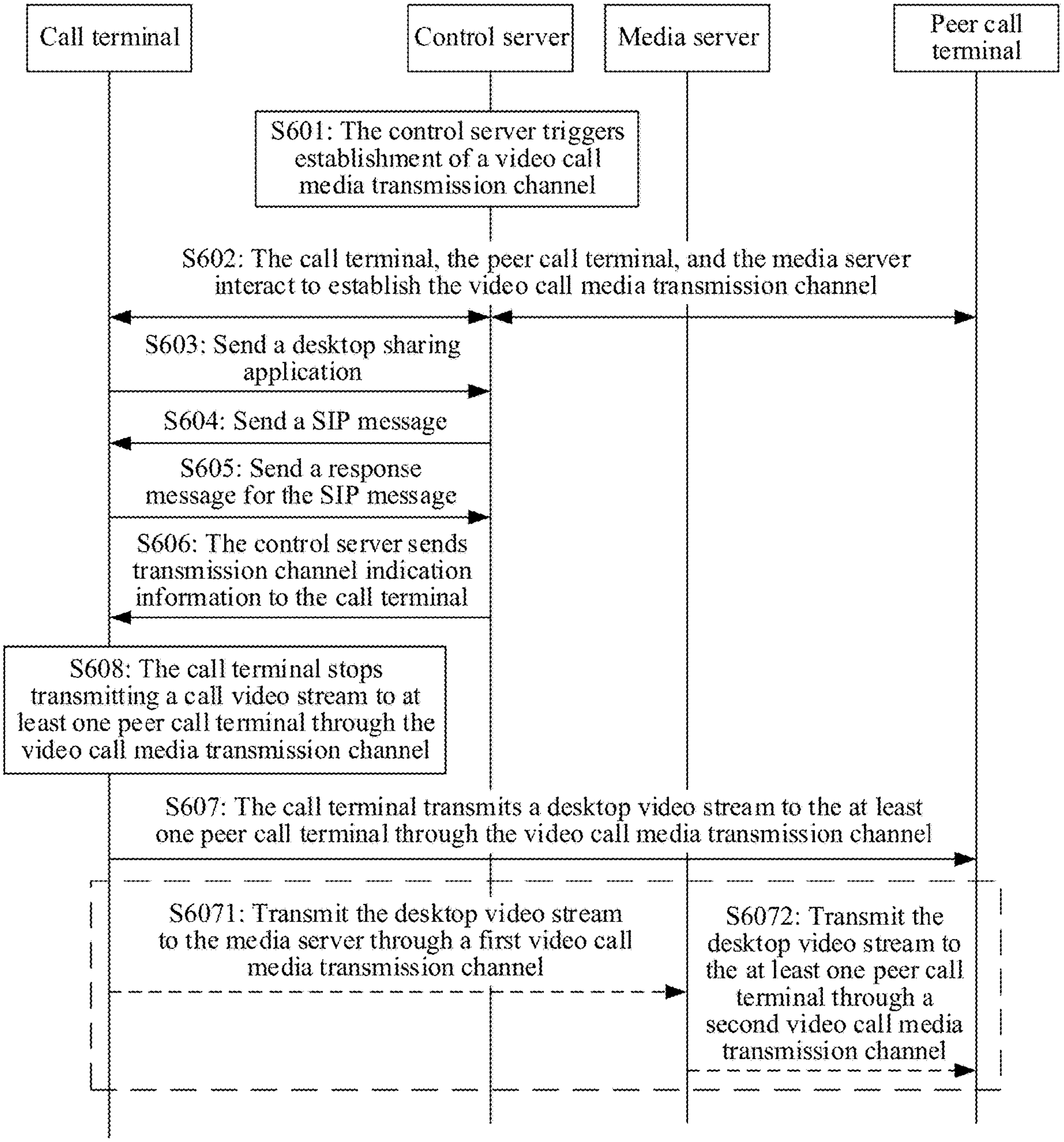
FIG. 6 is a diagram of a desktop sharing method according to an embodiment of this application.

As shown in FIG. 6, a desktop sharing method provided in an embodiment of this application includes S601 to S607.

S601: A control server triggers establishment of a video call media transmission channel.

The video call media transmission channel is used by a call terminal in a video call service to transmit a call video stream to at least one peer call terminal, and the call video stream includes video content shot by the call terminal. It should be understood that, in this embodiment of this application, the call terminal and the peer call terminal are relative concepts. In two terminals participating in a call, either terminal may be a call terminal, and the other terminal is a peer call terminal.

S602: The call terminal, the peer call terminal, and a media server interact to establish the video call media transmission channel.

It should be noted that the video call media transmission channel established through participation of the call terminal, the peer call terminal, and the media server is an indirect video call media transmission channel, and the establishing the video call media transmission channel includes: establishing a first video call media transmission channel, and establishing a second video call media transmission channel, where the first video call media transmission channel is a video call media transmission channel between the call terminal and the media server, and the second video call media transmission channel is a video call media transmission channel between a customer service call terminal and the media server.

In this embodiment of this application, in a process of establishing the video call media transmission channel, the control server forwards messages of the call terminal, the peer call terminal, and the media server. For a process, refer to the descriptions of S206 to S209 or S206' to S209' in the foregoing embodiment. Details are not described herein again.

Optionally, in this embodiment of this application, after the control server triggers establishment of the video call media transmission channel, step S602 may be replaced with S602'.

S602': The call terminal, the peer call terminal, and the control server interact to establish the video call media transmission channel.

It should be noted that, the video call media transmission channel established through participation of the call terminal, the peer call terminal, and the control server is a direct video call media transmission channel, and the video call media transmission channel includes a video call media transmission channel between the call terminal and each of the at least one peer call terminal. For a process, refer to the descriptions of S206' to S210' in the foregoing embodiment.

S603: The call terminal sends a desktop sharing application to the control server. Correspondingly, the control server receives the desktop sharing application sent by the call terminal.

The desktop sharing application includes a desktop sharing application identifier, and the desktop sharing application identifier is used to request to share a desktop of the call terminal with the at least one peer call terminal in a process of a video call between the call terminal and the at least one peer call terminal.

Optionally, if a calling party initiates a video call, after a control server in a customer service system responds to a call request sent by the calling party, the control server may trigger the call terminal, the peer call terminal, and the media server to establish the video call media transmission channel. In this case, S601 and S602 are first performed, and then S603 is performed.

Optionally, if a calling party initiates a voice call, in a process of performing the voice call between the call terminal and the peer call terminal, after the control server receives the desktop sharing application sent by the call terminal, the control server may trigger the call terminal, the peer call terminal, and the media server to establish the video call media transmission channel. In this case, S603 is first performed, and then S601 and S602 are performed.

In this embodiment of this application, after the control server receives the desktop sharing application, the control server interacts with the call terminal to determine that the call terminal has a desktop sharing capability.

S604: The control server sends a SIP message to the call terminal. Correspondingly, the call terminal receives the SIP message from the control server.

The SIP message includes a desktop sharing request identifier, and the desktop sharing request identifier is used to determine whether the call terminal has the desktop sharing capability.

In this embodiment of this application, after the call terminal sends the desktop sharing application, a status of the call terminal may change, and it needs to be determined whether the call terminal whose status changes further has the desktop sharing capability. The desktop sharing method can be continued only when the call terminal has the desktop sharing capability. For example, because a camera is unavailable, or a current network signal is poor, or the call terminal is in a 2G/3G network, and the video call media transmission channel is unavailable, or a user corresponding to the call terminal is inconvenient to answer a video call, or the like, the call terminal does not have the desktop sharing capability in these cases.

S605: The call terminal sends a response message for the SIP message to the control server. Correspondingly, the control server receives the response message for the SIP message from the call terminal.

The response message for the SIP message includes a desktop sharing response identifier, and the desktop sharing response identifier indicates that the call terminal has the desktop sharing capability.

In this embodiment of this application, the desktop sharing request identifier in the SIP message may be carried in a header field of the SIP message.

Optionally, the desktop sharing identifier is carried in the header field of the SIP message in the following two manners.

In a first carrying manner, the desktop sharing identifier (denoted as ds) is carried in a contact extension field in the SIP message.

INVITE sip:02033296999@gd.ctcims.cn SIP/2.0 is used as an example.

A contact header field is:

Optionally, when the SIP message includes the SDP information of the media server, the desktop sharing request identifier may alternatively be carried in the SDP information of the media server.

When the SDP information carries the desktop sharing identifier (ds), video port information for transmitting the video content captured from the desktop display content may be further indicated in an extension field of the SDP information. It may indicate that a video port for transmitting the call video stream is used to transmit the content captured from the desktop display content. The following shows a field of the SDP information:

a=sendrecv; indicating a two-way video call
a=sendonly/sendrecv; indicating a one-way video call
a=ds; indicating desktop sharing
m=video 12082 RTP/AVP 114 113; indicating that a video port for transmitting a call video stream is used to transmit video content captured from desktop display content
m=audio 12080 RTP/AVP 104 103 102 101 8 0 18 96 97
b=AS:41
b=RS:600
b=RR:2000
a=rtpmap: 104 AMR-WB/16000/1
a=fmtp:104 mode-change-capability=2;max-red=0
a=rtpmap: 103 AMR-WB/16000/1

| |
|---|
| <sip:172.27.10.10:5060;transport=udp;zte-did=26-3-20481-3629-12-890-3302;zte-uid=200001+861892222222;Hpt=8e48_16;CxtId=4;TRC=ffffffff-ffffffff>;audio;video;ds;+g.3gpp.mid-call;+g.3gpp.srvcc-alerting;+g.3gpp.ps2cs-srvcc-orig-pre-alerting;+g.3gpp.icsi-ref="urn%3Aurn-7%3A3gpp-service.ims.icsi.mmtel"; |

Max-Forwards: 64.

In a second carrying manner, the desktop sharing identifier (ds) is carried in a supported extension field in the SIP message:

Supported: 100rel, histinfo,precondition,timer,ds.

Optionally, when the call initiated by the calling party is a voice call, the SIP message in S604 further includes SDP information of the media server, where the SDP information of the media server includes address information (for example, an IP address), audio port information, an audio encoding/decoding format, video port information, and a video encoding/decoding format of the media server.

When the SIP message includes SDP information of the call terminal, the response message for the SIP message further includes the SDP information of the call terminal, where the SDP information of the call terminal includes address information (for example, an IP address), audio port information, an audio encoding/decoding format, video port information, and a video encoding/decoding format of the call terminal.

In this embodiment of this application, when the call initiated by the calling party is the voice call, after receiving the desktop sharing application sent by the call terminal, the control server may perform media resource negotiation based on the SDP information of the media server and the SDP information of the call terminal in the SIP message and the response message for the SIP message in S604 and S605, to establish the video call media transmission channel. In this case, in the process in which the call terminal, the peer call terminal, and the media server interact to establish the video call media transmission channel in S602, the step of performing media resource negotiation between the control server and the call terminal may be replaced with steps S604 and S605.

a=fmtp:103 octet-align=1;mode-change-capability=2; max-red=0
a=rtpmap:102 AMR/8000/1
a=fmtp:102 mode-change-capability=2;max-red=0
a=rtpmap:101 AMR/8000/1
a=fmtp:101 octet-align=1;mode-change-capability=2; max-red=0
a=rtpmap:96 telephone-event/16000
a=fmtp:96 0-15
a=rtpmap:97 telephone-event/8000
a=fmtp:97 0-15
a=curr:qos local none
a=curr:qos remote none
a=des:qos mandatory local sendrecv
a=des:qos optional remote sendrecv
a=sendrecv
a=maxptime:240
a=ptime:20
m=video 12082 RTP/AVP 114 113
b=AS:2154
b=RS:8000
b=RR:6000
a=rtpmap:114 H264/90000
a=fmtp:114
profile-level-id=42C01F;sprop-parameter-sets=Z0LAH9oC0ChoBtChNQ==,aM4G4g==; packetization-mode=1;sar-understood=16;sar-supported=1
a=imageattr: 114 send [x=720,y=1280] recv [x=720, y=1280]
a=rtpmap:113 H264/90000
a=fmtp:113
profile-level-id=42C01F;sprop-parameter-sets=Z0LAH9oC0ChoBtChNQ==,aM4G4g==; packetization-mode=0;sar-understood=16;sar-supported=1 a=imageattr: 113 send [x=720,y=1280] recv [x=720, y=1280]
a=curr:qos local none
a=curr:qos remote none
a=des:qos mandatory local sendrecv
a=des:qos optional remote sendrecv
a=rtcp-fb:* nack
a=rtcp-fb:* nack pli
a=rtcp-fb:* ccm fir
a=rtcp-fb:* ccm tmmbr
a=sendrecv
a=ds
a=tcap:1 RTP/AVPF
a=pcfg:1 t=1
a=extmap:2 urn: 3gpp:video-orientation It may be understood that it can be learned, based on the descriptions of the SDP information, that the SDP information may indicate whether the video call is a one-way video call or a two-way video call. The call terminal and the peer call terminal are used as an example. The one-way video call may transmit only a call video stream of the call terminal, and does not transmit a video stream of the peer call terminal. For example, the call terminal sends the video content shot by the call terminal to the peer call terminal, and the video content shot by the call terminal is displayed on the peer call terminal, but the peer call terminal does not shoot video content or video content shot by the peer call terminal is not sent to the call terminal, that is, the video content shot by the peer call terminal is not displayed on the call terminal.

S606: The control server sends transmission channel indication information to the call terminal. Correspondingly, the call terminal receives the transmission channel indication information from the control server, where the transmission channel indication information indicates to transmit a desktop video stream through the video call media transmission channel.

Optionally, the transmission channel indication information may be carried in a SIP message. The SIP message and the SIP message in S604 may be a same message, or may be different SIP messages. This is not limited in this embodiment of this application.

The control server may indicate, by using the foregoing explicit indication method (that is, sending the transmission channel indication information) in S606, to transmit the desktop video stream through the video call media transmission channel. In some cases, the control server may alternatively indicate, by using an implicit indication method, to transmit the desktop video stream through the video call media transmission channel. For example, the SIP message in S604 carries the SDP information of the media server, and the response message for the SIP message carries the SDP information of the call terminal, to negotiate (or indicate) to transmit the desktop video stream through the video call media transmission channel established based on the pair of SDP information (the SDP information of the media server and the SDP of the customer service call terminal). It should be understood that the video call media transmission channel is originally used to transmit the call video stream.

S607: The call terminal transmits the desktop video stream to the at least one peer call terminal through the video call media transmission channel.

The desktop video stream includes video content captured by the call terminal from desktop display content.

In an implementation, if the video call media transmission channel includes the first video call media transmission channel and the second video call media transmission channel, that is, the video call media transmission channel is an indirect transmission channel, S605 is implemented through S6071 and S6072.

S6071: The call terminal transmits the desktop video stream to the media server through the first video call media transmission channel. Correspondingly, the media server receives the desktop video stream from the call terminal through the first video call media transmission channel.

S6072: The media server transmits the desktop video stream to the at least one peer call terminal through the second video call media transmission channel.

In this embodiment of this application, the media server may be used as a medium for transmitting the desktop video stream, and the call terminal sends the desktop video stream to the media server through the first video call media transmission channel, so that the media server transmits the desktop video stream to the at least one peer call terminal through the second video call media transmission channel.

Optionally, when the video encoding/decoding format of the call terminal is different from the video encoding/decoding format of the peer call terminal, after S6071 and before S6072, the media server may transcode the received desktop video stream, where an encoding/decoding format of a transcoded desktop video stream is the same as an encoding/decoding format of the at least one peer call terminal. For example, it is assumed that the video encoding/decoding format of the call terminal is a first encoding/decoding format and the video encoding/decoding format of the peer call terminal is a second encoding/decoding format. The call terminal encodes the desktop stream by using the first encoding/decoding format and then sends an encoded desktop stream to the media server. The media server decodes the desktop video stream by using the first encoding/decoding format, encodes the desktop video stream by using the second encoding/decoding format, and then sends the desktop video stream encoded by using the second encoding/decoding format to the peer call terminal.

In another implementation, the video call media transmission channel includes the video call media transmission channel between the call terminal and each of the at least one peer call terminal, that is, the video call media transmission channel is an indirect transmission channel. Therefore, S607 is implemented through S6071', that is, S6071 and S6072 are replaced with S6071'.

S6071': The call terminal transmits the desktop video stream to the at least one peer call terminal through the video call media transmission channel between the call terminal and each of the at least one peer call terminal.

In this embodiment of this application, in the process of the call between the call terminal and the peer call terminal, the call terminal may transmit, to the peer call terminal through the video call media transmission channel (which is originally used to transmit the call video stream), the desktop video stream including the video content captured by the call terminal from the desktop display content of the call terminal.

Optionally, before the desktop video stream is transmitted to the at least one peer call terminal through the video call media transmission channel (that is, S607), the desktop sharing method provided in this embodiment of this application further includes S608.

S608: The call terminal stops transmitting the call video stream to the at least one peer call terminal through the video call media transmission channel.

In the desktop sharing method provided in this embodiment of this application, when the video content captured by the call terminal from the desktop display content is transmitted through the video call media transmission channel, transmission of the video content (that is, the call video stream) shot by the call terminal may be stopped. In this case, the desktop video stream includes only the video content captured from the desktop display content.

When the desktop video stream is transmitted through the first video call media transmission channel and the second video call media transmission channel, the call terminal stops transmitting the call video stream through the first video call media transmission channel. In this way, the media server stops receiving the call video stream from the call terminal through the first video call media transmission channel.

Optionally, in this embodiment of this application, the desktop video stream further includes the video content shot by the call terminal. In the desktop sharing method provided in this embodiment of this application, the video content captured from the desktop display content and the shot video content may also be transmitted through the video call media transmission channel. In this case, the desktop video stream includes the video content captured from the desktop display content and the shot video content.

It should be noted that, when the desktop video stream includes the video content captured from the desktop display content and the shot video content, before the media server transmits the desktop video stream to the at least one peer call terminal through the second video call media transmission channel, and the media server further performs hybrid encoding processing (which may be referred to as hybrid screen processing) on the video content captured by the call terminal and the video content captured by the call terminal from the desktop display content, to obtain the desktop video stream. In this embodiment of this application, after performing hybrid encoding on the video content shot by the call terminal and the video content captured by the call terminal from the desktop display content, the media server obtains the desktop video stream that includes the video content shot by the call terminal and the video content captured from the desktop display content, and then sends the desktop video stream to the peer call terminal through the second video call media transmission channel. In this way, a desktop of the call terminal and a picture shot by the call terminal may be displayed on the peer call terminal. For example, the picture shot by the call terminal is displayed in a first area of a display screen of the peer call terminal, and the desktop of the call terminal is displayed in a second area of the display screen of the peer call terminal.

Optionally, in a service scenario of a manual customer service, the call terminal in the foregoing embodiment is a customer service call terminal, and the at least one peer call terminal includes at least a user call terminal; or the call terminal in the foregoing embodiment is a user call terminal, and the at least one peer call terminal includes at least a customer service call terminal.

In conclusion, according to the desktop sharing method provided in this embodiment of this application, after the control server in a communication system triggers establishment of the video call media transmission channel, the call terminal, the at least one peer call terminal, and the control server interact to establish the video call media transmission channel, where the video call media transmission channel is used by the call terminal in the video call service to transmit the call video stream to the at least one peer call terminal, and the call video stream includes the video content shot by the call terminal. Then, the call terminal may transmit the desktop video stream to the at least one peer call terminal through the video call media transmission channel, where the desktop video stream includes the video content captured by the call terminal from the desktop display content. According to the technical solution provided in this embodiment of this application, when the call terminal shares the desktop of the call terminal with the peer call terminal, the call terminal may send the desktop video stream of the call terminal based on an existing video call media transmission channel, without consuming an additional bandwidth resource to establish a shared information transmission channel dedicated to transmitting the desktop video stream, and without occupying additional port resources of the terminals (including the call terminal and the peer call terminal).

Further, compared with an existing desktop sharing method, in the technical solution provided in this embodiment of this application, desktop sharing APPs do not need to be installed on the user terminal and the customer service terminal. In this way, an operator does not need to perform a complex related operation, and the operator is not required to have a high operation skill.

It may be understood that, in the service scenario of the manual customer service, based on that the call terminal and the peer call terminal are terminals of different roles, application scenarios of the desktop sharing method provided in this embodiment of this application include the following four scenarios, which are respectively referred to as a scenario 1, a scenario 2, a scenario 3, and a scenario 4.

Scenario 1: Desktop sharing is performed in a two-party session process in which the call terminal is a customer service call terminal and the peer call terminal is a user call terminal.

In the scenario 1, in a process of a call between the user call terminal and the customer service call terminal, the customer service call terminal may share a desktop of the customer service call terminal with the user call terminal.

Scenario 2: Desktop sharing is performed in a multi-party session process in which the call terminal is a customer service call terminal, there are a plurality of peer call terminals, and the plurality of peer call terminals include at least a user call terminal.

It should be understood that one user call terminal in the plurality of peer call terminals is a terminal that initiates a call, and a call terminal other than the user call terminal that initiates the call in the plurality of peer call terminals is a third-party call terminal. Optionally, the third-party call terminal may be another customer service call terminal, or may be another user call terminal. This is not limited in this embodiment of this application.

In the scenario 2, in a process of a call between the user call terminal and the customer service call terminal, the customer service call terminal may share a desktop of the customer service call terminal with the user call terminal and the third-party call terminal (that is, at least one peer call terminal).

Scenario 3: Desktop sharing is performed in a two-party session process in which the call terminal is a user call terminal and the peer call terminal is a customer service call terminal.

In the scenario 3, in a process of a call between the user call terminal and the customer service call terminal, the user call terminal may share a desktop of the user call terminal with the customer service call terminal.

Scenario 4: Desktop sharing is performed in a multi-party session process in which the call terminal is a user call terminal, there are a plurality of peer call terminals, and the plurality of peer call terminals include at least a customer service call terminal.

It should be understood that, one customer service call terminal in the plurality of peer call terminals is a customer service call terminal allocated by a customer service system to the user call terminal when the user call terminal calls the customer service system, and a call terminal other than the customer service call terminal in the plurality of peer call terminals is a third-party call terminal. Optionally, the third-party call terminal may be another customer service call terminal, or may be another user call terminal. This is not limited in this embodiment of this application.

In the scenario 4, in a process of a call between the user call terminal and the customer service call terminal, the user call terminal may share a desktop of the user call terminal with the customer service call terminal and the third-party call terminal.

Based on the related descriptions of the foregoing embodiment, it can be learned that in the scenario 1, the scenario 2, the scenario 3, and the scenario 4, the user call terminal that initiates the call may initiate a video call, or may initiate a voice call. In addition, based on the related descriptions of the foregoing embodiment, it can also be learned that, in the scenario 1, the scenario 2, the scenario 3, and the scenario 4, a media transmission channel (including a voice call media transmission channel, or a voice call media transmission channel and a video call media transmission channel) established in the process of the call between the user call terminal and the customer service call terminal may be an indirect media transmission channel, or may be a direct media transmission channel. In the following embodiments, the desktop sharing method provided in embodiments of this application is described in detail by using an example in which the call initiated by the user call terminal is a voice call, and the media transmission channel established in the process of the call between the user call terminal and the customer service call terminal is an indirect media transmission channel.

Figure 7A:
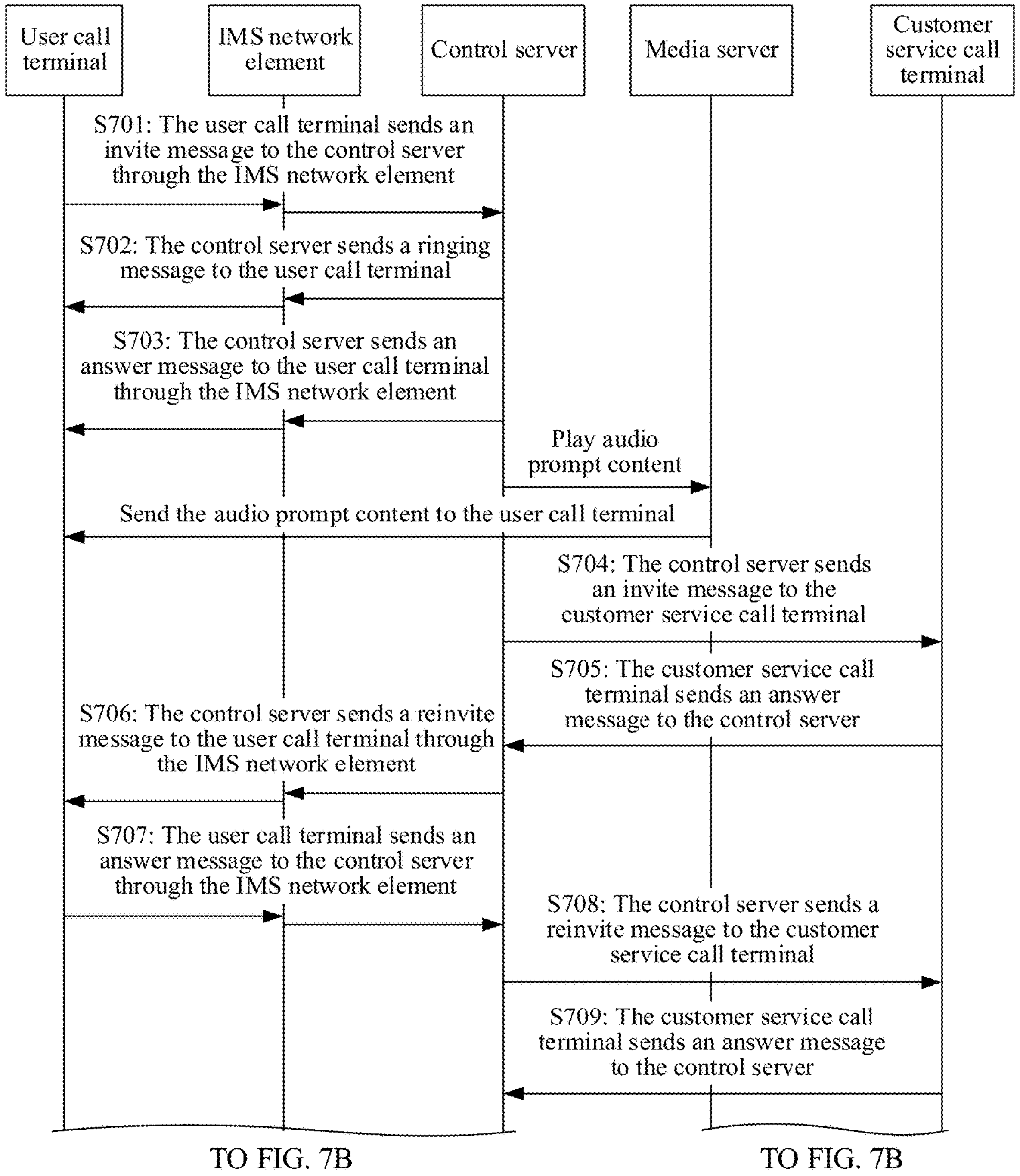
FIG. 7A and FIG. 7B are a diagram of a desktop sharing method according to an embodiment of this application.
Figure 7B:
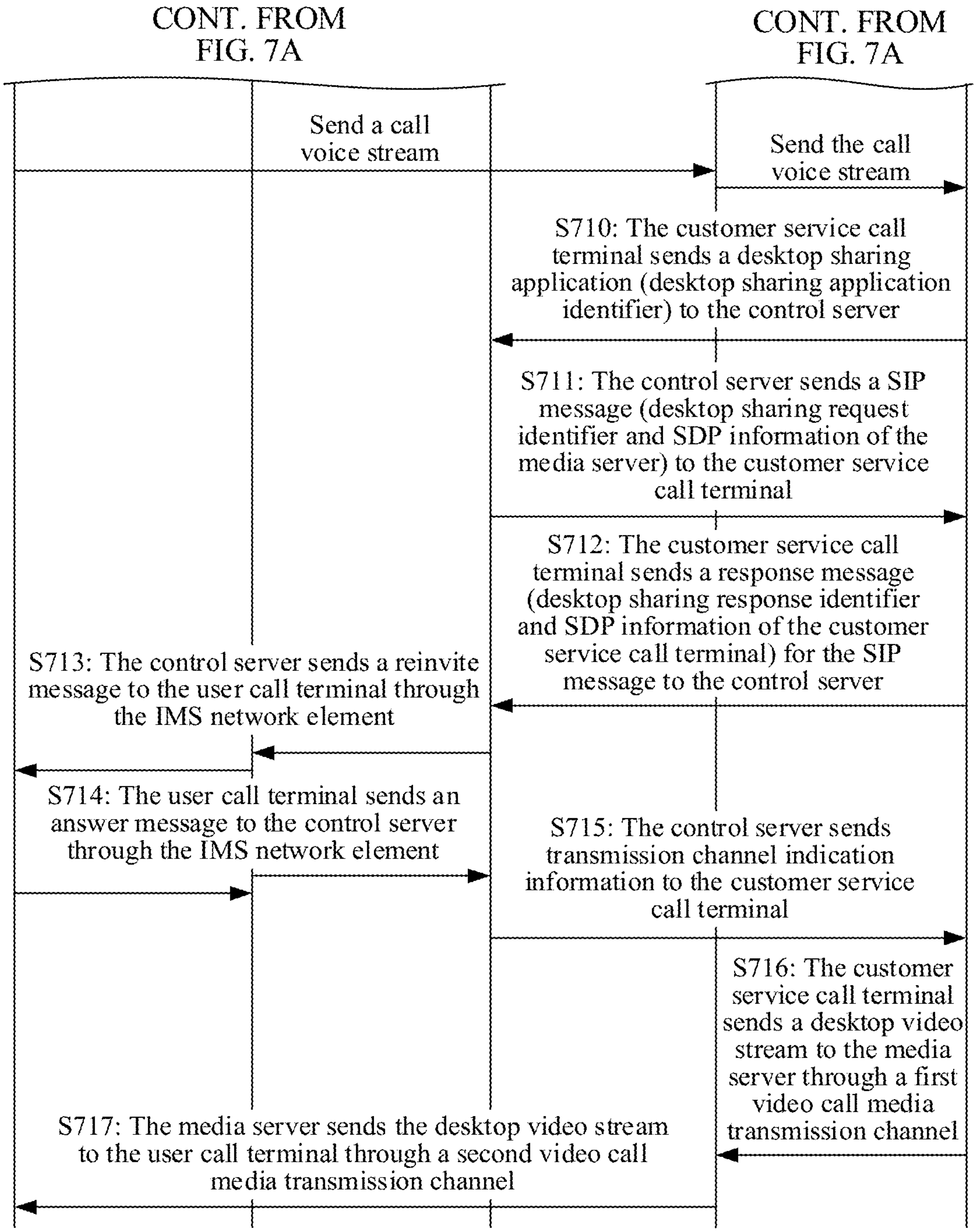

For the scenario 1 (where a call terminal is a customer service call terminal, and a peer call terminal is a user call terminal), in the scenario 1, the customer service call terminal shares a desktop of the customer service call terminal with the user call terminal, and the desktop sharing method provided in embodiments of this application is described from a perspective of interaction between devices. As shown in FIG. 7A and FIG. 7B, a desktop sharing method provided in an embodiment of this application includes S701 to S717.

S701: A user call terminal sends an invite message to a control server through an IMS network element.

S702: The control server sends a ringing message to the user call terminal through the IMS network element.

S703: The control server sends an answer message to the user call terminal through the IMS network element.

It may be understood that, after a customer service system answers a call of the user call terminal, the control server may send an instruction to a media server, where the instruction instructs the media server to play audio prompt content related to a user service, to prompt a user to select different service content (for example, select a manual service) based on requirements. When the user performs an operation under the prompt of the audio prompt content and selects the manual service, after the media server detects the operation of selecting the manual service, the media server notifies the control server of a selection result of the user, and then the control server allocates a customer service member to the user (that is, selects a corresponding customer service call terminal for the user call terminal).

S704: The control server sends an invite message to the customer service call terminal.

S705: The customer service call terminal sends an answer message to the control server.

S706: The control server sends a reinvitemessage to the user call terminal through the IMS network element.

The reinvite message includes SDP information of the media server, and the SDP information of the media server includes address information (for example, an IP address), audio port information, and an audio encoding/decoding format of the media server.

S707: The user call terminal sends an answer message to the control server through the IMS network element.

The answer message includes SDP information of the user call terminal, and the SDP information of the user call terminal includes address information (for example, an IP address), audio port information, and an audio encoding/decoding format of the user call terminal.

S708: The control server sends a reinvite message to the customer service call terminal.

The reinvite message includes the SDP information of the media server. For descriptions of the SDP information of the media server, refer to S706.

S709: The customer service call terminal sends an answer message to the control server.

The answer message includes SDP information of the customer service call terminal, and the SDP information of the customer service call terminal includes address information (for example, an IP address), audio port information, and an audio encoding/decoding format of the customer service call terminal.

S706 to S709 are a process in which after the control server triggers establishment of a voice call media transmission channel, a call terminal, a peer call terminal, the control server, and the media server interact to establish an indirect voice call media transmission channel between the user call terminal and the customer service call terminal through media resource negotiation. The control server is configured to forward messages of the call terminal, the peer call terminal, and the media server.

It may be understood that S701 to S709 are a process in which the user call terminal calls the customer service call terminal and the voice call media transmission channel is established. For content carried in messages in steps S701 to S709, refer to the foregoing detailed descriptions of S201 to S209. Details are not described herein again.

S710: The customer service call terminal sends a desktop sharing application to the control server. Correspondingly, the control server receives the desktop sharing application sent by the customer service call terminal.

The desktop sharing application includes a desktop sharing application identifier, and the desktop sharing application identifier is used to request to share a desktop of the customer service call terminal with the user call terminal in a process of a video call between the customer service call terminal and the user call terminal.

It should be noted that the user call terminal initiates a voice call, and the voice call media transmission channel is established through steps S706 to S709 in the foregoing embodiment. A desktop video stream needs to be transmitted in a desktop sharing process, but only a call voice stream can be transmitted and a video stream cannot be transmitted in a voice call process. Therefore, after the control server receives the desktop sharing application, the control server triggers establishment of a video call media transmission channel. The voice call needs to be converted into a video call, to establish a transmission channel that can be used to transmit the video stream, and the desktop video stream is transmitted through the video call media transmission channel. A process of establishing the video call media transmission channel is S711 to S714 below.

S711: The control server sends a SIP message to the customer service call terminal. Correspondingly, the customer service call terminal receives the SIP message from the control server. The SIP message includes a desktop sharing request identifier and SDP information of the media server.

The SDP information of the media server includes the address information, the audio port information, the audio encoding/decoding format, video port information, and a video encoding/decoding format of the media server. It should be noted that, different from SDP information (including address information, audio port information, and an audio encoding/decoding format of a device) in a media resource negotiation message in a voice call scenario, SDP information in a media resource negotiation message in a video call scenario further includes video port information and a video encoding/decoding format of the device.

S712: The customer service call terminal sends a response message for the SIP message to the control server. Correspondingly, the control server receives the response message for the SIP message from the customer service call terminal, where the response message for the SIP message includes the desktop sharing response identifier and SDP information of the customer service call terminal.

The SDP information of the customer service call terminal includes the address information, the audio port information, the audio encoding/decoding format, video port information, and a video encoding/decoding format of the customer service call terminal.

It should be noted that, the desktop sharing request identifier in the SIP message and the desktop sharing response identifier in the response message for the SIP message are used to determine whether the customer service call terminal has a desktop sharing capability. The SDP information of the media server in the SIP message and the SDP information of the customer service call terminal in the response message for the SIP message are used to perform media resource negotiation, and establish a video call media transmission channel (that is, a first video call media transmission channel) between the media server and the customer service call terminal.

S713: The control server sends a reinvite message to the user call terminal through the IMS network element.

The reinvite message includes the SDP information of the media server, and the SDP information of the media server includes the address information, the audio port information, the audio encoding/decoding format, the video port information, and the video encoding/decoding format of the media server.

S714: The user call terminal sends an answer message to the control server through the IMS network element.

The answer message includes SDP information of the user call terminal, and the SDP information of the user call terminal includes the address information (for example, the IP address), the audio port information, the audio encoding/decoding format, video port information, and a video encoding/decoding format of the user call terminal.

A video call media transmission channel (that is, a second video call media transmission channel) between the user call terminal and the media server may be established through the media resource negotiation process in S713 and S714. The first video call media transmission channel and the second video call media transmission channel exist in pairs, and are transmission channels used for communication between the customer service call terminal and the user call terminal.

S715: The control server sends transmission channel indication information to the customer service call terminal. Correspondingly, the customer service call terminal receives the transmission channel indication information from the control server, where the transmission channel indication information indicates to transmit the desktop video stream through the video call media transmission channel.

At this point, the transmission channel used to transmit the desktop video stream is established, and the transmission channel used to transmit the desktop video stream is a video call media transmission channel. Based on the video call media transmission channel, the customer service call terminal may share the desktop of the customer service call terminal with the user call terminal. A specific process is S716 and S717 below.

S716: The customer service call terminal sends the desktop video stream to the media server through the first video call media transmission channel. Correspondingly, the media server receives the desktop video stream from the customer service call terminal through the first video call media transmission channel, where the desktop video stream includes video content captured by the customer service call terminal from desktop display content of the customer service call terminal.

In this embodiment of this application, the customer service call terminal transmits, based on the transmission channel indication information received by the customer service call terminal, the desktop video stream through the first video call media transmission channel used to transmit a call video stream.

S717: The media server sends the desktop video stream to the user call terminal through the second video call media transmission channel.

Correspondingly, the user call terminal receives the desktop video stream from the media server through the second video call media transmission channel, and displays a picture corresponding to the desktop video stream (that is, the desktop of the customer service call terminal) on a display screen of the user call terminal.

In this embodiment of this application, after the media server receives the desktop video stream from the customer service call terminal through the first video call media transmission channel, the media server sends the desktop video stream to the user call terminal through the second video call media transmission channel corresponding to the first video call media transmission channel.

Optionally, in this embodiment of this application, in a process of transmitting the desktop video stream through the video call media transmission channel, if the desktop video stream includes only the video content captured by the customer service call terminal from the desktop display content of the customer service call terminal, and does not include video content shot by the customer service call terminal, before the customer service call terminal transmits the desktop video stream based on the video call media transmission channel, the customer service call terminal first stops transmitting the call video stream through the video call media transmission channel, where the call video stream includes the video content shot by the customer service call terminal.

Optionally, in a process of transmitting the desktop video stream through the video call media transmission channel, if the desktop video stream includes the video content captured by the customer service call terminal from the desktop display content of the customer service call terminal and video content shot by the customer service call terminal, after the media server receives the desktop video stream, the media server may perform hybrid encoding on the video content shot by the call terminal and the video content captured by the call terminal from the desktop display content, and then send the desktop video stream to the user call terminal through the second video call media transmission channel.

Optionally, when a video encoding/decoding format of the customer service call terminal is different from a video encoding/decoding format of the user call terminal, the media server may further transcode the received desktop video stream, and then send the desktop video stream to the user call terminal through the second video call media transmission channel, where an encoding/decoding format of a transcoded desktop video stream is the same as an encoding/decoding format of the user call terminal.

For descriptions of other details of S701 to S717, refer to the related descriptions of S601 to S608. Details are not described herein again.

Figure 8A:
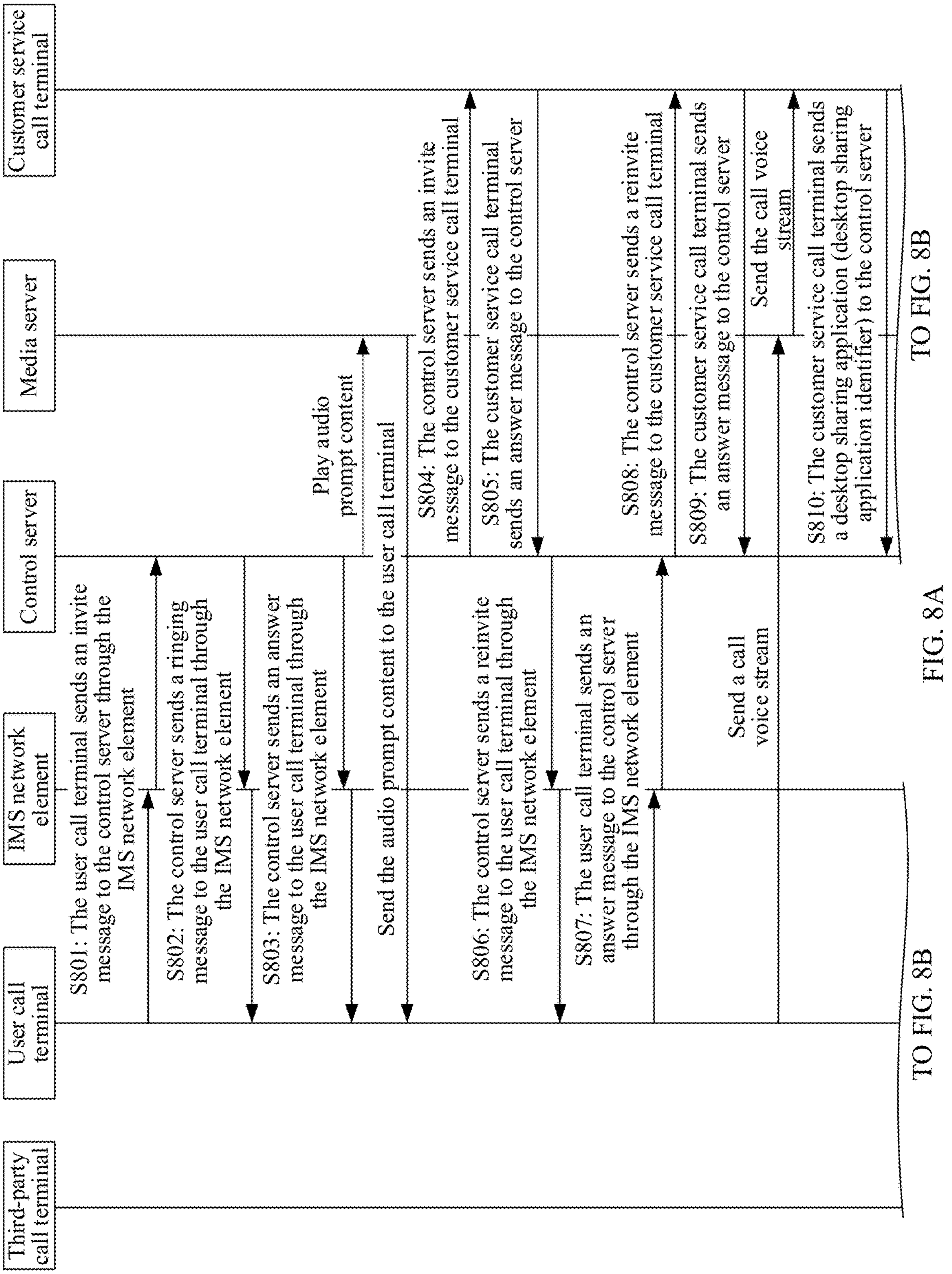
FIG. 8A and FIG. 8B are a diagram of a desktop sharing method according to an embodiment of this application.
Figure 8B:
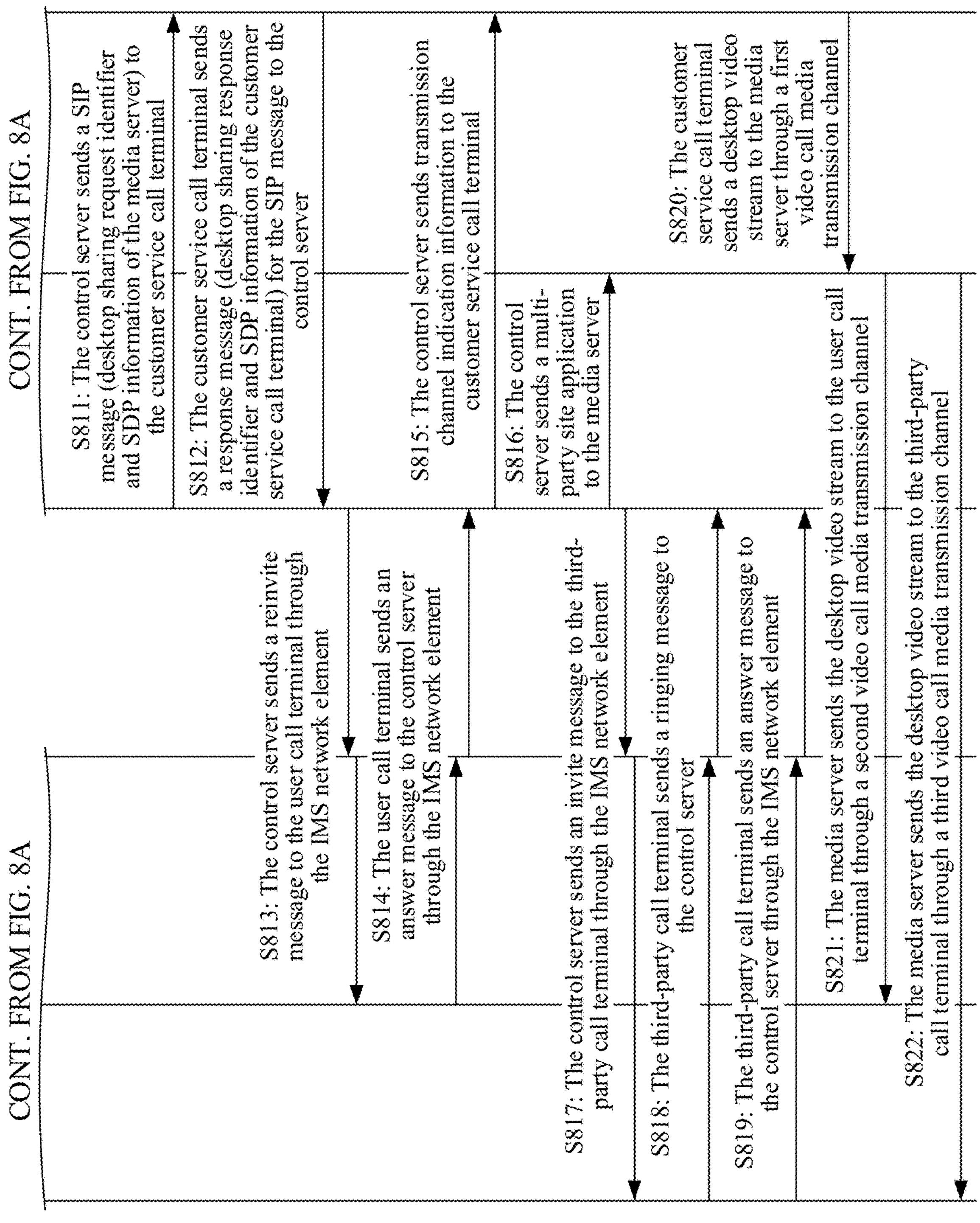

For the scenario 2 (where a call terminal is a customer service call terminal, there are a plurality of peer call terminals, and the plurality of peer call terminals include at least a user call terminal), in other words, in the scenario 2, in a process of a call between the user call terminal and the customer service call terminal, one or more third-party call terminals are invited to join the call to form a three-party session. That is, both the user call terminal and the one or more third-party call terminals are peer call terminals. In the scenario 2, the customer service call terminal shares a desktop of the customer service call terminal with the user call terminal and the one or more third-party call terminals. The desktop sharing method provided in embodiments of this application is described from a perspective of interaction between devices. As shown in FIG. 8A and FIG. 8B, a desktop sharing method provided in an embodiment of this application includes S801 to S822.

S801: A user call terminal sends an invite message to a control server through an IMS network element.

S802: The control server sends a ringing message to the user call terminal through the IMS network element.

S803: The control server sends an answer message to the user call terminal through the IMS network element.

S804: The control server sends an invite message to a customer service call terminal.

S805: The customer service call terminal sends an answer message to the control server.

S806: The control server sends a reinvite message to the user call terminal through the IMS network element.

S807: The user call terminal sends an answer message to the control server through the IMS network element.

S808: The control server sends a reinvite message to the customer service call terminal.

S809: The customer service call terminal sends an answer message to the control server.

It may be understood that S801 to S809 are a process in which the user call terminal calls the customer service call terminal and a voice call media transmission channel is established. S801 to S809 are the same process as S701 to S709. For descriptions of S801 to S809, refer to the descriptions of S701 to S709. Details are not described herein again.

S810: The customer service call terminal sends a desktop sharing application to the control server. Correspondingly, the control server receives the desktop sharing application sent by the customer service call terminal.

The desktop sharing application includes a desktop sharing application identifier, and the desktop sharing application identifier is used to request to share a desktop of the customer service call terminal with the user call terminal in a process of a video call between the customer service call terminal and the user call terminal.

Same as the scenario 1, the user call terminal initiates a voice call, and the voice call media transmission channel is established through steps S806 to S809 in the foregoing embodiment. A desktop video stream needs to be transmitted in a desktop sharing process, but only a call voice stream can be transmitted and a video stream cannot be transmitted in a voice call process. Therefore, after the control server receives the desktop sharing application, the control server triggers establishment of a video call media transmission channel. The voice call needs to be converted into a video call, to establish a transmission channel that can be used to transmit the video stream, and the desktop video stream is transmitted through the video call media transmission channel. A process of establishing the video call media transmission channel is S811 to S814 below.

S811: The control server sends a SIP message to the customer service call terminal. Correspondingly, the customer service call terminal receives the SIP message from the control server. The SIP message includes a desktop sharing request identifier and SDP information of a media server.

S812: The customer service call terminal sends a response message for the SIP message to the control server. Correspondingly, the control server receives the response message for the SIP message from the customer service call terminal, where the response message for the SIP message includes a desktop sharing response identifier and SDP information of the customer service call terminal.

The desktop sharing request identifier in the SIP message and the desktop sharing response identifier in the response message for the SIP message are used to determine whether the customer service call terminal has a desktop sharing capability. The SDP information of the media server in the SIP message and the SDP information of the customer service call terminal in the response message for the SIP message are used to perform media resource negotiation, and establish a video call media transmission channel (that is, a first video call media transmission channel) between the media server and the customer service call terminal.

S813: The control server sends a reinvite message to the user call terminal through the IMS network element.

S814: The user call terminal sends an answer message to the control server through the IMS network element.

A video call media transmission channel (that is, a second video call media transmission channel) between the user call terminal and the media server may be established through the media resource negotiation process in S813 and S814. S811 to S814 are the same process as S711 to S714. For specific descriptions of S811 to S814, refer to the descriptions of S711 to S714. Details are not described herein again. It should be understood that the first video call media transmission channel and the second video call media transmission channel exist in pairs, and are transmission channels used for communication between the customer service call terminal and the user call terminal.

S815: The control server sends transmission channel indication information to the customer service call terminal. Correspondingly, the customer service call terminal receives the transmission channel indication information from the control server, where the transmission channel indication information indicates to transmit the desktop video stream through the video call media transmission channel.

At this point, the transmission channel that is between the user call terminal and the customer service call terminal and that is used to transmit the desktop video stream is established, and the transmission channel used to transmit the desktop video stream is a video call media transmission channel. Based on the video call media transmission channel, the customer service call terminal may share the desktop of the customer service call terminal with the user call terminal.

It should be noted that in some cases, in the process of the call between the user call terminal and the customer service call terminal, due to some factors, a third-party call terminal needs to be invited to join the call between the user call terminal and the customer service call terminal, where the third-party call terminal may be a user call terminal, or may be a customer service call terminal. For example, a customer service member corresponding to a current customer service call terminal cannot resolve a question raised by a user, and a third-party customer service member needs to be invited for assistance; or a communication obstacle exists between the current customer service member and the user, and a third-party user needs to be invited for assistance. The third-party call terminal to be invited is determined based on an actual requirement. This is not limited in this embodiment of this application.

It may be understood that, when the third-party call terminal needs to be invited to join the call, the customer service call terminal or the user call terminal may apply to the control server. For example, the customer service call terminal sends a third-party session request to the control server, where the third-party session request is used to request the third-party customer service call terminal to join the call between the customer service call terminal and the user call terminal. Correspondingly, the control server receives the third-party session request, and then the control server performs S816.

S816: The control server sends a multi-party site application to the media server. Correspondingly, the media server receives the multi-party site application sent by the control server, where the multi-party site application is used to request the media server to create a multi-party site.

The multi-party site is used by the customer service call terminal, the user call terminal, and the third-party call terminal to perform a multi-party call (for example, a three-party call, a four-party call, or a five-party call). This embodiment of this application is described by using one third-party call terminal as an example.

In this embodiment of this application, after the media server receives the multi-party site application, the media server creates the multi-party site, and sends identification information of the multi-party site to the customer service call terminal, the user call terminal, and the third-party call terminal.

Optionally, a sequence of performing S816 and S811 to S814 is not limited in this embodiment of this application. S816 may be performed before S811 to S814, or S811 to S814 may be performed before S816.

S817: The control server sends an invite message to the third-party call terminal through the IMS network element.

The invite message includes the SDP information of the media server, and the SDP information of the media server includes address information, audio port information, an audio encoding/decoding format, video port information, and a video encoding/decoding format of the media server.

The invite message is used to call the third-party call terminal to join the call between the customer service call terminal and the user call terminal.

S818: The third-party call terminal sends a ringing message to the control server.

The ringing message includes SDP information of the third-party call terminal, and the SDP information of the third-party call terminal includes address information, audio port information, an audio encoding/decoding format, video port information, and a video encoding/decoding format of the third-party call terminal.

S819: The third-party call terminal sends an answer message to the control server through the IMS network element.

In this embodiment of this application, the third-party call terminal sends the answer message to the control server, indicating that the third-party call terminal has answered a call of the control server and agrees to join the call between the customer service call terminal and the user call terminal.

S817 to S819 are a process of calling the third-party call terminal, and are also a process of performing media resource negotiation with the third-party call terminal. A video call media transmission channel (which may be referred to as a third video call media transmission channel) between the third-party call terminal and the media server may be established through S817 to S819.

At this point, based on the established first video call media transmission channel, the established second video call media transmission channel, and the established third video call media transmission channel, the customer service call terminal may share the desktop of the customer service call terminal with the user call terminal, and may share the desktop of the customer service call terminal with the third-party call terminal. A specific process is S820 to S822 below.

S820: The customer service call terminal sends the desktop video stream to the media server through the first video call media transmission channel. Correspondingly, the media server receives the desktop video stream from the customer service call terminal through the first video call media transmission channel, where the desktop video stream includes video content captured by the customer service call terminal from desktop display content of the customer service call terminal.

S821: The media server sends the desktop video stream to the user call terminal through the second video call media transmission channel.

Correspondingly, the user call terminal receives the desktop video stream from the media server through the second video call media transmission channel, and displays a picture corresponding to the desktop video stream on a display screen of the user call terminal.

S822: The media server sends the desktop video stream to the third-party call terminal through the third video call media transmission channel.

Correspondingly, the third-party call terminal receives the desktop video stream from the media server through the third video call media transmission channel, and displays the picture corresponding to the desktop video stream on a display screen of the third-party call terminal.

Optionally, in the multi-party session process of the scenario 2, the media server may also perform hybrid encoding processing on video content received by the media server from a plurality of parties. For example, when the third-party call terminal joins the call between the customer service call terminal and the user call terminal, the media server may receive the desktop video stream from the customer service call terminal, where the desktop video stream includes the video content captured by the customer service call terminal from the desktop display content of the customer service call terminal and video content shot by the customer service call terminal. The media server may also receive, from the user call terminal, video content shot by the user call terminal, and the media server may perform hybrid encoding on the video content captured by the customer service call terminal from the desktop display content of the customer service call terminal, the video content shot by the customer service call terminal, and the video content shot by the user call terminal, and then send a video stream obtained through the hybrid encoding to the third-party call terminal. In this way, the desktop of the customer service call terminal can be displayed, and the video content shot by the customer service call terminal and the video content shot by the user call terminal can also be displayed on the third-party call terminal.

It can be learned from the content of the foregoing embodiment that the desktop sharing method described in S801 to S822 is an extension (extended to the multi-party session) of the desktop sharing method described in S701 to S717. A procedure of S801 to S822 is similar to a procedure of S701 to S717. For descriptions of other details of S801 to S822, refer to the related descriptions in S701 to S717. Details are not described herein again.

Figure 9A:
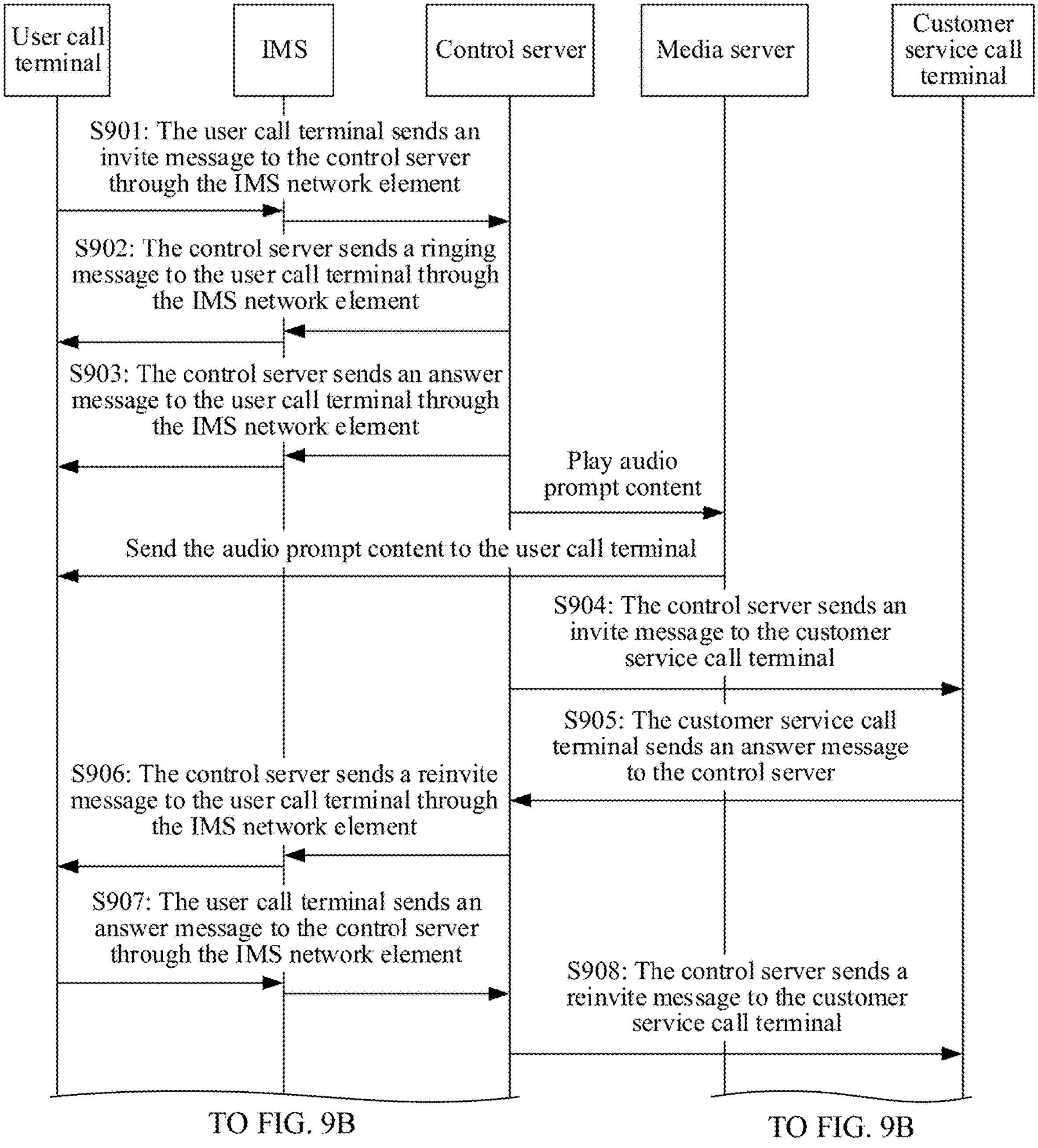
FIG. 9A and FIG. 9B are a diagram of a desktop sharing method according to an embodiment of this application.
Figure 9B:
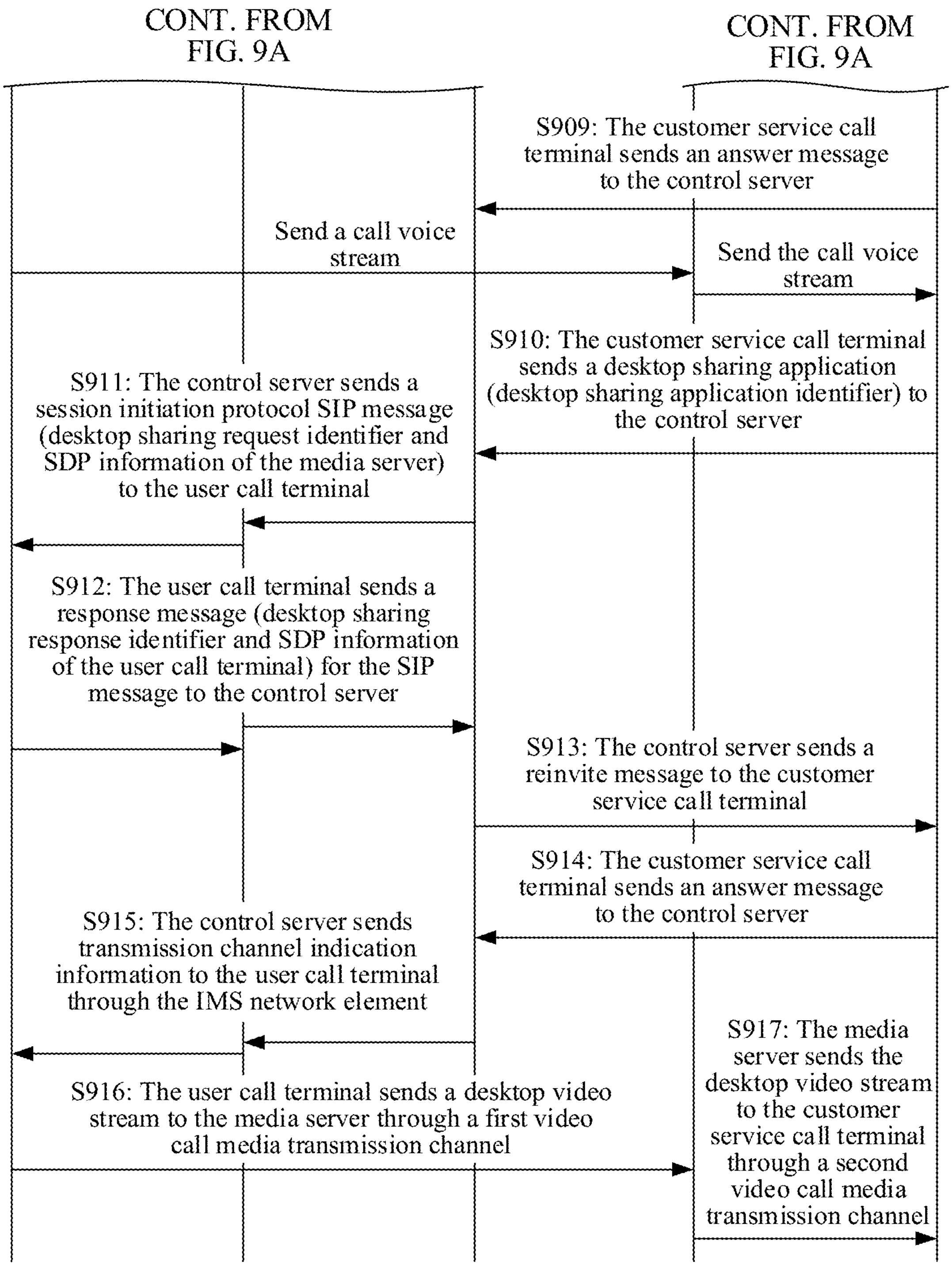

For the scenario 3 (where a call terminal is a user call terminal, and a peer call terminal is a customer service call terminal), in the scenario 3, the user call terminal shares a desktop of the user call terminal with the customer service call terminal, and the desktop sharing method provided in embodiments of this application is described from a perspective of interaction between devices. As shown in FIG. 9A and FIG. 9B, a desktop sharing method provided in an embodiment of this application includes S901 to S917.

S901: A user call terminal sends an invite message to a control server through an IMS network element.

S902: The control server sends a ringing message to the user call terminal through the IMS network element.

S903: The control server sends an answer message to the user call terminal through the IMS network element.

S904: The control server sends an invite message to a customer service call terminal.

S905: The customer service call terminal sends an answer message to the control server.

S906: The control server sends a reinvite message to the user call terminal through the IMS network element.

The reinvite message includes SDP information of a media server, and the SDP information of the media server includes address information (for example, an IP address), audio port information, and an audio encoding/decoding format of the media server.

S907: The user call terminal sends an answer message to the control server through the IMS network element.

The answer message includes SDP information of the user call terminal, and the SDP information of the user call terminal includes address information (for example, an IP address), audio port information, and an audio encoding/decoding format of the user call terminal.

S908: The control server sends a reinvite message to the customer service call terminal.

The reinvite message includes the SDP information of the media server. For descriptions of the SDP information of the media server, refer to S906.

S909: The customer service call terminal sends an answer message to the control server.

The answer message includes SDP information of the customer service call terminal, and the SDP information of the customer service call terminal includes address information (for example, an IP address), audio port information, and an audio encoding/decoding format of the customer service call terminal.

S906 to S909 are a process in which after the control server triggers establishment of a voice call media transmission channel, a call terminal, a peer call terminal, the control server, and the media server interact to establish an indirect voice call media transmission channel between the user call terminal and the customer service call terminal through media resource negotiation. The control server is configured to forward messages of the call terminal, the peer call terminal, and the media server.

It may be understood that S901 to S909 are a process in which the user call terminal calls the customer service call terminal and the voice call media transmission channel is established. For content carried in messages in steps S901 to S909, refer to the detailed descriptions of related steps in the scenario 1 or the scenario 2. Details are not described herein again.

S910: The customer service call terminal sends a desktop sharing application to the control server. Correspondingly, the control server receives the desktop sharing application sent by the customer service call terminal.

The desktop sharing application includes a desktop sharing application identifier, and the desktop sharing application identifier is used to request the customer service call terminal to share a desktop of the user call terminal in a process of a call between the user call terminal and the customer service call terminal.

It may be understood that, regardless of whether the customer service call terminal shares a desktop of the customer service call terminal with the user call terminal, or the user call terminal shares the desktop of the user call terminal with the customer service call terminal, a party that sends a desktop sharing application is the customer service call terminal. It should be noted that in the two cases, desktop sharing application identifiers carried in desktop sharing applications have different meanings.

Same as the scenario 1 and the scenario 2, the user call terminal initiates a voice call, and the voice call media transmission channel is established through steps S906 to S909 in the foregoing embodiment. A desktop video stream needs to be transmitted in a desktop sharing process, but only a call voice stream can be transmitted and a video stream cannot be transmitted in a voice call process. Therefore, after the control server receives the desktop sharing application, the control server triggers establishment of a video call media transmission channel. The voice call needs to be converted into a video call, to establish a transmission channel that can be used to transmit the video stream, and the desktop video stream is transmitted through the video call media transmission channel. A process of establishing the video call media transmission channel is S911 to S914 below.

S911: The control server sends a SIP message to the user call terminal. Correspondingly, the user call terminal receives the SIP message from the control server. The SIP message includes a desktop sharing request identifier and the SDP information of the media server.

The SDP information of the media server includes address information, audio port information, an audio encoding/decoding format, video port information, and a video encoding/decoding format of the media server. It should be noted that, different from SDP information (including address information, audio port information, and an audio encoding/decoding format of a device) in a media resource negotiation message in a voice call scenario, SDP information in a media resource negotiation message in a video call scenario further includes video port information and a video encoding/decoding format of the device.

S912: The user call terminal sends a response message for the SIP message to the control server. Correspondingly, the control server receives the response message for the SIP message from the user call terminal, where the response message for the SIP message includes a desktop sharing response identifier and SDP information of the user call terminal.

The SDP information of the user call terminal includes the address information, the audio port information, the audio encoding/decoding format, video port information, and a video encoding/decoding format of the user call terminal.

The desktop sharing request identifier in the SIP message and the desktop sharing response identifier in the response message for the SIP message are used to determine whether the user call terminal has a desktop sharing capability. The SDP information of the media server in the SIP message and the SDP information of the user call terminal in the response message for the SIP message are used to perform media resource negotiation, and establish a video call media transmission channel (that is, a first video call media transmission channel) between the media server and the user call terminal.

S913: The control server sends a reinvite message to the customer service call terminal.

The reinvite message includes the SDP information of the media server, and the SDP information of the media server includes the address information, the audio port information, the audio encoding/decoding format, the video port information, and the video encoding/decoding format of the media server.

S914: The customer service call terminal sends an answer message to the control server.

The answer message includes SDP information of the customer service call terminal, and the SDP information of the customer service call terminal includes the address information (for example, the IP address), the audio port information, the audio encoding/decoding format, video port information, and a video encoding/decoding format of the customer service call terminal.

A video call media transmission channel (that is, a second video call media transmission channel) between the customer service call terminal and the media server may be established through the media resource negotiation process in S913 and S914. It should be understood that the first video call media transmission channel and the second video call media transmission channel exist in pairs, and are transmission channels used for communication between the customer service call terminal and the user call terminal.

S915: The control server sends transmission channel indication information to the user call terminal through the IMS network element. Correspondingly, the user call terminal receives the transmission channel indication information from the control server, where the transmission channel indication information indicates to transmit the desktop video stream through the video call media transmission channel.

At this point, the transmission channel used to transmit the desktop video stream is established, and the transmission channel used to transmit the desktop video stream is a video call media transmission channel. Based on the video call media transmission channel, the user call terminal may share the desktop of the user call terminal with the customer service call terminal. A specific process is S916 and S917 below.

S916: The user call terminal sends the desktop video stream to the media server through the first video call media transmission channel. Correspondingly, the media server receives the desktop video stream from the user call terminal through the first video call media transmission channel, where the desktop video stream includes video content captured by the user call terminal from desktop display content of the user call terminal.

S917: The media server sends the desktop video stream to the customer service call terminal through the second video call media transmission channel.

Correspondingly, the customer service call terminal receives the desktop video stream from the media server through the second video call media transmission channel, and displays a picture corresponding to the desktop video stream (that is, the desktop of the user call terminal) on a display screen of the customer service call terminal.

A difference between the scenario 3 and the scenario 1 lies in that the customer service call terminal shares the desktop of the user call terminal, and a part of the procedure of the scenario 1 and a part of the procedure of the scenario 3 are similar. For descriptions of other details of S901 to S917, refer to the related descriptions of the embodiment corresponding to the scenario 1. Details are not described herein again.

Figure 10A:
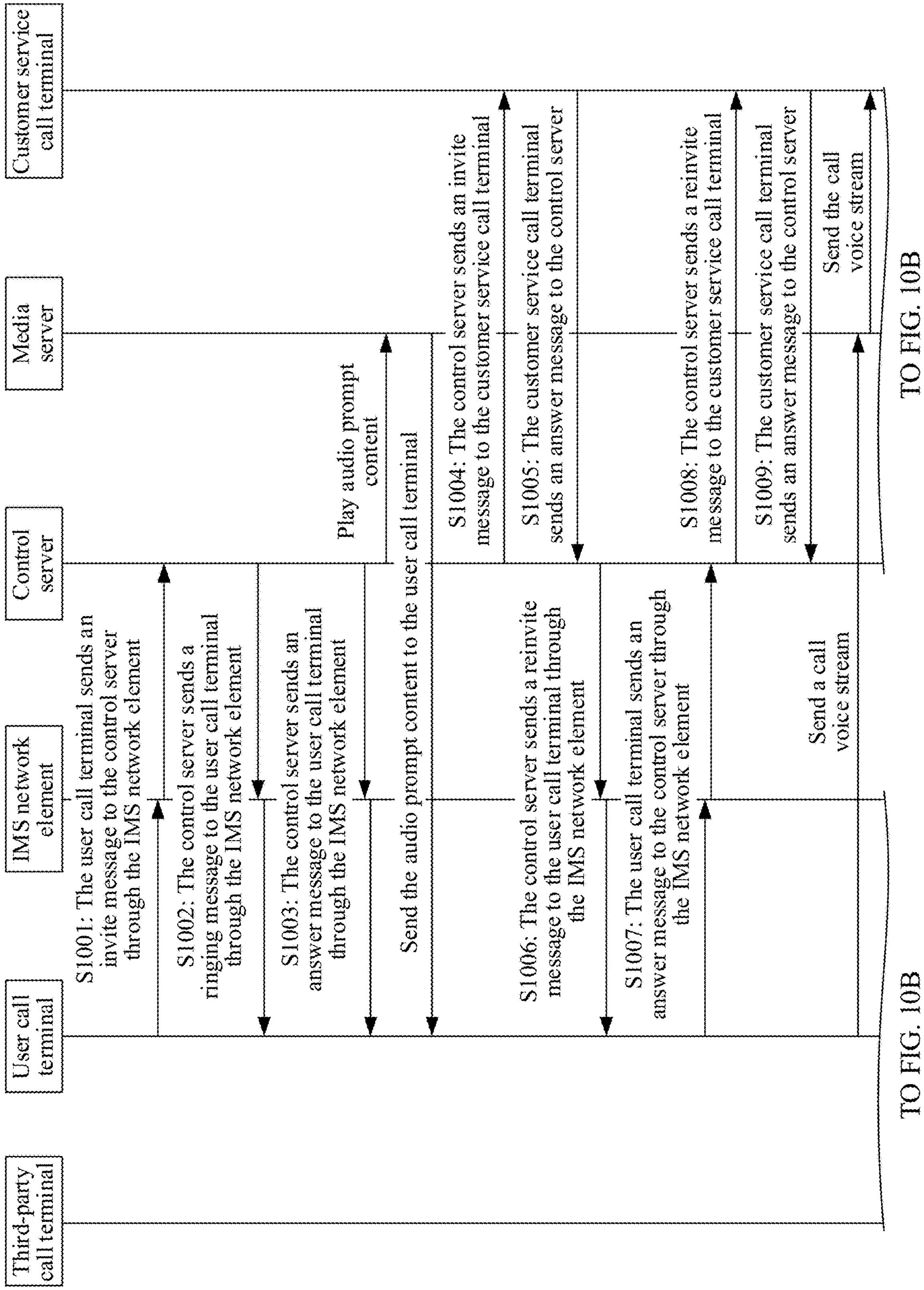
FIG. 10A and FIG. 10B are a diagram of a desktop sharing method according to an embodiment of this application.
Figure 10B:
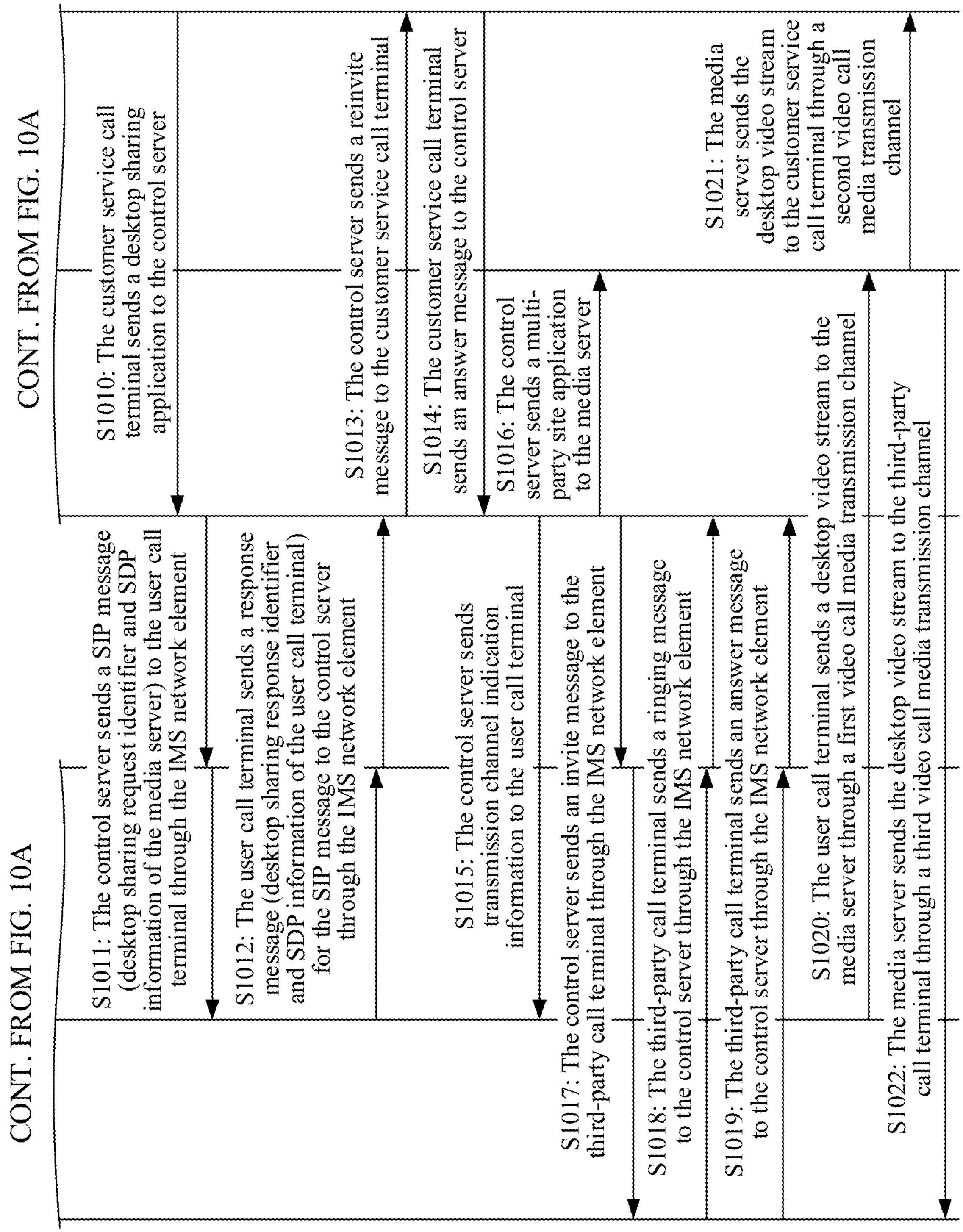

For the scenario 4 (where a call terminal is a user call terminal, there are a plurality of peer call terminals, and the plurality of peer call terminals include at least a customer service call terminal), in other words, in the scenario 4, in a process of a call between the user call terminal and the customer service call terminal, one or more third-party call terminals are invited to join the call to form a three-party session. That is, both the customer service call terminal and the one or more third-party call terminals are peer call terminals. In the scenario 4, the user call terminal shares a desktop of the user call terminal with the customer service call terminal and the one or more third-party call terminals. The desktop sharing method provided in embodiments of this application is described from a perspective of interaction between devices. As shown in FIG. 10A and FIG. 10B, a desktop sharing method provided in an embodiment of this application includes S1001 to S1022.

S1001: A user call terminal sends an invite message to a control server through an IMS network element.

S1002: The control server sends a ringing message to the user call terminal through the IMS network element.

S1003: The control server sends an answer message to the user call terminal through the IMS network element.

S1004: The control server sends an invite message to a customer service call terminal.

S1005: The customer service call terminal sends an answer message to the control server.

S1006: The control server sends a reinvite message to the user call terminal through the IMS network element.

S1007: The user call terminal sends an answer message to the control server through the IMS network element.

S1008: The control server sends a reinvite message to the customer service call terminal.

S1009: The customer service call terminal sends an answer message to the control server.

It may be understood that S1001 to S1009 are a process in which the user call terminal calls the customer service call terminal and a voice call media transmission channel is established. S1001 to S1009 are the same process as S901 to S909. For descriptions of S1001 to S1009, refer to the descriptions of S901 to S909. Details are not described herein again.

S1010: The customer service call terminal sends a desktop sharing application to the control server. Correspondingly, the control server receives the desktop sharing application sent by the customer service call terminal.

The desktop sharing application includes a desktop sharing application identifier, and the desktop sharing application identifier is used to request the customer service call terminal to share a desktop of the user call terminal in a process of a call between the user call terminal and the customer service call terminal.

Same as the scenario 3, the user call terminal initiates a voice call, and the voice call media transmission channel is established through steps S906 to S909 in the foregoing embodiment. A desktop video stream needs to be transmitted in a desktop sharing process, but only a call voice stream can be transmitted and a video stream cannot be transmitted in a voice call process. Therefore, after the control server receives the desktop sharing application, the control server triggers establishment of a video call media transmission channel. The voice call needs to be converted into a video call, to establish a transmission channel that can be used to transmit the video stream, and the desktop video stream is transmitted through the video call media transmission channel. A process of establishing the video call media transmission channel is S1011 to S1014 below.

S1011: The control server sends a SIP message to the user call terminal through the IMS network element. Correspondingly, the user call terminal receives the SIP message from the control server. The SIP message includes a desktop sharing request identifier and SDP information of a media server.

S1012: The user call terminal sends a response message for the SIP message to the control server through the IMS network element. Correspondingly, the control server receives the response message for the SIP message from the user call terminal, where the response message for the SIP message includes a desktop sharing response identifier and SDP information of the user call terminal.

The desktop sharing request identifier in the SIP message and the desktop sharing response identifier in the response message for the SIP message are used to determine whether the user call terminal has a desktop sharing capability. The SDP information of the media server in the SIP message and the SDP information of the user call terminal in the response message for the SIP message are used to perform media resource negotiation, and establish a video call media transmission channel (that is, a first video call media transmission channel) between the media server and the user call terminal.

S1013: The control server sends a reinvite message to the customer service call terminal.

S1014: The customer service call terminal sends an answer message to the control server.

A video call media transmission channel (that is, a second video call media transmission channel) between the customer service call terminal and the media server may be established through the media resource negotiation process in S1013 and S1014. S1011 to S1014 are the same process as S911 to S914. For descriptions of S1011 to S1014, refer to the descriptions of S911 to S914. Details are not described herein again. It should be understood that the first video call media transmission channel and the second video call media transmission channel exist in pairs, and are transmission channels used for communication between the customer service call terminal and the user call terminal.

S1015: The control server sends transmission channel indication information to the user call terminal. Correspondingly, the user call terminal receives the transmission channel indication information from the control server, where the transmission channel indication information indicates to transmit the desktop video stream through the video call media transmission channel.

At this point, the transmission channel that is between the user call terminal and the customer service call terminal and that is used to transmit the desktop video stream is established, and the transmission channel used to transmit the desktop video stream is a video call media transmission channel. Based on the video call media transmission channel, the user call terminal may share the desktop of the customer service call terminal with the user call terminal.

Similar to the scenario 2, in some cases, in the process of the call between the user call terminal and the customer service call terminal, due to some factors, a third-party call terminal needs to be invited to join the call between the user call terminal and the customer service call terminal, where the third-party call terminal may be a user call terminal, or may be a customer service call terminal.

When the third-party call terminal needs to be invited to join the call, the customer service call terminal or the user call terminal may apply to the control server. For example, the customer service call terminal sends a third-party session request to the control server, where the third-party session request is used to request the third-party customer service call terminal to join the call between the customer service call terminal and the user call terminal. Correspondingly, the control server receives the third-party session request, and then the control server performs S1016.

S1016: The control server sends a multi-party site application to the media server. Correspondingly, the media server receives the multi-party site application sent by the control server, where the multi-party site application is used to request the media server to create a multi-party site.

The multi-party site is used by the customer service call terminal, the user call terminal, and the third-party call terminal to perform a multi-party call. This embodiment of this application is described by using one third-party call terminal as an example.

In this embodiment of this application, after the media server receives the multi-party site application, the media server creates the multi-party site, and sends identification information of the multi-party site to the customer service call terminal, the user call terminal, and the third-party call terminal.

Optionally, a sequence of performing S1016 and S1011 to S1014 is not limited in this embodiment of this application. S1016 may be performed before S1011 to S1014, or S1011 to S1014 may be performed before S1016.

S1017: The control server sends an invite message to the third-party call terminal through the IMS network element.

The invite message includes the SDP information of the media server, and the SDP information of the media server includes address information, audio port information, an audio encoding/decoding format, video port information, and a video encoding/decoding format of the media server.

S1018: The third-party call terminal sends a ringing message to the control server through the IMS network element.

The ringing message includes SDP information of the third-party call terminal, and the SDP information of the third-party call terminal includes address information, audio port information, an audio encoding/decoding format, video port information, and a video encoding/decoding format of the third-party call terminal.

S1019: The third-party call terminal sends an answer message to the control server through the IMS network element.

In this embodiment of this application, the third-party call terminal sends the answer message to the control server, indicating that the third-party call terminal has answered a call of the control server and agrees to join the call between the customer service call terminal and the user call terminal.

S1017 to S1019 are a process of calling the third-party call terminal, and are also a process of performing media resource negotiation with the third-party call terminal. A video call media transmission channel (which may be referred to as a third video call media transmission channel) between the third-party call terminal and the media server may be established through S1017 to S1019. It should be understood that the first video call media transmission channel and the third video call media transmission channel exist in pairs, and are transmission channels used for communication between the user call terminal and the third-party call terminal.

At this point, based on the established first video call media transmission channel, the established second video call media transmission channel, and the established third video call media transmission channel, the user call terminal may share the desktop of the user call terminal with the customer service call terminal, and may share the desktop of the user call terminal with the third-party call terminal. A specific process is S1020 to S1022 below.

S1020: The user call terminal sends the desktop video stream to the media server through the first video call media transmission channel. Correspondingly, the media server receives the desktop video stream from the user call terminal through the first video call media transmission channel, where the desktop video stream includes video content captured by the user call terminal from desktop display content of the user call terminal.

S1021: The media server sends the desktop video stream to the customer service call terminal through the second video call media transmission channel.

Correspondingly, the customer service call terminal receives the desktop video stream from the media server through the second video call media transmission channel, and displays a picture corresponding to the desktop video stream (that is, the desktop of the user call terminal) on a display screen of the customer service call terminal.

S1022: The media server sends the desktop video stream to the third-party call terminal through the third video call media transmission channel.

Correspondingly, the third-party call terminal receives the desktop video stream from the media server through the second video call media transmission channel, and displays the picture corresponding to the desktop video stream (that is, the desktop of the user call terminal) on a display screen of the third-party call terminal.

It can be learned from the content of the foregoing embodiment that the desktop sharing method described in S1001 to S1022 is an extension (extended to a multi-party session) of the desktop sharing method described in S901 to S917. A procedure of S1001 to S1027 is similar to a procedure of S901 to S917. For descriptions of other details of S1001 to S1022, refer to the related descriptions in S901 to S917. Details are not described herein again.

Figure 11:
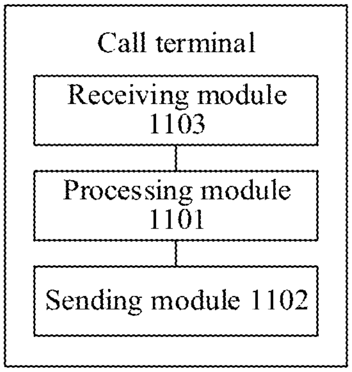
FIG. 11 is a diagram of a structure of a call terminal according to an embodiment of this application.

Correspondingly, an embodiment of this application provides a call terminal. The call terminal may be any call terminal in a call process. Functional modules of the call terminal may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that in embodiments of the present invention, division into modules is an example and is merely logical function division, and may be other division in actual implementation When each functional module is obtained through division based on each corresponding function, FIG. 11 is a diagram of a structure of the call terminal in the foregoing embodiments. As shown in FIG. 11, the call terminal includes a processing module 1101 and a sending module 1102. The processing module 1101 is configured to establish a video call media transmission channel, where the video call media transmission channel is used to transmit a call video stream to at least one peer call terminal in a video call service, and the call video stream includes video content shot by the call terminal, for example, perform S602 or S602' in the foregoing method embodiments. The sending module 1102 is configured to transmit a desktop video stream to the at least one peer call terminal through the video call media transmission channel, where the desktop video stream includes video content captured by the call terminal from desktop display content, for example, perform S607 in the foregoing method embodiments.

Optionally, the processing module 1101 is further configured to control the sending module 1102 to stop transmitting the call video stream to the at least one peer call terminal through the video call media transmission channel, for example, perform S608 in the foregoing method embodiments.

Optionally, when the video call media transmission channel includes a video call media transmission channel between the call terminal and a media server, and a video call media transmission channel between each of the at least one peer call terminal and the media server, the sending module 1102 is configured to transmit the desktop video stream to the media server through the video call media transmission channel between the call terminal and the media server, so that the media server transmits the desktop video stream to the at least one peer call terminal through the video call media transmission channel between each of the at least one peer call terminal and the media server, for example, perform S6071, S716, S820, S916, and S1020 in the foregoing method embodiments.

Optionally, when the video call media transmission channel includes a video call media transmission channel between the call terminal and each of the at least one peer call terminal, the sending module 1102 is configured to transmit the desktop video stream to the at least one peer call terminal through the video call media transmission channel between the call terminal and each of the at least one peer call terminal, for example, perform S6071' in the foregoing method embodiments.

Optionally, as shown in FIG. 11, the call terminal provided in this embodiment of this application further includes a receiving module 1103.

Based on this, the processing module 1101 is further configured to determine that the call terminal has a desktop sharing capability. The processing module 1101 is configured to control the receiving module 1103 to receive a SIP message from a control server, where the SIP message includes a desktop sharing request identifier, and the desktop sharing request identifier is used to determine whether the call terminal has the desktop sharing capability; and control the sending module 1102 to send a response message for the SIP message to the control server, where the response message includes a desktop sharing response identifier, and the desktop sharing response identifier indicates that the call terminal has the desktop sharing capability, for example, perform S604 and S605, S711 and S712, S811 and S812, S911 and S912, and S1011 and S1012 in the foregoing method embodiments.

Optionally, the receiving module 1103 is further configured to receive transmission channel indication information from the control server, where the transmission channel indication information indicates to transmit the desktop video stream through the video call media transmission channel, for example, perform S606, S715, S815, S915, and S1015 in the foregoing method embodiments.

Optionally, the sending module 1102 is further configured to send a desktop sharing application to the control server, where the desktop sharing application includes a desktop sharing application identifier, and the desktop sharing application identifier is used to request to share a desktop of the call terminal with the at least one peer call terminal in a process of a video call between the call terminal and the at least one peer call terminal, for example, perform S603, S710, S810, S910, and S1010 in the foregoing method embodiments.

The modules of the call terminal may be further configured to perform other actions in the foregoing method embodiments. All related content of the steps in the foregoing method embodiments may be referenced to function descriptions of corresponding functional modules, and details are not described herein again.

Figure 12:
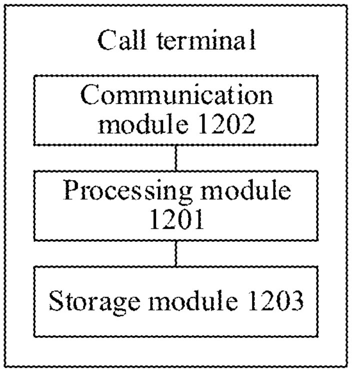
FIG. 12 is a diagram of a structure of another call terminal according to an embodiment of this application.

When an integrated unit is used, FIG. 12 is another diagram of a structure of the call terminal in the foregoing embodiments. As shown in FIG. 12, the call terminal provided in this embodiment of this application may include a processing module 1201 and a communication module 1202. The processing module 1201 may be configured to control and manage an action of the call terminal. For example, the processing module 1201 may be configured to support the call terminal in performing S602 or S602', S604 and S605, S608, S711 and S712, S811 and S812, S911 and S912, and S1011 and S1012 in the foregoing method embodiments, and/or another process of the technology described in this specification. The communication module 1202 may be configured to support communication between the call terminal and another network entity. The communication module 1202 integrates functions of the sending module 1102 and the receiving module 1103. The communication module 1202 may be configured to support the call terminal in performing S603, S606, S607, S6071, S710, S715, S716, S810, S815, S820, S910, S915, S916, S1010, S1020, and S1015 in the foregoing method embodiments. Optionally, as shown in FIG. 12, the call terminal may further include a storage module 1203, configured to store program code and data of the call terminal, for example, a received desktop video stream.

The processing module 1201 may be a processor. For example, the processor may be the processor 410 in FIG. 4A. The communication module 1202 may be a transceiver, a transceiver circuit, a communication interface, or the like, for example, the mobile communication module 450 and/or the wireless communication module 460 in FIG. 4A. The storage module 1203 may be a memory, for example, the internal memory 421 in FIG. 4A.

For more details about the modules included in the call terminal for implementing the foregoing functions, refer to the descriptions in the foregoing method embodiments. Details are not described herein again.

Figure 13:
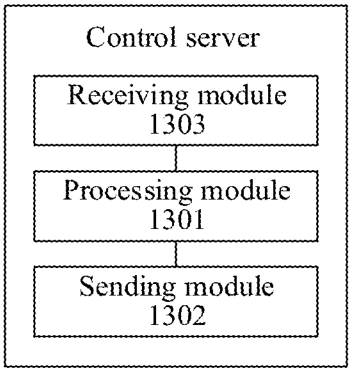
FIG. 13 is a diagram of a structure of a control server according to an embodiment of this application.

Correspondingly, an embodiment of this application provides a control server. Functional modules of the control server may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that in embodiments of the present invention, division into modules is an example and is merely logical function division, and may be other division in actual implementation When each functional module is obtained through division based on each corresponding function, FIG. 13 is a diagram of a structure of the control server in the foregoing embodiments. As shown in FIG. 13, the control server includes a processing module 1301 and a sending module 1302. The processing module 1301 is configured to trigger establishment of a video call media transmission channel, where the video call media transmission channel is used by a call terminal in a video call service to transmit a call video stream to at least one peer call terminal, and the call video stream includes video content shot by the call terminal, for example, perform S601 in the foregoing method embodiments. The sending module 1302 is configured to send transmission channel indication information to the call terminal, where the transmission channel indication information indicates to transmit a desktop video stream through the video call media transmission channel, and the desktop video stream includes video content captured by the call terminal from desktop display content, for example, perform S606, S715, S815, S915, and S1015 in the foregoing method embodiments.

Optionally, as shown in FIG. 13, the control server provided in this embodiment of this application further includes a receiving module 1303.

Based on this, the processing module 1301 is further configured to determine that the call terminal has a desktop sharing capability. The processing module 1301 is configured to control the sending module 1302 to send a SIP message to the call terminal, where the SIP message includes a desktop sharing request identifier, and the desktop sharing request identifier is used to determine whether the call terminal has the desktop sharing capability; and control the receiving module 1303 to receive a response message for the SIP message from the call terminal, where the response message includes a desktop sharing response identifier, and the desktop sharing response identifier indicates that the call terminal has the desktop sharing capability, for example, perform S604 and S605, S711 and S712, S811 and S812, S911 and S912, and S1011 and S1012 in the foregoing method embodiments.

Optionally, the receiving module 1103 is further configured to receive a desktop sharing application sent by the call terminal, where the desktop sharing application includes a desktop sharing application identifier, and the desktop sharing application identifier is used to request to share a desktop of the call terminal with the at least one peer call terminal in a process of a video call between the call terminal and the at least one peer call terminal, for example, perform S603 and S710 in the foregoing method embodiments.

The modules of the control server may be further configured to perform other actions in the foregoing method embodiments. All related content of the steps in the foregoing method embodiments may be referenced to function descriptions of corresponding functional modules, and details are not described herein again.

Figure 14:
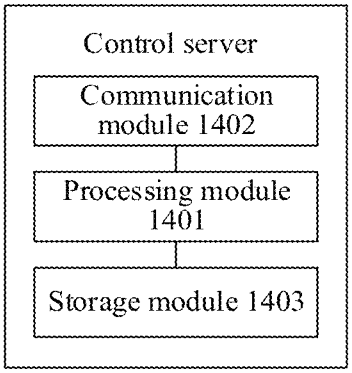
FIG. 14 is a diagram of a structure of another control server according to an embodiment of this application.

When an integrated unit is used, FIG. 14 is another diagram of a structure of the control server in the foregoing embodiments. As shown in FIG. 14, the control server provided in this embodiment of this application may include a processing module 1401 and a communication module 1402. The processing module 1401 may be configured to control and manage an action of the control server. For example, the processing module 1401 may be configured to support the control server in performing S601, S604 and S605, S711 and S712, S811 and S812, S911 and S912, and S1011 and S1012 in the foregoing method embodiments, and/or another process of the technology described in this specification. The communication module 1402 may be configured to support communication between the control server and another network entity. The communication module 1402 integrates functions of the sending module 1302 and the receiving module 1303. The communication module 1402 may be configured to support the control server in performing S603, S606, S710, S715, S815, S915, and S1015 in the foregoing method embodiments. Optionally, as shown in FIG. 14, the control server may further include a storage module 1403, configured to store program code and data of the control server.

The processing module 1401 may be a processor. For example, the processor may be the processor 501 in FIG. 5. The communication module 1402 may be a transceiver, a transceiver circuit, a network interface, or the like, for example, the network interface 503 in FIG. 5. The storage module 1403 may be a memory, for example, the memory 502 in FIG. 5.

For more details about the modules included in the control server for implementing the foregoing functions, refer to the descriptions in the foregoing method embodiments. Details are not described herein again.

Figure 15:
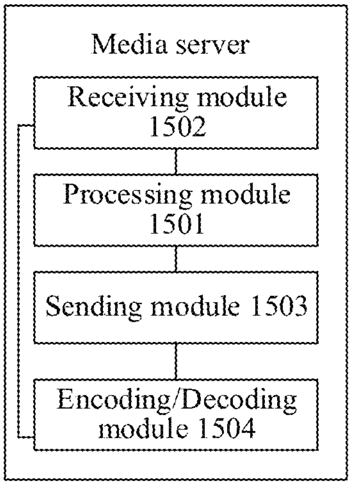
FIG. 15 is a diagram of a structure of a media server according to an embodiment of this application.

Correspondingly, an embodiment of this application provides a media server. Functional modules of the media server may be obtained through division according to the foregoing method example. For example, each functional module may be obtained through division based on each corresponding function, or two or more functions may be integrated into one processing module. The integrated module may be implemented in a form of hardware, or may be implemented in a form of a software functional module. It should be noted that in embodiments of the present invention, division into modules is an example and is merely logical function division, and may be other division in actual implementation When each functional module is obtained through division based on each corresponding function, FIG. 15 is a diagram of a structure of the media server in the foregoing embodiments. As shown in FIG. 15, the media server includes a processing module 1501, a receiving module 1502, and a sending module 1503. The processing module 1501 is configured to establish a first video call media transmission channel and a second video call media transmission channel, where the first video call media transmission channel is a video call media transmission channel between the media server and a call terminal, the second video call media transmission channel is a video call media transmission channel between the media server and each of at least one peer call terminal, the first video call media transmission channel and the second video call media transmission channel are used to transmit a call video stream to the at least one peer call terminal in a video call service, and the call video stream includes video content shot by the call terminal, for example, perform S602 in the foregoing method embodiments. The receiving module 1502 is configured to receive a desktop video stream from the call terminal through the first video call media transmission channel, where the desktop video stream includes video content captured by the call terminal from desktop display content, for example, perform S6071, S716, S820, S916, and S1020 in the foregoing method embodiments. The sending module 1503 is configured to transmit the desktop video stream to the at least one peer call terminal through the second video call media transmission channel, for example, perform S6072, S717, S821, S822, S917, S1021, and S1022 in the foregoing method embodiments.

Optionally, the processing module 1501 is further configured to control the receiving module 1502 to stop receiving the call video stream from the call terminal through the first video call media transmission channel.

Optionally, as shown in FIG. 15, the media server provided in this embodiment of this application further includes an encoding/decoding module 1504.

The encoding/decoding module 1504 is configured to transcode the desktop video stream, where an encoding/decoding format of a transcoded desktop video stream is the same as an encoding/decoding format of the at least one peer call terminal.

Optionally, the desktop video stream further includes the video content shot by the call terminal. The encoding/decoding module 1504 is further configured to perform hybrid encoding processing on the video content shot by the call terminal and the video content captured by the call terminal from the desktop display content, to obtain the desktop video stream.

The modules of the media server may be further configured to perform other actions in the foregoing method embodiments. All related content of the steps in the foregoing method embodiments may be referenced to function descriptions of corresponding functional modules, and details are not described herein again.

Figure 16:
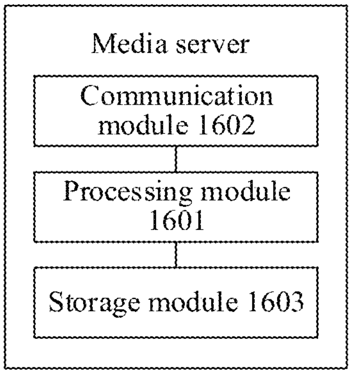
FIG. 16 is a diagram of a structure of another media server according to an embodiment of this application.

When an integrated unit is used, FIG. 16 is another diagram of a structure of the media server in the foregoing embodiments. As shown in FIG. 16, the media server provided in this embodiment of this application may include a processing module 1601 and a communication module 1602. The processing module 1601 may be configured to control and manage an action of the media server. For example, the processing module 1601 may be configured to support the media server in performing S602 in the foregoing method embodiments, and/or another process of the technology described in this specification. The communication module 1602 may be configured to support communication between the media server and another network entity. The communication module 1602 integrates functions of the receiving module 1502 and the sending module 1503. The communication module 1602 may be configured to support the media server in performing S6071, S6072, S716, S717, S820, S821, S822, S916, S917, S1020, S1021, and S1022 in the foregoing method embodiments. Optionally, as shown in FIG. 16, the media server may further include a storage module 1603, configured to store program code and data of the media server.

The processing module 1601 may be a processor. For example, the processor may be the processor 501 in FIG. 5. The communication module 1602 may be a transceiver, a transceiver circuit, a network interface, or the like, for example, the network interface 503 in FIG. 5. The storage module 1603 may be a memory, for example, the memory 502 in FIG. 5.

For more details about the modules included in the media server for implementing the foregoing functions, refer to the descriptions in the foregoing method embodiments. Details are not described herein again.

Embodiments in this specification are all described in a progressive manner, for same or similar parts in embodiments, reference may be made to these embodiments, and each embodiment focuses on a difference from other embodiments.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A desktop sharing method for a call terminal, the method comprising:

establishing a video call media transmission channel, the video call media transmission channel being used by the call terminal to transmit a call video stream to at least one peer call terminal in a video call service, the call video stream comprising desktop video content captured by the call terminal;

receiving transmission channel indication information from a control server, the transmission channel indication information indicating to transmit a desktop video stream through the video call media transmission channel; and transmitting the desktop video stream to the at least one peer call terminal through the video call media transmission channel, the desktop video stream comprising the desktop video content captured by the call terminal from desktop display content;

wherein before the transmitting the desktop video stream to the at least one peer call terminal through the video call media transmission channel, the method further comprises:

stopping transmitting the call video stream to the at least one peer call terminal through the video call media transmission channel.

2. The method according to claim 1, wherein:

the video call media transmission channel comprises a first video call media transmission channel between the call terminal and a media server, and a second video call media transmission channel between each peer call terminal of the at least one peer call terminal and the media server; and the transmitting the desktop video stream to the at least one peer call terminal through the video call media transmission channel comprises:

transmitting the desktop video stream to the media server through the first video call media transmission channel, so that the media server transmits the desktop video stream to the at least one peer call terminal through the second video call media transmission channel.

3. The method according to claim 1, wherein:

the video call media transmission channel is between the call terminal and each peer call terminal of the at least one peer call terminal; and the transmitting the desktop video stream to the at least one peer call terminal through the video call media transmission channel comprises:

transmitting the desktop video stream to the at least one peer call terminal through the video call media transmission channel between the call terminal and the each peer call terminal of the at least one peer call terminal.

4. The method according to claim 1, wherein before the transmitting the desktop video stream to the at least one peer call terminal through the video call media transmission channel, the method further comprises:

determining that the call terminal has a desktop sharing capability.

5. The method according to claim 1, wherein before the transmitting the desktop video stream to the at least one peer call terminal through the video call media transmission channel, the method further comprises:

sending a desktop sharing application to a control server, wherein the desktop sharing application comprises a desktop sharing application identifier, wherein the desktop sharing application identifier is used to request to share a desktop of the call terminal with the at least one peer call terminal in a process of a video call between the call terminal and the at least one peer call terminal.

6. The method according to claim 1, wherein:

the desktop video stream further comprises the video content captured by the call terminal.

7. A desktop sharing method for a control server, the method comprising:

triggering establishment of a video call media transmission channel, the video call media transmission channel being used by a call terminal in a video call service to transmit a call video stream to at least one peer call terminal, the call video stream comprising desktop video content captured by the call terminal; and sending transmission channel indication information to the call terminal, the transmission channel indication information indicating to transmit a desktop video stream through the video call media transmission channel, the desktop video stream comprising the desktop video content captured by the call terminal from desktop display content.

8. The method according to claim 7, wherein:

the video call media transmission channel comprises a first video call media transmission channel between the call terminal and a media server, and a second video call media transmission channel between each peer call terminal of the at least one peer call terminal and the media server; or the video call media transmission channel is between the call terminal and the each peer call terminal of the at least one peer call terminal.

9. The method according to claim 7, wherein before the sending the transmission channel indication information to the call terminal, the method further comprises:

determining that the call terminal has a desktop sharing capability.

10. The method according to claim 7, wherein before the sending the transmission channel indication information to the call terminal, the method further comprises:

receiving a desktop sharing application sent by the call terminal, wherein the desktop sharing application comprises a desktop sharing application identifier, the desktop sharing application identifier is used to request to share a desktop of the call terminal with the at least one peer call terminal in a process of a video call between the call terminal and the at least one peer call terminal.

11. A call terminal, comprising:

a memory storing instructions; and at least one processor coupled to the memory, the at least one processor configured, upon execution of the instructions, to perform the following steps:

establishing a video call media transmission channel, the video call media transmission channel being used by the call terminal to transmit a call video stream to at least one peer call terminal in a video call service, the call video stream comprising desktop video content captured by the call terminal;

receiving transmission channel indication information from a control server, the transmission channel indication information indicating to transmit a desktop video stream through the video call media transmission channel; and transmitting the desktop video stream to the at least one peer call terminal through the video call media transmission channel, the desktop video stream comprising the desktop video content captured by the call terminal from desktop display content;

wherein before the transmitting the desktop video stream to the at least one peer call terminal through the video call media transmission channel, the method further comprises:

stopping transmitting the call video stream to the at least one peer call terminal through the video call media transmission channel.

12. The call terminal according to claim 11, wherein:

the video call media transmission channel comprises a first video call media transmission channel between the call terminal and a media server, and a second video call media transmission channel between each peer call terminal of the at least one peer call terminal and the media server; and the transmitting the desktop video stream to the at least one peer call terminal comprises: transmitting the desktop video stream to the media server through the first video call media transmission channel, so that the media server transmits the desktop video stream to the at least one peer call terminal through the second video call media transmission channel.

13. The call terminal according to claim 11, wherein:

the video call media transmission channel is between the call terminal and each peer call terminal of the at least one peer call terminal; and the transmitting the desktop video stream to the at least one peer call terminal comprises: transmitting the desktop video stream to the at least one peer call terminal through the video call media transmission channel between the call terminal and the each peer call terminal of the at least one peer call terminal.

14. A control server, comprising:

a memory storing instructions; and at least one processor coupled to the memory, the at least one processor configured, upon execution of the instructions, to perform the following steps:

triggering establishment of a video call media transmission channel, the video call media transmission channel being used by a call terminal in a video call service to transmit a call video stream to at least one peer call terminal, the call video stream comprising desktop video content captured by the call terminal; and sending transmission channel indication information to the call terminal, the transmission channel indication information indicating to transmit a desktop video stream through the video call media transmission channel, the desktop video stream comprising the desktop video content captured by the call terminal from desktop display content.

15. The control server according to claim 14, wherein:

the video call media transmission channel comprises a first video call media transmission channel between the call terminal and a media server, and a second video call media transmission channel between each peer call terminal of the at least one peer call terminal and the media server; or the video call media transmission channel is between the call terminal and the each peer call terminal of the at least one peer call terminal.

16. The control server according to claim 14, wherein the program further comprises instructions that, when executed by the at least one processor, cause the control server to perform:

receiving a desktop sharing application from the call terminal, wherein the desktop sharing application comprises a desktop sharing application identifier, the desktop sharing application identifier is used to request to share a desktop of the call terminal with the at least one peer call terminal in a process of a video call between the call terminal and the at least one peer call terminal.

* * * * *